United States Patent
Iida et al.

(10) Patent No.: US 7,586,272 B2
(45) Date of Patent: Sep. 8, 2009

(54) COLD CATHODE FLUORESCENT LAMP, COLD CATHODE FLUORESCENT LAMP DRIVING APPARATUS, COLD CATHODE FLUORESCENT LAMP APPARATUS, LIQUID CRYSTAL DISPLAY APPARATUS, CONTROL METHOD FOR COLD CATHODE FLUORESCENT LAMP, AND CONTROL METHOD FOR LIQUID CRYSTAL DISPLAY APPARATUS

(75) Inventors: Makio Iida, Tokyo (JP); Norimasa Furukawa, Tokyo (JP)

(73) Assignee: Sony Corporation (JP)

( * ) Notice: Subject to any disclaimer, the term of this patent is extended or adjusted under 35 U.S.C. 154(b) by 488 days.

(21) Appl. No.: 11/448,438

(22) Filed: Jun. 7, 2006

(65) Prior Publication Data
US 2006/0284565 A1   Dec. 21, 2006

(30) Foreign Application Priority Data
Jun. 8, 2005   (JP)   ............ P2005-168095
Apr. 25, 2006   (JP)   ............ P2006-120215

(51) Int. Cl.
 *H05B 37/02* (2006.01)
(52) U.S. Cl. ............ 315/291; 315/246; 315/260; 315/DIG. 1; 313/607

(58) Field of Classification Search ............ 315/246, 315/254, 255, 260, 334, 326, 339, 341, 342, 315/291, 358, DIG. 1, DIG. 5; 313/497, 313/607; 345/102
See application file for complete search history.

(56) References Cited

U.S. PATENT DOCUMENTS

| | | | | |
|---|---|---|---|---|
| 5,747,946 A | * | 5/1998 | Tyler | ............ 315/291 |
| 5,965,988 A | * | 10/1999 | Vollkommer et al. | ........ 315/246 |
| 6,900,593 B2 | * | 5/2005 | Imoto | ............ 315/72 |
| 7,077,543 B2 | * | 7/2006 | Nishiyama et al. | ......... 362/225 |

FOREIGN PATENT DOCUMENTS

| | | |
|---|---|---|
| JP | 3230540 B2 | 6/1994 |
| JP | 2000-294391 A | 10/2000 |

* cited by examiner

*Primary Examiner*—Douglas W Owens
*Assistant Examiner*—Ephrem Alemu
(74) *Attorney, Agent, or Firm*—Lerner, David, Littenberg, Krumholz & Mentlik, LLP

(57) ABSTRACT

A cold cathode fluorescent lamp apparatus has a cold cathode fluorescent lamp which can be lit readily and in which leak current is minimized. A pair of internal electrodes are disposed on an inner surface of the cold cathode fluorescent lamp, and a pair of external electrodes are provided on an outer surface of the cold cathode fluorescent lamp. The internal electrodes are driven by a dc driving circuit, and the current flow between the internal electrodes is controlled by a constant current circuit. The external electrodes are driven by an ac driving circuit.

15 Claims, 40 Drawing Sheets

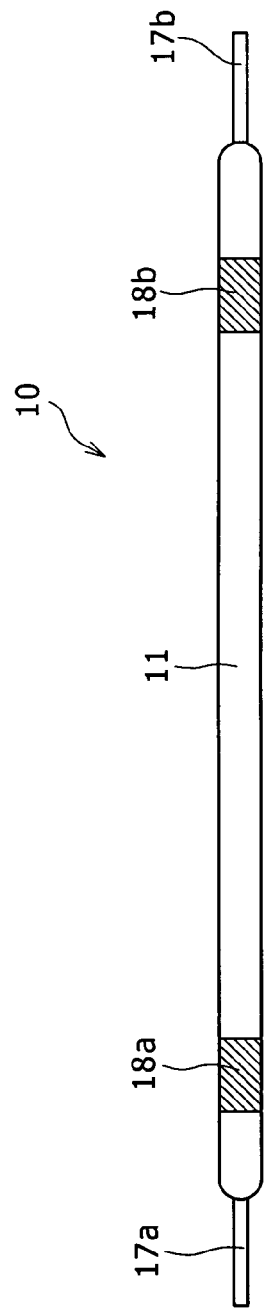
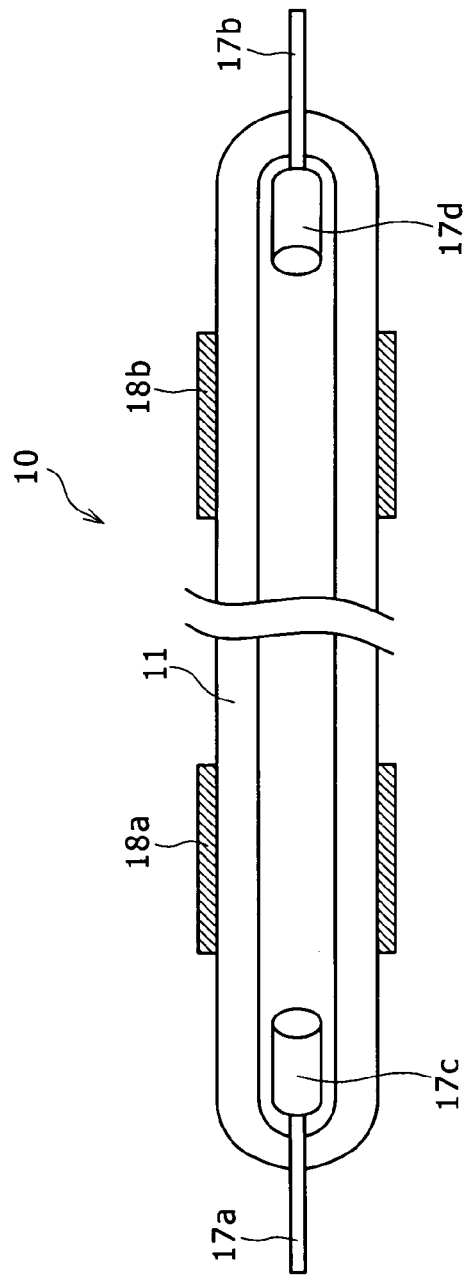

COLD CATHODE FLUORESCENT LAMP, COLD CATHODE FLUORESCENT LAMP DRIVING APPARATUS, COLD CATHODE FLUORESCENT LAMP APPARATUS, LIQUID CRYSTAL DISPLAY APPARATUS, CONTROL METHOD FOR COLD CATHODE FLUORESCENT LAMP, AND CONTROL METHOD FOR LIQUID CRYSTAL DISPLAY APPARATUS

CROSS-REFERENCE TO RELATED APPLICATIONS

The present application claims priority from Japanese Patent Application No. JP2005-168095 filed on Jun. 8, 2005, and JP2006-120215 filed on Apr. 25, 2006, the disclosures of which are hereby incorporated by reference herein.

BACKGROUND OF THE INVENTION

This invention relates to a cold cathode fluorescent lamp, a cold cathode fluorescent lamp driving apparatus, a cold cathode fluorescent lamp apparatus, a liquid crystal display apparatus, a control method for a cold cathode fluorescent lamp, and a control method for a liquid crystal display apparatus.

Known fluorescent lamps are roughly classified into those which are driven by ac current and those which are driven by dc current. Further, fluorescent lamps can be classified also into those of the hot cathode type and those of the cold cathode type. Also those fluorescent lamps are known which light up, at an initial stage of lighting, as those of the hot cathode type and thereafter operate as those of the cold cathode type, as disclosed, for example, in Japanese Patent Laid-Open No. 2000-294391 (hereinafter referred to as Patent Document 1).

While such fluorescent lamps as mentioned above are industrially used widely, attention is paid in recent years to applications of a fluorescent lamp to a cold cathode fluorescent lamp apparatus (backlight apparatus) for irradiating light from the back of a panel of a liquid crystal display apparatus. As a light source for use with a backlight apparatus of a liquid crystal display apparatus, attention is paid particularly to a cold cathode fluorescent lamp (CCFL) which uses a cold cathode which need not be heated and has a comparatively long service life.

A cold cathode fluorescent lamp for use with a backlight apparatus is normally driven by a high voltage of a high oscillation frequency of approximately 30 to 50 kHz in order to suppress flickering caused by use of ac current. Further, as a circuit for driving a cold cathode fluorescent lamp, an inverter circuit is widely used which converts commercial dc power supply into ac high frequency power supply, which is supplied to the cold cathode fluorescent lamp.

Further, together with increase of the display area of a liquid crystal display apparatus in recent years, also a cold cathode fluorescent lamp for use with a backlight apparatus which irradiates light from the rear face of a liquid crystal panel is progressively inclined to be provided with an increased length conforming to the expansion of the display area of the liquid crystal panel. Further, together with the increase of the display area of the liquid crystal display apparatus, it is common to adopt a direct backlight apparatus wherein a plurality of cold cathode fluorescent lamps are juxtaposed in parallel to each other to form a planar light source and disposed on the rear face of the liquid crystal panel to irradiate light upon the liquid crystal panel. In a backlight apparatus of the type described, a reflecting member is provided on the rear face of the cold cathode fluorescent lamps to raise the utilization efficiency of light or an optical sheet such as a diffusing sheet or a prism sheet is interposed between the backlight apparatus and the liquid crystal panel to enhance the luminance. In this manner, various optical structures have been devised for the backlight apparatus, and a structure which surrounds a cold cathode fluorescent lamp as a light source is adopted.

Further, as a driving circuit for a cold cathode fluorescent lamp, also such an improved collector resonance circuit as shown in FIGS. 42 and 43 is used, as disclosed, for example, in Japanese Patent No. 3,230,540 (hereinafter referred to as Patent Document 2).

Such liquid crystal display apparatus as described above have a problem in that driving power of a high frequency applied to a cold cathode fluorescent lamp flows as leak current through a floating capacitance formed between the cold cathode fluorescent lamp and various optical members provided around the cold cathode fluorescent lamp such as a reflector and a diffusing plate. The magnitude of the floating capacitance increases from increase of the length of the cold cathode fluorescent lamp by expansion of the display area, adoption of a plurality of cold cathode fluorescent lamps juxtaposed in parallel to each other and frequent use of various optical members. The increase of the magnitude of the floating capacitance progressively increases the magnitude of the leak current and makes it difficult to effectively utilize the driving power.

Further, in a cold cathode fluorescent lamp having an increased length, leak current appears intermediately in the longitudinal direction and gives rise to variation of the light emission amount at different portions in the longitudinal direction. In particular, the current flowing through the inside of the cold cathode fluorescent lamp increases toward the electrodes but decreases away from the electrodes. Therefore, the cold cathode fluorescent lamp exhibits such difference in brightness that the brightness increases toward the electrodes but decreases away from the electrodes. This phenomenon becomes notable as the elongation of the cold cathode fluorescent lamp increases.

Therefore, in order to decrease high frequency leak current where ac driving wherein a high voltage of a high frequency is applied to a cold cathode fluorescent lamp is adopted, it is a possible countermeasure to increase the spatial distance between the cold cathode fluorescent lamp and surrounding structures to decrease the floating capacitance. However, this countermeasure involves increase in thickness of the structure of the backlight apparatus and makes it difficult to reduce the thickness of the liquid crystal display apparatus.

Thus, it is desirable to provide a liquid crystal display apparatus which solves the above-described problems involved in ac driving and a cold cathode fluorescent lamp, a cold cathode fluorescent lamp driving apparatus, a cold cathode fluorescent lamp apparatus, a control method for a cold cathode fluorescent lamp, and a control method for a liquid crystal display apparatus, which are suitable for use with the liquid crystal display apparatus.

SUMMARY OF THE INVENTION

According to an embodiment of the present invention, there is provided a cold cathode fluorescent lamp including an optically transparent sealed vessel containing a gas and having a fluorescent material disposed on an inner surface thereof, the gas emitting light when electrons collide therewith, and the fluorescent material reacting with the light; first and second internal electrodes disposed inside the sealed vessel and formed at least partially from an electron emitting material; and first and second external electrodes disposed in a spaced relationship from each other on an outer surface of the sealed vessel.

The cold cathode fluorescent lamp includes the first and second internal electrodes disposed inside the sealed vessel and formed at least partially from an electron emitting material and the first and second external electrodes disposed in a spaced relationship from each other on an outer surface of the sealed vessel. In the cold cathode fluorescent lamp, the waveform of a voltage to be applied between the first and second internal electrodes and the timing of the voltage application as well as the waveform of a voltage to be applied between the first and second external electrodes and the timing of the voltage application can be controlled freely and independently of each other.

With the cold cathode fluorescent lamp, enhancement of the lighting performance can be anticipated. In particular, an ac voltage can be applied between the first and second external electrodes to start lighting readily. Further, by applying a dc voltage between the first and second internal electrodes and setting the application period of the ac voltage shorter than the application period of the dc voltage, leak current can be reduced. As a result, variations in luminance in the longitudinal direction of the cold cathode fluorescent lamp can be prevented.

According to another embodiment of the present invention, there is provided a driving apparatus for driving a cold cathode fluorescent lamp which includes an optically transparent sealed vessel containing a gas and having a fluorescent material disposed on an inner surface thereof, the gas emitting light when electrons collide therewith, and the fluorescent material reacting with the light, first and second internal electrodes disposed inside the sealed vessel and formed at least partially from an electron emitting material, and first and second external electrodes disposed in a spaced relationship from each other on an outer surface of the sealed vessel, the driving apparatus including a dc driving circuit operable to apply a dc voltage between the first and second internal electrodes; an ac driving circuit operable to apply an ac voltage between the first and second, external electrodes; and a changeover circuit operable to control the dc driving circuit and the ac driving circuit such that the ac voltage is applied for a predetermined period of time to cause the electrons and the gas to collide with each other and the dc voltage is applied while the collisions between the electrons and the gas continue.

The cold cathode fluorescent lamp driving apparatus includes the dc driving circuit and the ac driving circuit, and a dc voltage is applied between the first and second internal electrodes. Further, an ac voltage is applied between the first and second external electrodes. The cold cathode fluorescent lamp driving apparatus further includes the changeover circuit, which controls the dc driving circuit and the ac driving circuit such that the ac voltage is applied for a predetermined period of time to cause the electrons and the gas to collide with each other and the dc voltage is applied between the first and second internal electrodes while the collisions between the electrons and the gas continue. Then, lighting of the cold cathode fluorescent lamp occurs within the predetermined period of time within which the ac voltage is applied, and also after the predetermined period of time elapses, lighting of the cold cathode fluorescent lamp is continued by application of the dc voltage. Here, the dc voltage also includes a voltage whose polarity reverses in a cycle period which is longer than that of the ac voltage.

With the cold cathode fluorescent lamp driving apparatus, when the cold cathode fluorescent lamp which includes the first and second internal electrodes and the first and second external electrodes is driven, discharging can be started readily by controlling the application of an ac voltage. Then, the lighting of the cold cathode fluorescent lamp can be continued by applying a dc voltage between the first and second internal electrodes. Further, after the application of the ac voltage stops, since no leak current appears, the otherwise possible loss of power and otherwise possible variation in luminance in the longitudinal direction of the cold cathode fluorescent lamp can be prevented.

According to a further embodiment of the present invention, there is provided a cold cathode fluorescent lamp apparatus including a cold cathode fluorescent lamp including an optically transparent sealed vessel containing a gas and having a fluorescent material disposed on an inner surface thereof, the gas emitting light when electrons collide therewith, and the fluorescent material reacting with the light, first and second internal electrodes disposed inside the sealed vessel and formed at least partially from an electron emitting material, and first and second external electrodes disposed in a spaced relationship from each other on an outer surface of the sealed vessel; a dc driving circuit operable to apply a dc voltage between the first and second internal electrodes of the cold cathode fluorescent lamp; a constant current circuit operable to provide a predetermined dc current flow between the first and second internal electrodes of the cold cathode fluorescent lamp; an ac driving circuit operable to apply an ac voltage between the first and second external electrodes of the cold cathode fluorescent lamp; and a changeover circuit operable to control the dc driving circuit and the ac driving circuit such that the ac voltage is applied for a predetermined period of time to cause the electrons and the gas to collide with each other and the dc voltage is applied while the collisions between the electrons and the gas continue.

The cold cathode fluorescent lamp apparatus includes the cold cathode fluorescent lamp including the first and second internal electrodes disposed inside the sealed vessel and formed at least partially from an electron emitting material and the first and second external electrodes disposed in a spaced relationship from each other on an outer surface of the sealed vessel. The cold cathode fluorescent lamp apparatus further includes the dc driving circuit and the constant current circuit operable to drive the cold cathode fluorescent lamp. A dc voltage is applied between the first and second internal electrodes to supply fixed current, and an ac voltage is applied between the first and second external electrodes. The cold cathode fluorescent lamp apparatus further includes the changeover circuit, which controls the dc driving circuit and the ac driving circuit such that the ac voltage is applied between the first and second external electrodes for a predetermined period of time to cause the electrons and the gas to collide with each other and the dc voltage is applied between the first and second internal electrodes while the collisions between the electrons and the gas continue. Then, lighting of the cold cathode fluorescent lamp occurs within the predetermined period of time in which the ac voltage is applied, and also after the predetermined period of time elapses, lighting of the cold cathode fluorescent lamp is continued by application of the dc voltage. Here, the dc voltage also includes a voltage whose polarity reverses in a cycle period which is longer than that of the ac voltage.

With the cold cathode fluorescent lamp apparatus, discharging can be started readily, and, after the application of an ac voltage is stopped, leak current does not appear. Therefore, the otherwise possible loss of power and otherwise possible variation in luminance in the longitudinal direction of the cold cathode fluorescent lamp can be prevented. In addition, since the changeover circuit controls the polarity direction of the dc current flow through the cold cathode fluorescent lamp, the service life of the cold cathode fluorescent lamp can be extended. Furthermore, where a plurality of cold cathode fluorescent lamps are provided, some of the cold cathode fluorescent lamps can be selectively lit or turned off by controlling the passage and blocking of the current for each of the cold cathode fluorescent lamps.

According to a still further embodiment of the present invention, there is provided a liquid crystal display apparatus including a liquid crystal display panel operable to display an image according to an image signal at a position thereof according to a synchronizing signal; and a cold cathode fluorescent lamp apparatus disposed on a rear side of the liquid crystal display panel, the cold cathode fluorescent lamp apparatus including a cold cathode fluorescent lamp including an optically transparent sealed vessel containing a gas and having a fluorescent material disposed on an inner surface thereof, the gas emitting light when electrons collide therewith, and the fluorescent material reacting with the light, first and second internal electrodes disposed inside the sealed vessel and formed at least partially from an electron emitting material, and first and second external electrodes disposed in a spaced relationship from each other on an outer surface of the sealed vessel; a dc driving circuit operable to apply a dc voltage between the first and second internal electrodes of the cold cathode fluorescent lamp; a constant current circuit operable to provide a predetermined dc current flow between the first and second internal electrodes of the cold cathode fluorescent lamp; an ac driving circuit operable to apply an ac voltage between the first and second external electrodes of the cold cathode fluorescent lamp; and a changeover circuit operable to control the dc driving circuit and the ac driving circuit such that the ac voltage is applied for a predetermined period of time according to the synchronizing signal to cause the electrons and the gas to collide with each other and the dc voltage is applied while the collisions between the electrons and the gas continue to control the polarity direction and the passage and blocking of the dc current in the cold cathode fluorescent lamp.

The liquid crystal display apparatus includes the liquid crystal display panel operable to display an image according to an image signal at a position thereof according to a synchronizing signal, and a cold cathode fluorescent lamp apparatus disposed on a rear side of the liquid crystal display panel. The cold cathode fluorescent lamp apparatus includes the cold cathode fluorescent lamp including the first and second internal electrodes disposed inside the sealed vessel and the first and second external electrodes disposed in a spaced relationship from each other on an outer surface of the sealed vessel. The cold cathode fluorescent apparatus controls lighting of the cold cathode fluorescent lamp. The cold cathode fluorescent lamp apparatus further includes the dc driving circuit operable to drive the cold cathode fluorescent lamp. Thus, it is possible to apply a dc voltage between the first and second internal electrodes of one or more cold cathode fluorescent lamps and to apply an ac voltage between the first and second external electrodes of one or more cold cathode fluorescent lamps. The cold cathode fluorescent lamp apparatus further includes the changeover circuit which controls the dc driving circuit and the ac driving circuit such that the ac voltage is applied between the first and second external electrodes of each cold cathode fluorescent lamp for a predetermined period of time according to the synchronizing signal to cause the electrons and the gas to collide with each other and the dc voltage is applied between the first and second internal electrodes while the collisions between the electrons and the gas continue. Then, lighting of the cold cathode fluorescent lamp occurs within the predetermined period of time in which the ac voltage is applied, and also after the predetermined period of time elapses, lighting of the cold cathode fluorescent lamp is continued by application of the dc voltage. Here, the dc current also includes current whose polarity reverses in a cycle period which is longer than that of the ac voltage.

With the liquid crystal display apparatus, discharging can be started readily, and, after the application of an ac voltage is stopped, leak current does not appear. Therefore, the otherwise possible loss of power and otherwise possible variation in luminance in the longitudinal direction of the cold cathode fluorescent lamp can be prevented. Further, the service life of the cold cathode fluorescent lamp can be extended by changing over the polarity direction of the dc current. Furthermore, lighting and turning off of the cold cathode fluorescent lamp can be performed in response to the synchronizing signal. Where a plurality of cold cathode fluorescent lamps are provided, some of the cold cathode fluorescent lamps can be selectively lit or turned off by controlling the passage and blocking of the dc current flow through, each of the cold cathode fluorescent lamps, thereby achieving enhancement of the picture quality of an image displayed on the liquid crystal display apparatus.

According to yet a further embodiment of the present invention, there is provided a control method for a cold cathode fluorescent lamp which includes an optically transparent sealed vessel containing a gas and having a fluorescent material disposed on an inner surface thereof, the gas emitting light when electrons collide therewith, and the fluorescent material reacting with the light, first and second internal electrodes disposed inside the sealed vessel and formed at least partially from an electron emitting material, and first and second external electrodes disposed in a spaced relationship from each other on an outer surface of the sealed vessel, the control method including applying an ac voltage between the first and second external electrodes for a predetermined period of time to cause the electrons and the gas to collide with each other; and applying a dc voltage between the first and second internal electrodes while the collisions between the electrons and the gas continue.

The control method for a cold cathode fluorescent lamp controls a cold cathode fluorescent lamp which includes first and second internal electrodes formed at least partially from an electron emitting material, and first and second external electrodes disposed in a spaced relationship from each other on an outer surface of the sealed vessel. In the control method, control is performed in the following manner. In particular, an ac voltage is applied between the first and second external electrodes for a predetermined period of time to cause the electrons and the gas to collide with each other, thereby lighting the cold cathode fluorescent lamp. Then, a dc voltage is applied between the first and second internal electrodes while the collisions between the electrons and the gas continue. Consequently, after the predetermined period of time elapses, the lighting of the cold cathode fluorescent lamp is continued by the application of the dc voltage. Here, the dc current also includes current whose polarity reverses in a cycle period which is longer than that of the ac voltage.

With the control method for a cold cathode fluorescent lamp, discharging can be started readily, and, after the application of an ac voltage is stopped, leak current does not appear. Therefore, the loss of power can be reduced, and the otherwise possible variation in luminance in the longitudinal direction of the cold cathode fluorescent lamp can be prevented.

According to a still further embodiment of the present invention, there is provided a control method for a liquid crystal display apparatus which includes a liquid crystal display panel operable to display an image according to an image signal at a position thereof according to a synchronizing signal, and a cold cathode fluorescent lamp apparatus disposed on a rear side of the liquid crystal display panel and including a cold cathode fluorescent lamp including an optically transparent sealed vessel containing a gas and having a fluorescent material disposed on an inner surface thereof, the gas emitting light when electrons collide therewith, and the fluorescent material reacting with the light, first and second internal electrodes disposed inside the sealed vessel and formed at least partially from an electron emitting material, and first and second external electrodes disposed in a spaced relationship from each other on an outer surface of the sealed vessel, the control method including applying an ac voltage between the first and second external electrodes for a predetermined period of time according to the synchronizing signal to cause the electrons and the gas to collide with each other; and controlling the polarity direction and the passage and blocking of dc current flow in the cold cathode fluorescent lamp while the collisions between the electrons and the gas continue.

The control method for a liquid crystal display apparatus controls a liquid crystal display apparatus which includes a liquid crystal display panel and a cold cathode fluorescent lamp apparatus. In the control method, control is performed in the following manner. In particular, an ac voltage is applied between the first and second external electrodes for a predetermined period of time according to the synchronizing signal to cause the electrons and the gas to collide with each other to light the cold cathode fluorescent lamp. Then, the polarity direction and the passage and blocking of dc current flow in the cold cathode fluorescent lamp are controlled while the collisions between the electrons and the gas continue. Where the dc current flow through the cold cathode fluorescent lamp is supplied, the cold cathode fluorescent lamp keeps its lighting, but where the dc current flow through the cold cathode fluorescent lamp is stopped, the cold cathode fluorescent lamp stops the lighting. Here, the dc current also includes current whose polarity reverses in a cycle period which is longer than that of the ac voltage.

With the control method for a liquid crystal display apparatus, discharging can be started readily, and, after the application of an ac voltage is stopped, leak current does not appear. Therefore, the otherwise possible loss of power and otherwise possible variation in luminance in the longitudinal direction of the cold cathode fluorescent lamp can be prevented. Further, the service life of the cold cathode fluorescent lamp can be extended by changing over the polarity direction of the dc current. Furthermore, lighting and turning off of the cold cathode fluorescent lamp can be performed in response to the synchronizing signal. Where a plurality of cold cathode fluorescent lamps are provided, some of the cold cathode fluorescent lamps can be selectively lit or turned off by controlling the passage and blocking of the dc current flow through each of the cold cathode fluorescent lamps, thereby achieving enhancement of the picture quality of an image displayed on the liquid crystal display apparatus.

According to an additional embodiment of the present invention, there is provided a cold cathode fluorescent lamp apparatus including a cold cathode fluorescent lamp including an optically transparent sealed vessel containing a gas and having a fluorescent material disposed on an inner surface thereof, the gas emitting light when electrons collide therewith, and the fluorescent material reacting with the light, and first and second internal electrodes disposed inside the sealed vessel and formed at least partially from an electron emitting material; a dc driving circuit operable to apply a dc voltage between the first and second internal electrodes of the cold cathode fluorescent lamp; an ac driving circuit operable to apply an ac voltage between the first and second internal electrodes of the cold cathode fluorescent lamp; a current direction control and constant current circuit operable to provide a predetermined dc current flow between the first and second internal electrodes of the cold cathode fluorescent lamp; and a changeover circuit operable to control the dc driving circuit and the ac driving circuit such that the ac voltage is applied for a predetermined period of time to cause the electrons and the gas to collide with each other and the dc voltage is applied while the collisions between the electrons and the gas continue to control the polarity direction and the passage and blocking of the dc current flow in the cold cathode fluorescent lamp.

The cold cathode fluorescent lamp apparatus includes the cold cathode fluorescent lamp including first and second internal electrodes disposed inside the sealed vessel. The cold cathode fluorescent lamp apparatus further includes a dc driving circuit, an ac driving circuit and a current direction control and constant current circuit for driving the cold cathode fluorescent lamp. In the cold cathode fluorescent lamp, a dc voltage/ac voltage can be applied between the first and second internal electrodes, and the magnitude of the current can be controlled. The cold cathode fluorescent lamp apparatus further includes the changeover circuit which controls the ac voltage to be applied for a predetermined period of time to cause the electrons and the gas to collide with each other and controls the polarity direction and the passage and blocking of the dc current flow in the cold cathode fluorescent lamp. Then, lighting of the cold cathode fluorescent lamp occurs within a predetermined period in which the ac voltage is applied, and also after the predetermined period of time elapses, the lighting of the cold cathode fluorescent lamp is continued by the application of the dc voltage. Here, the dc current also includes current whose polarity reverses in a cycle period which is longer than that of the ac voltage.

With the cold cathode fluorescent lamp apparatus, where the cold cathode fluorescent lamp used includes only the internal electrodes, discharging can be started readily. Further, after the application of an ac voltage is stopped, leak current does not appear. Therefore, the loss of power can be reduced, and the otherwise possible variation in luminance in the longitudinal direction of the cold cathode fluorescent lamp can be prevented. Further, the changeover circuit can control the polarity direction of the current flow through the cold cathode fluorescent lamp, and can extend the service life of the cold cathode fluorescent lamp by changing over the polarity direction of the dc current. Furthermore, where a plurality of cold cathode fluorescent lamps are provided, some of the cold cathode fluorescent lamps can be selectively lit or turned off.

According to another additional embodiment of the present invention, there is provided a control method for a cold cathode fluorescent lamp which includes an optically transparent sealed vessel containing a gas and having a fluorescent material disposed on an inner surface thereof, the gas emitting light when electrons collide therewith, and the fluorescent material reacting with the light, and first and second internal electrodes disposed inside the sealed vessel and formed at least partially from an electron emitting material, the control method including applying an ac voltage between the first and second internal electrodes for a predetermined period of time to cause the electrons and the gas to collide with each other, and applying a dc voltage between the first and second internal electrodes while the collisions between the electrons and the gas continue.

The control method controls a cold cathode fluorescent lamp which includes first and second internal electrodes disposed inside of the sealed vessel and formed at least partially from an electron emitting material. In the control method, control is performed in the following manner. In particular, an ac voltage is applied between the first and second internal electrodes for a predetermined period of time to cause the electrons and the gas to collide with each other to light the cold cathode fluorescent lamp. Then, a dc voltage is applied between the first and second internal electrodes while the collisions between the electrons and the gas continue so that, after the predetermined period of time elapses, the lighting of the cold cathode fluorescent lamp is continued by the application of the dc voltage. Here, the dc current also includes current whose polarity reverses in a cycle period which is longer than that of the ac voltage.

With the control method for a cold cathode fluorescent lamp, where the cold cathode fluorescent lamp used includes only the internal electrodes, discharging can be started readily, and, after the application of an ac voltage is stopped, leak current does not appear. Therefore, the otherwise possible loss of power and otherwise possible variation in luminance in the longitudinal direction of the cold cathode fluorescent lamp can be prevented.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 1A and 1B are schematic views showing a cold cathode fluorescent lamp to which the present invention is applied;

DETAILED DESCRIPTION

Figure 2:
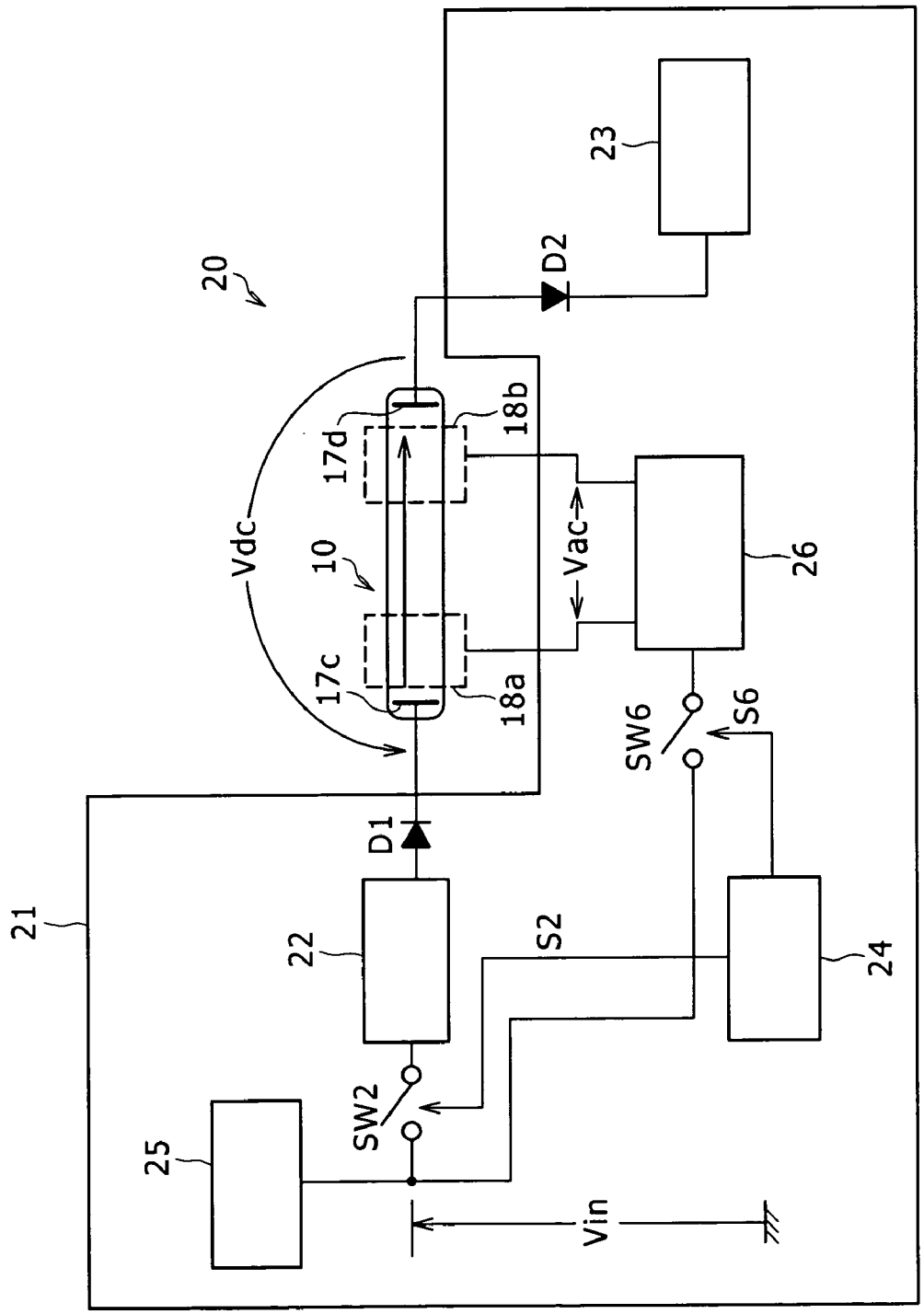
FIG. 2 is a block diagram showing a cold cathode fluorescent lamp apparatus according to a first embodiment of the present invention.

First, a cold cathode fluorescent lamp 10 to which an embodiment of the present invention is applied is described with reference to FIGS. 1A and 1B. FIG. 1A shows a longitudinal section of the cold cathode fluorescent lamp 10, and FIG. 1B shows a longitudinal section of part of the cold cathode fluorescent lamp 10 in an enlarged scale.

The cold cathode fluorescent lamp 10 includes a sealed vessel 11, conductive materials 17a and 17b, internal electrodes 17c and 17d, and external electrodes 18a and 18b. The sealed vessel 11 has a generally cylindrical shape and is made of glass which is a material having optical transparency and an electric insulating property. At least one of the internal electrodes 17c and 17d is formed from an electron emitting material.

The sealed vessel 11 is sealed at the opposite end faces thereof in the longitudinal direction. The internal space (hereinafter referred to as lamp inside) surrounded by the sealed vessel 11 is formed as a substantially vacuum closed space and filled with a very small amount of mercury which is gas for light emission. A fluorescent material is applied to the inner face of the glass which forms the closed space. The conductive materials 17a and 17b are led out to the outside of the closed space individually from the sealed end faces of the sealed vessel 11 in the longitudinal direction. The conductive material 17a is connected to the internal electrode 17c disposed in the lamp inside with electric conductivity kept therebetween. Meanwhile, the conductive material 17b is connected to the internal electrode 17d disposed in the lamp inside with electric conductivity kept therebetween. On a face of the sealed vessel 11 which contacts with the external space (the face is hereinafter referred to simply as lamp outer face), the external electrodes 18a and 18b are disposed in a spaced relationship from each other. The external electrodes 18a and 18b have a belt-like shape of a fixed width and extend in a direction perpendicular to the longitudinal direction of the cylindrical shape of the sealed vessel 11.

The cold cathode fluorescent lamp 10 operates in the following manner. When an electron in the lamp inside collides with an atom of mercury, light is emitted. The wavelength of the emitted light in this instance belongs to the ultraviolet region and is so short that the light cannot be visually observed. Therefore, a fluorescent material which reacts with the ultraviolet rays is applied to the inner face of the sealed vessel 11. Thus, the fluorescent material reacts with the ultraviolet rays to emit visible rays of a wavelength which depends upon the type of the fluorescent material. Therefore, light of various colors may be emitted depending upon the type of the fluorescent material.

Referring now to FIG. 2, there is shown a cold cathode fluorescent lamp apparatus to which the embodiment of the present invention is applied.

The cold cathode fluorescent lamp apparatus 20 shown includes a cold cathode fluorescent lamp 10 and a cold cathode fluorescent lamp driving apparatus 21. The cold cathode fluorescent lamp 10 is configured in such a manner as described above with reference to FIGS. 1A and 1B, and description of the cold cathode fluorescent lamp 10 is given below with regard to only those of the components which are necessary for description of the cold cathode fluorescent lamp apparatus 20.

The cold cathode fluorescent lamp driving apparatus 21 includes a power supply 25, a dc driving circuit 22 for supply power to the internal electrodes 17c and 17d, an ac driving circuit 26 for supplying power to the external electrodes 18a and 18b, a constant current circuit 23, a changeover control circuit 24, and switch elements Sw2 and Sw6. In the present embodiment, the changeover control circuit 24 and the switch elements Sw2 and Sw6 construct a changeover circuit. The switch element Sw2 is controlled to an on (connected) or off (disconnected) state in accordance with a signal S2 from the changeover control circuit 24.

The power supply 25 serves as a power supply for the cold cathode fluorescent lamp 10 and is, in the present embodiment, a dc power supply. The power supply 25 generates a dc voltage Vin and applies the dc voltage Vin to the dc driving circuit 22, which thus generates a dc voltage Vdc between the internal electrodes 17c and 17d. The dc voltage Vin from the power supply 25 is applied also to the ac driving circuit 26, which thus generated an ac voltage Vac between the external electrodes 18a and 18b.

The dc power from the dc driving circuit 22 is applied to a node between the internal electrodes 17c and 17d of the cold cathode fluorescent lamp 10 through diodes D1 and D2 and the constant current circuit 23. It is to be noted that the diodes D1 and D2 are disposed for protection and may be omitted.

Meanwhile, the ac power from the ac driving circuit 26 is applied to a node between the external electrodes 18a and 18b of the cold cathode fluorescent lamp 10.

Figure 3:
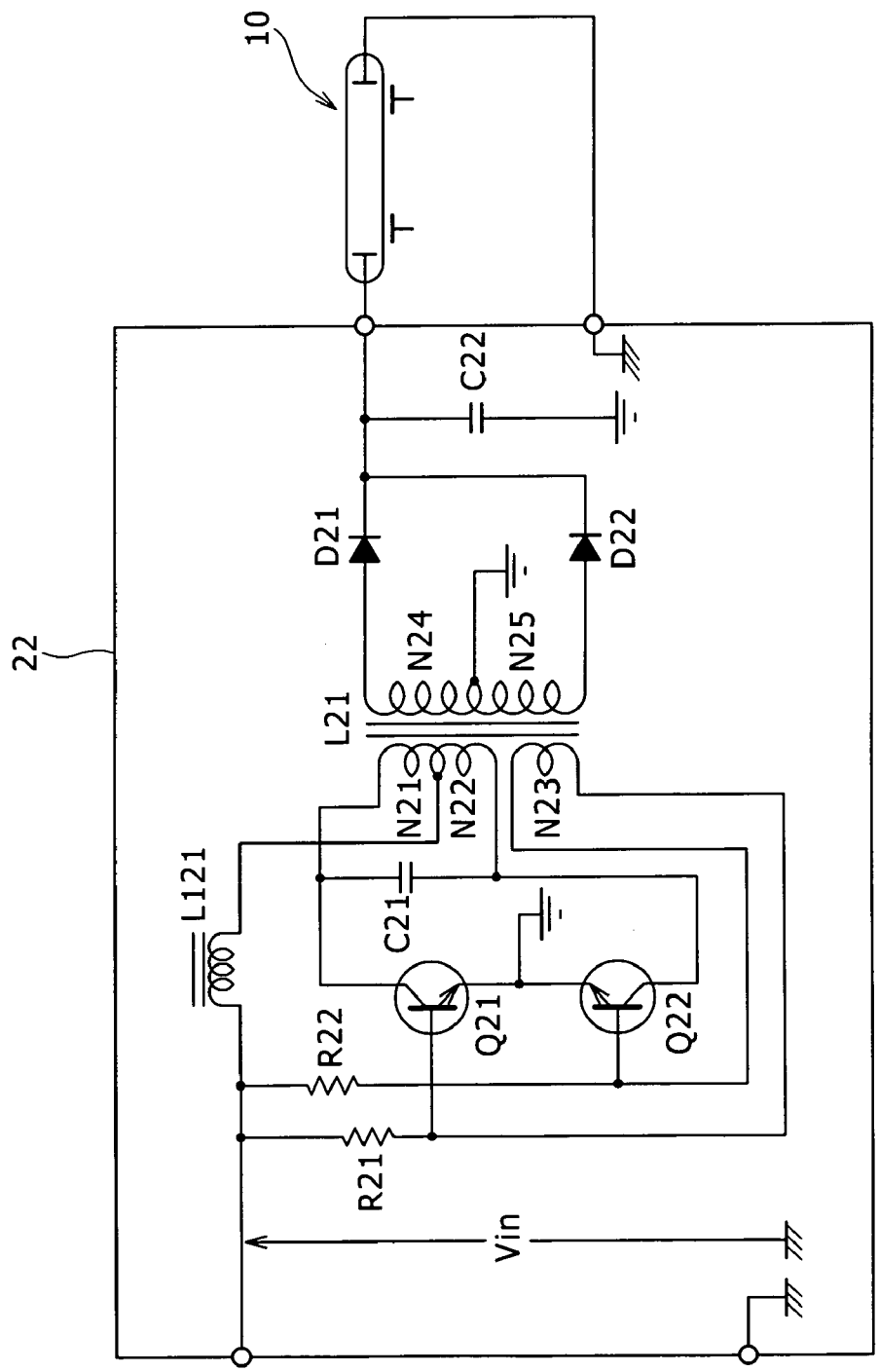
FIG. 3 is circuit diagram showing a dc driving circuit shown in FIG. 2.

The dc driving circuit 22 is shown in FIG. 3. Referring to FIG. 3, the dc driving circuit 22 includes transistors Q21 and Q22, an oscillation and conversion transformer L21, resistors R21 and R22, a capacitor C21, diodes D21 and D22 and another capacitor C22. The oscillation and conversion transformer L21 includes primary side windings N21 to N23 and secondary side N24 and N25 wound thereon.

The primary side windings N21 and N22 have an equal number of turns, and the winding ending end of the primary side winding N21 and the winding starting end of the primary side winding N22 are connected to each other to form a center tap. The center tap is connected to the power supply 25 so that the dc voltage Vin is applied thereto. The winding starting end of the primary side winding N21 is connected to the collector of the transistor Q21, and the winding ending end of the primary side winding N22 is connected to the collector of the transistor Q22. Further, the capacitor C21 (including the primary side floating capacitance) is connected between the winding starting end of the primary side winding N21 and the winding ending end of the primary side winding N22. Thus, a resonance circuit is formed principally from the capacitor C21 and primary windings N21 and N22.

The resonance frequency of the resonance circuit depends upon the capacitance value of the capacitor C21, the inductance value of the primary windings N21 and N22 and the total reactance of the secondary side as viewed equivalently from the primary side. The resonance circuit oscillates in a self-excited fashion with the resonance frequency. Such a self-excited oscillation circuit which forms a circuit disconnected in terms of ac from the power supply by the oscillation and conversion transformer L21 as just described is called collector resonance type circuit. The collector resonance circuit is used frequently from such advantages that the oscillation frequency can be raised when compared with that of a Royer circuit and that the oscillation frequency is less likely to be influenced by the value of the dc voltage Vin.

The resistor R21 and the primary side winding N23 are connected at one end thereof to the base of the transistor Q21 and at the other end thereof to the base of the transistor Q22. The primary side winding N23 has a predetermined winding ratio and a predetermined polarity direction with respect to the primary windings N21 and N22 so that a voltage which satisfies conditions in which a circuit connected to the primary side forms a positive feedback loop.

Operation of the dc driving circuit 22 having the configuration described above is described simply. First, when the dc voltage Vin is supplied from the power supply 25 to the dc driving circuit 22, the resistor R21 supplies base current to the base of the transistor Q21, and the resistor R22 supplies base current to the base of the transistor Q22. Consequently, current flows to the collector of the transistor Q21 and the collector of the transistor Q22.

The current flowing to the collector of, the transistor Q21 then flows to the primary side winding N21 and the current flowing to the collector of the transistor Q22 flows to the primary side winding N22, whereupon magnetic fluxes are generated in the core (not shown) of the oscillation and conversion transformer L21 by the currents. However, the direction of the magnetic fluxes generated by the primary side winding N21 and the direction of the magnetic fluxes generated by the primary side winding N22 in the core are opposite to each other, and therefore, the magnetic fluxes cancel each other.

However, since the transistors Q21 and Q22 normally have somewhat different current amplification factors from each other, higher current flows to the collector of one of the transistors Q21 and Q22, and higher current flows to one of the primary windings N21 and N22. As a result, magnetic fluxes corresponding to a difference between the currents flowing through the primary side windings N1 and N2 are generated in the core of the oscillation and conversion transformer L21. Consequently, a voltage corresponding to the magnetic fluxes is generated in the primary side winding N23. This voltage is generated in the positive feedback direction and further increases the collector current of that one of the transistors Q21 and Q22 through which higher collector current flows, and further decreases the collector current of that one of the transistors Q21 and Q22 through which the lower collector current flows until the collector is suddenly decreases to zero. The following description proceeds assuming that the former is the transistor Q21 and the latter is the transistor Q22.

At this time, a voltage waveform in the form of a sine waveform is generated in the primary windings N21, N22 and N23 and the secondary side winding N24 by a resonance circuit which is formed from the capacitance value of the capacitor C21, inductance value of the primary windings N21 and N22 and the total reactance of the secondary side as viewed equivalently from the primary side. Then, since the voltage generated in the primary side winding N23 is positively fed back to the bases of the transistors Q21 and Q22, self-excited oscillation of a frequency equal to the resonance frequency continues.

Here, the winding directions of the secondary side N24 and N25 are determined in advance so that voltages generated in the secondary side N24 and N25 have the opposite polarities to each other with reference to the center tap, and also the numbers of turns of the secondary side N24 and N25 are equal to each other. Then, the voltages are rectified by the diodes D21 and D22 and smoothed by the capacitor C22. Since the numbers of turns of the secondary side N24 and N25 are set higher than those of the primary windings N21 and N22, the dc voltage Vdc of a high level is obtained across the capacitor C22 by this full rectification circuit of the center tap type.

Figure 4:
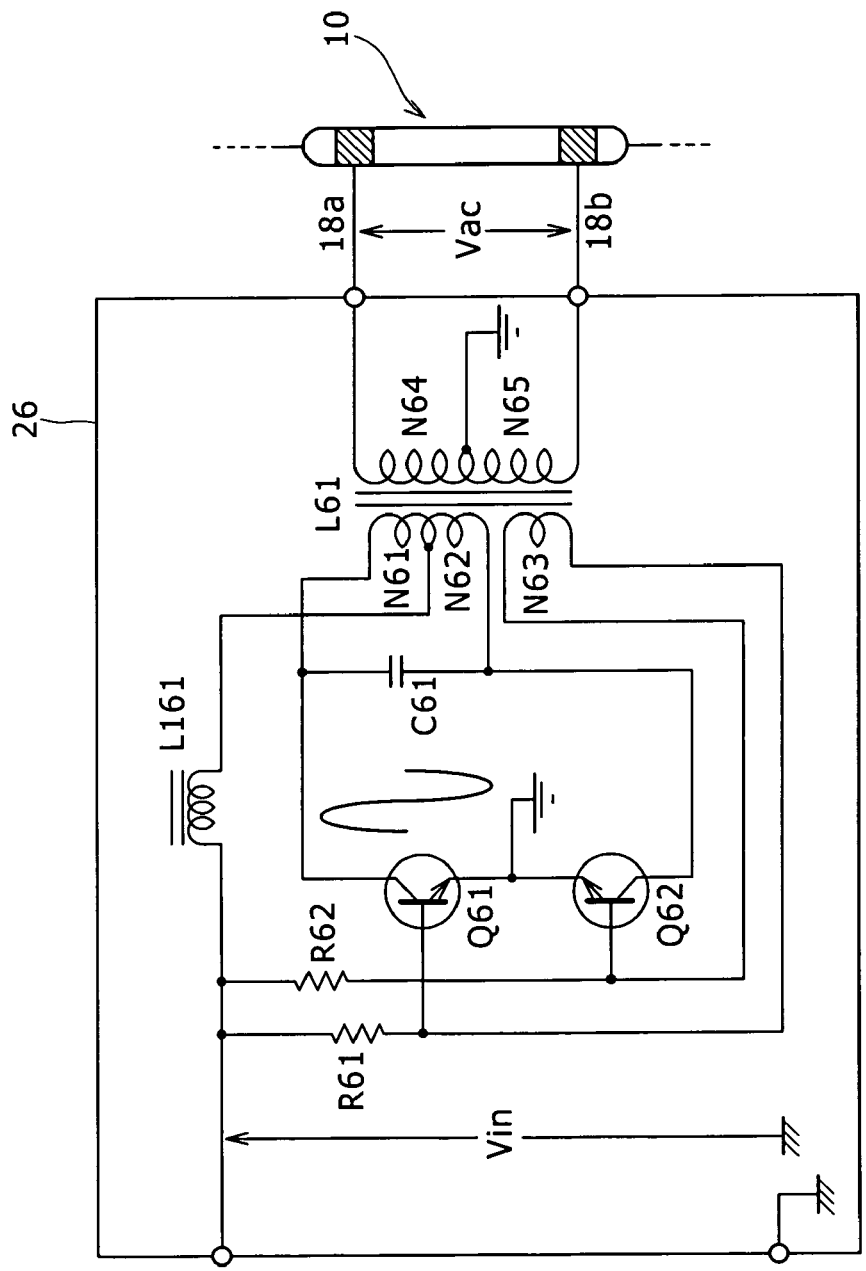
FIG. 4 is a circuit diagram showing an ac driving circuit shown in FIG. 2.

The ac driving circuit 26 is shown in FIG. 4. Referring to FIG. 4, the ac driving circuit 26 includes transistors Q61 and Q62, an oscillation and conversion transformer L61, resistors R61 and R62, and a capacitor C61 (including primary side floating capacitance). The oscillation and conversion transformer L61 has primary side windings N61 to N63 and secondary side windings N64 and N65 wound thereon.

The primary side windings N61 and N62 are equal in turn number, and the winding ending end of the primary side winding N61 and the winding starting end of the primary side winding N62 are connected to each other to form a center tap. The center tap is connected to the power supply 25 through an inductor L161, and the winding starting end of the primary side winding N62 is connected to the collector of the transistor Q62. Further, the capacitor C61 is connected between the winding starting end of the primary side winding N62 and the winding ending end of the primary side winding N62. Thus, a resonance circuit is formed from the capacitance of the capacitor C61, the inductance value of the primary side windings N61 and N62 and the total reactance of the secondary side as viewed equivalently from the primary side.

The resistor R61 and the primary side winding N63 are connected at one end thereof to the transistor Q61 and at the other end thereof to the resistor R62 and the primary side winding N63. The primary side winding N63 is wound such that it has a winding ratio and a polarity direction with respect to the primary side windings N61 and N62 so that a voltage which forms a positive feedback look is generated.

Such operation of the ac driving circuit 26 as described above is quite same as that of the dc driving circuit 22 with regard to the primary side. On the other hand, with regard to the secondary side, since it includes no diode for rectification and no smoothing capacitor, the ac voltage Vac which is an ac voltage is outputted to the secondary side.

Figure 5:
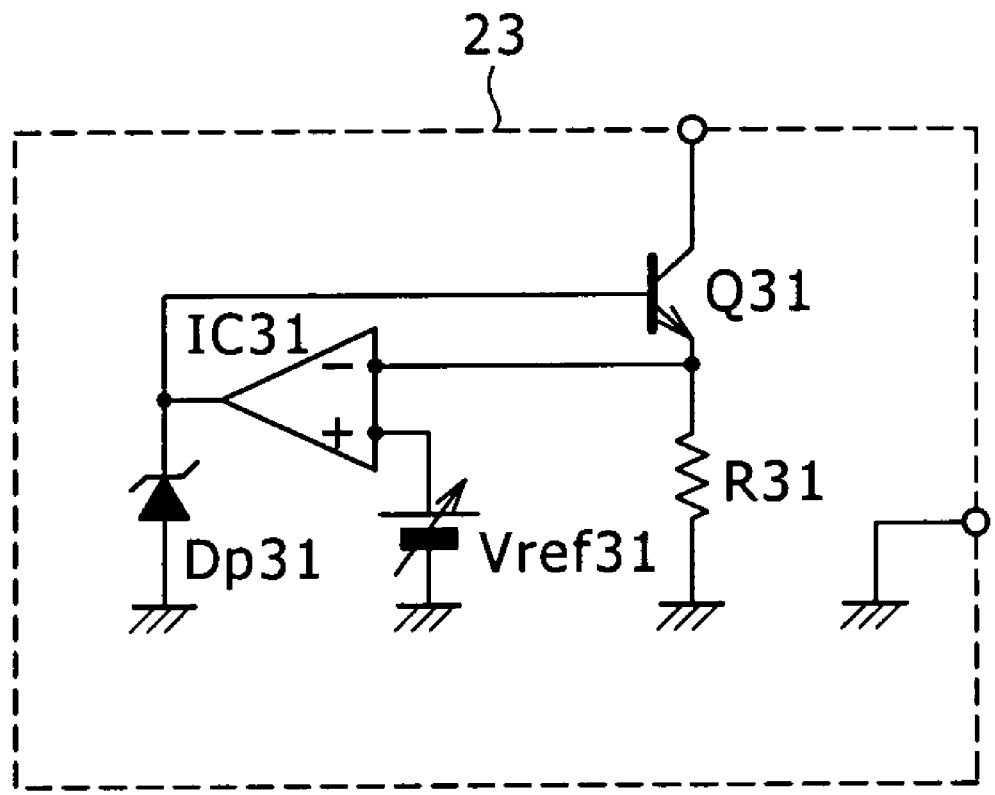
FIG. 5 is a circuit diagram showing a constant current circuit shown in FIG. 2.

The constant current circuit 23 is shown in FIG. 5. Referring to FIG. 5, the constant current circuit 23 includes a transistor Q31, a resistor R31, a reference voltage source Vref31, a Zener diode Dp31 and an operational amplifier IC31. The resistor R31 for current detection is connected to the emitter of the transistor Q31 so that current flowing through the emitter of the transistor Q31 causes the resistor R31 to generate a voltage. The voltage generated across the resistor R31 is inputted to the negated input terminal of the operational amplifier IC31. Meanwhile, a voltage from the reference voltage source Vref31 is inputted to the non-negated input terminal of the operational amplifier IC31. The output terminal of the operational amplifier IC31 is connected to the base of the transistor Q31. Thus, the constant current circuit 23 is formed so as to form a constant current source from which current of a fixed magnitude flows through the emitter of the transistor Q31.

Operation of the constant current circuit 23 is described simply. If the voltage across the resistor R31, that is, the voltage to the negated input terminal of the operational amplifier IC31, is lower than the reference voltage source Vref31, that is, the voltage at the non-negated input terminal of the operational amplifier IC31, then the voltage at the output terminal of the operational amplifier IC31 appears in the positive direction and increases the base current of the transistor Q31. As a result, also the emitter current of the transistor Q31 increases. On the other hand, if the voltage across the resistor R31, that is, the voltage at the negated input terminal of the operational amplifier IC31, is higher than the reference voltage source Vref31, that is, the voltage at the non-negated input terminal of the operational amplifier IC31, then the voltage at the output terminal of the operational amplifier IC31 appears in the negative direction and decreases the base current of the transistor Q31. As a result, also the emitter current of the transistor Q31 decreases.

As a result of such a feedback action as described above, the voltage across the resistor R31 is normally controlled so as to be substantially equal to the voltage of the reference voltage source Vref31. Here, if the value of the resistor R31 is increased, then the magnitude of current flowing through the resistor R31, that is, the magnitude of the emitter current of the transistor Q31, can be decreased, but if the value of the resistor R31 is decreased, then the magnitude of the current flowing through the resistor R31, that is, the emitter current of the transistor Q31, can be increased. Further, also by varying the value of the voltage of the reference voltage source Vref31 without varying the resistance of the resistor R31, the emitter current of the transistor Q31 can be varied to a desired magnitude.

It is to be noted that, since the magnitude of the base current of the transistor Q31 is smaller than that of the emitter current of the transistor Q31, the magnitude of current flowing through the emitter of the transistor Q31 and the magnitude of the current flowing through the collector of the transistor Q31 are substantially equal to each other. Further, the Zener diode Dp31 is provided for the protection, that is, to limit the base current of the transistor Q31 and may be omitted.

Further, the changeover control circuit 24 shown in FIG. 2 cooperates with the switch elements Sw2 and Sw6 to form the changeover circuit. The changeover control circuit 24 generates signals S2 and S6 for controlling the switch elements Sw2 and Sw6 to on or off, respectively. Further, since an electronic device which can be controlled between on and off is selected as the switch elements Sw2 and Sw6, higher speed operation can be achieved than that in an alternative case wherein mechanical parts such as a relay are used. While a transistor is used in the present embodiment, an FET (Field Effect Transistor) may be used instead.

Then, when the switch element Sw2 is on, power is supplied to the dc driving circuit 22, but when the switch element Sw2 is off, power is not supplied to the dc driving circuit 22. Meanwhile, when the switch element Sw6 is on, power is supplied to the ac driving circuit 26, but when the switch element Sw6 is off, power is not supplied to the ac driving circuit 26. In other words when the switch element Sw2 is on, the dc voltage Vdc has a predetermined value, but when the switch element Sw2 is off, the dc voltage Vdc has the value of 0 V (volt). Further, when the switch element Sw6 is on, the ac voltage Vac has a predetermined value, but when the switch element Sw6 is off, the ac voltage Vac has the value of 0 v (volt).

Now, operation of the entire cold cathode fluorescent lamp apparatus 20 according to the first embodiment is described with reference to FIGS. 6A to 6E.

FIG. 6A illustrates the signal S6 outputted from the changeover control circuit 24. When the signal S6 has the high level (in FIG. 6A, a higher level) within a period from time t0 to time t3, the switch element Sw6 is controlled to on, but when the signal S6 has the low level (in FIG. 6A, a lower level), the switch element Sw6 is controlled to off. FIG. 6B illustrates the signal S2 outputted from the changeover control circuit 24. When the switch element Sw2 changes from the low level (in FIG. 6B, a lower level) to the high level (in FIG. 6B, a higher level) at a point of time within a period from time t2 to time t4, the switch element Sw2 is controlled to on, but when the signal S2 has the low level, the switch element Sw2 is controlled to off.

FIG. 6C illustrates a waveform of the ac voltage Vac. When the signal S6 has the high level, the switch element Sw6 exhibits an on state and the ac voltage Vac of a predetermined value is generated from the ac driving circuit 26, but when the signal S6 has the low level, the switch element Sw6 exhibits an off state and the ac voltage Vac of the value 0 V is generated from the ac driving circuit 26. FIG. 6D illustrates a waveform of the dc voltage Vdc from the dc driving circuit 22. When the signal S2 has the high level, the switch element Sw2 exhibits an on state and the dc voltage Vdc of a predetermined value is generated, but when the signal S2 has the low level, the switch element Sw2 exhibits an off state and the dc voltage Vdc of the value of 0 V is generated.

In order to cause the dc driving circuit 22 to continuously light the cold cathode fluorescent lamp 10, it is significant how to select the time t2 and the time t4 with respect to the time t3. This is described below.

Further, the switch element Sw6 is switched on at time t0 so that the predetermined voltage is generated as the ac voltage Vac to light the cold cathode fluorescent lamp 10 by ac driving. When the ac driving is performed, although the external electrode 18a and the external electrode 18b do not contact directly with the lamp inside, they supply displacement current to the lamp inside so that electrons and atoms of mercury collide with each other in the lamp inside to start emission of light of the cold cathode fluorescent lamp 10. It is to be noted that, in this instance, as the frequency of the ac increases, this equivalently acts to lower the work function of the internal electrodes 17c and 17d thereby to facilitate emission of electrons.

Once the cold cathode fluorescent lamp 10 is lit and is dc driven while the plasma state is maintained, the lighting can be continued. In other words, while the collision between electrons and the gas after the ac driving is started continues (while the gas in the lamp inside remains in the plasma state), if changeover from the ac driving to dc driving is performed, then the lighting state of the cold cathode fluorescent lamp 10 can be continued. In this instance, since, in the dc driving, constant current driving is performed by the constant current circuit 23, the cold cathode fluorescent lamp 10 can keep a stabilized fixed luminance.

Figure 6:
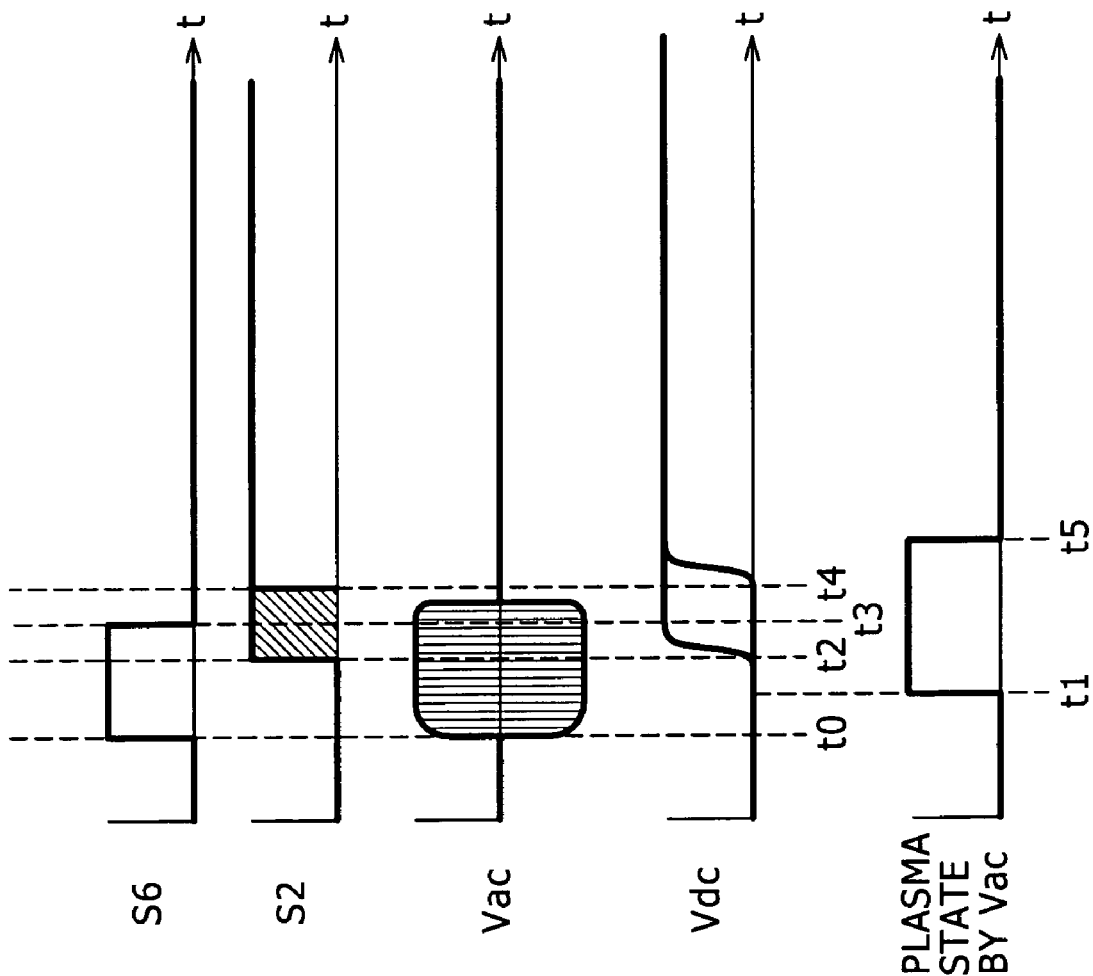
FIGS. 6A to 6E are timing charts of the cold cathode fluorescent lamp apparatus of FIG. 2.

Here, in FIG. 6, the range from time t1 to time t5 is a period of time within which the gas in the lamp inside remains in the plasma state where only the ac driving is used, and if dc driving is started within the range from time t1 to time t5, then dc lighting can be performed and then maintained. However, since it is difficult to accurately detect time t1 and time t5, a time margin should be assured such that the signal S2 for starting dc driving is signaled to the switch element Sw2, for example, within the range from time t2 to time t4 which is a period of time within the range from time t1 to time t5. Where a time margin is assured in this manner, lighting of the cold cathode fluorescent lamp 10 can be performed and maintained with a higher degree of certainty. Thus, a time margin is given as a period of time from time t1 to time t2 and another period of time from time t4 to time t5.

The time margin described above varies depending upon the type of the gas, the environmental temperature, individual differences of the cold cathode fluorescent lamp 10, aged deterioration in characteristic of the cold cathode fluorescent lamp 10, the value of the ac voltage Vac to be used for ac driving and so forth. Further, also the time delay after the signal S2 for controlling the switch element Sw2 to the on state is outputted until the dc driving circuit 22 operates and the time delay after the signal S6 for controlling the switch element Sw6 to the on state until the dc driving circuit 22 operates differ depending upon the driving circuit. Therefore, in order to assure a time margin with the safety taken into consideration, it is desirable from the point of view of continuation of stabilized lighting to set the timing at which application of a dc driving voltage is to be started to a point of time (for example, in FIG. 6D, time t2) within a predetermined period of time (in FIG. 6D, period of time from time t0 to time t3) within which ac driving continues and to set the period of time (in FIG. 6D, from time t0 to time t2) after starting of the ac driving till starting of the dc driving and the period of time (in FIG. 6D, from time t2 to time t3) after starting of the dc driving till stopping of the ac driving as long as possible.

In particular, the signals S6 and S2 are preferably controlled so as to assure the following periods of time. First, a period of time sufficient for occurrence of collision between electrons and gas in the lamp inside (conversion of gas in the lamp inside into a plasma state) by ac driving under the estimated worst environment is assured as a period time from time t0 to time t2. Further, a period of time sufficient for assurance of continuation of collision between electrons and the gas in the lamp inside (continuation of the plasma state of the gas in the lamp inside) is assured as a period of time from time t2 to time t3.

In this manner, the cold cathode fluorescent lamp apparatus 20 of the first embodiment is controlled such that it is lit by ac driving wherein an ac voltage is applied and, after the cold cathode fluorescent lamp 10 is lit (ac lit) by the ac driving, it is lit (dc lit) by dc driving wherein a dc voltage is applied. Then, the period of time for the dc driving is set longer than the period of time for the ac driving.

The cold cathode fluorescent lamp apparatus 20 of the first embodiment can solve the problem, which appears where ac driving is performed, that ac current from the ac driving circuit 26 flows as leak current to a floating capacitance formed between the cold cathode fluorescent lamp 10 and a member provided around the cold cathode fluorescent lamp 10 (for example, where the cold cathode fluorescent lamp 10 is used as a backlight apparatus, various optical members such as a reflecting member, a diffuser plate and so forth), and can achieve effective utilization of the driving power. Further, appearance of a condition can be prevented that leak current appears intermediately in the longitudinal direction of the cold cathode fluorescent lamp 10 having an increased length when only ac driving is performed and gives rise to variation of the light emission amount at different portions in the longitudinal direction, resulting in difference in brightness among different portions of the cold cathode fluorescent lamp 10. Consequently, uniform brightness can be achieved with the cold cathode fluorescent lamp apparatus 20.

In particular, where the cold cathode fluorescent lamp 10 is lit by ac driving, leak current flows through the floating capacitance. However, where the cold cathode fluorescent lamp 10 is lit by dc driving, even if the floating capacitance exists, the reactance against the dc current theoretically has an infinite magnitude and can establish an insulating state. Consequently, the leak current can be reduced to zero.

Further, since the cold cathode fluorescent lamp 10 of the first embodiment includes the internal electrodes 17c and 17d which are a set of electrodes for dc driving and the external electrodes 18a and 18b which are a set of electrodes for ac driving, the ac voltage Vac which is an ac voltage can be applied from the ac driving circuit 26 and the dc voltage Vdc which is a dc voltage can be applied from the dc driving circuit 22 to light the cold cathode fluorescent lamp 10 stably. In other words, since the two sets of electrodes are provided, the relationship between the period of time for ac driving and the period of time for dc driving can be controlled arbitrarily such that, for example, they overlap with each other. It is to be noted that the relationship between the period of time for ac driving and the period of time for dc driving can be achieved readily by controlling the timings at which the ac voltage Vac and the dc voltage Vdc are to be applied to the electrodes for dc driving and the electrodes for ac driving by means of the changeover circuit.

If ac driving and dc driving are performed using the cold cathode fluorescent lamp 10 of the first embodiment, then various inverter circuits which have been used heretofore can be adopted as they are as the ac driving circuit 26 and dc generating circuits which have been used heretofore can be adopted as they are as the dc driving circuit 22. Therefore, not only reduction of the cost for the apparatus can be anticipated. Besides, since existing electronic parts such as ICs can be diverted, miniaturization of the apparatus is facilitated. Furthermore, since the cold cathode fluorescent lamp 10 is configured such that the changeover circuit is disposed on the primary side and a voltage on the secondary side is boosted by the oscillation and conversion transformer, the voltage withstanding property of many parts can be set lower.

Further, in the cold cathode fluorescent lamp 10 of the first embodiment, since the internal electrodes 17c and 17d and the external electrodes 18a and 18b are insulated by the sealed vessel 11 of glass which is a material having optical transparency and an electric insulating property, electric mutual interference between the ac driving circuit 26 and the dc driving circuit 22 can be prevented. Consequently, control of the dc driving circuit 22 and the ac driving circuit 26 is facilitated.

In particular, although the external electrodes 18a and 18b are connected to each other in terms of dc through the secondary side windings N64 and N65 of the ac driving circuit 26, since the sealed vessel 11 of glass is interposed, the external electrodes 18a and 18b do not have an influence on the dc electric field in the lamp inside produced by the internal electrodes 17c and 17d. Further, since the internal electrodes 17c and 17d are connected to each other in terms of ac, since the sealed vessel 11 of glass exists, the internal electrodes 17c and 17d do not have an influence on the ac electric field in the lamp inside produced by the external electrodes 18a and 18b. Accordingly, control of whether the dc driving circuit 22 and the ac driving circuit 26 should be rendered operative or inoperative can be performed readily on the primary side of low voltages while all of the secondary side windings are kept connected to the respective electrodes.

Further, by ac driving the external electrodes 18a and 18b, to which a high voltage is applied, only for a short period of time, sticking of dust to the external electrodes 18a and 18b can be prevented.

Furthermore, such external electrodes 18a and 18b as described above can be formed readily by disposing a conductor foil on an outer periphery of the cold cathode fluorescent lamp which has the internal electrodes 17c and 17d.

It is to be noted that, where the polarities when the dc voltage Vdc is applied to the internal electrodes 17c and 17d are always fixed, for example, such that the internal electrode 17d is set as a cathode to which a lower potential is to be applied, it is sufficient if only the internal electrode 17d is formed from an electron emitting material. While an arrow mark applied to the cold cathode fluorescent lamp 10 in FIG. 2 indicates the direction of current produced when the dc voltage Vdc is applied, where dc current is applied in the direction of the arrow mark shown in FIG. 2, it is sufficient if the internal electrode 17d is formed from an electron emitting material.

Though not shown, the cold cathode fluorescent lamp apparatus 20 of the first embodiment may use a separately excited inverter circuit wherein a driving circuit is connected to the bases of the transistors Q21, Q22, Q61 and Q62 without connecting the primary side windings N23 and N63 of the oscillation and conversion transformer and the resistors R21, R22, R61 and R62 such that the transistors Q21 and Q22 are complementarily turned on and off with their resonance frequency and the transistors Q61 and Q62 are complementarily turned on and off with their resonance frequency.

In this instance, since the bases of the transistors Q21, Q22, Q61 and Q62 are controlled by logic circuits which consume very low power, the voltage values of the dc voltage Vdc and the ac voltage Vac can be controlled to 0 V readily by controlling the bases of the transistors Q21 and Q22 so that the transistors Q21 and Q22 are switched off and controlling the bases of the transistors Q61 and Q62 so that the transistors Q61 and Q62 are switched off.

Figure 7:
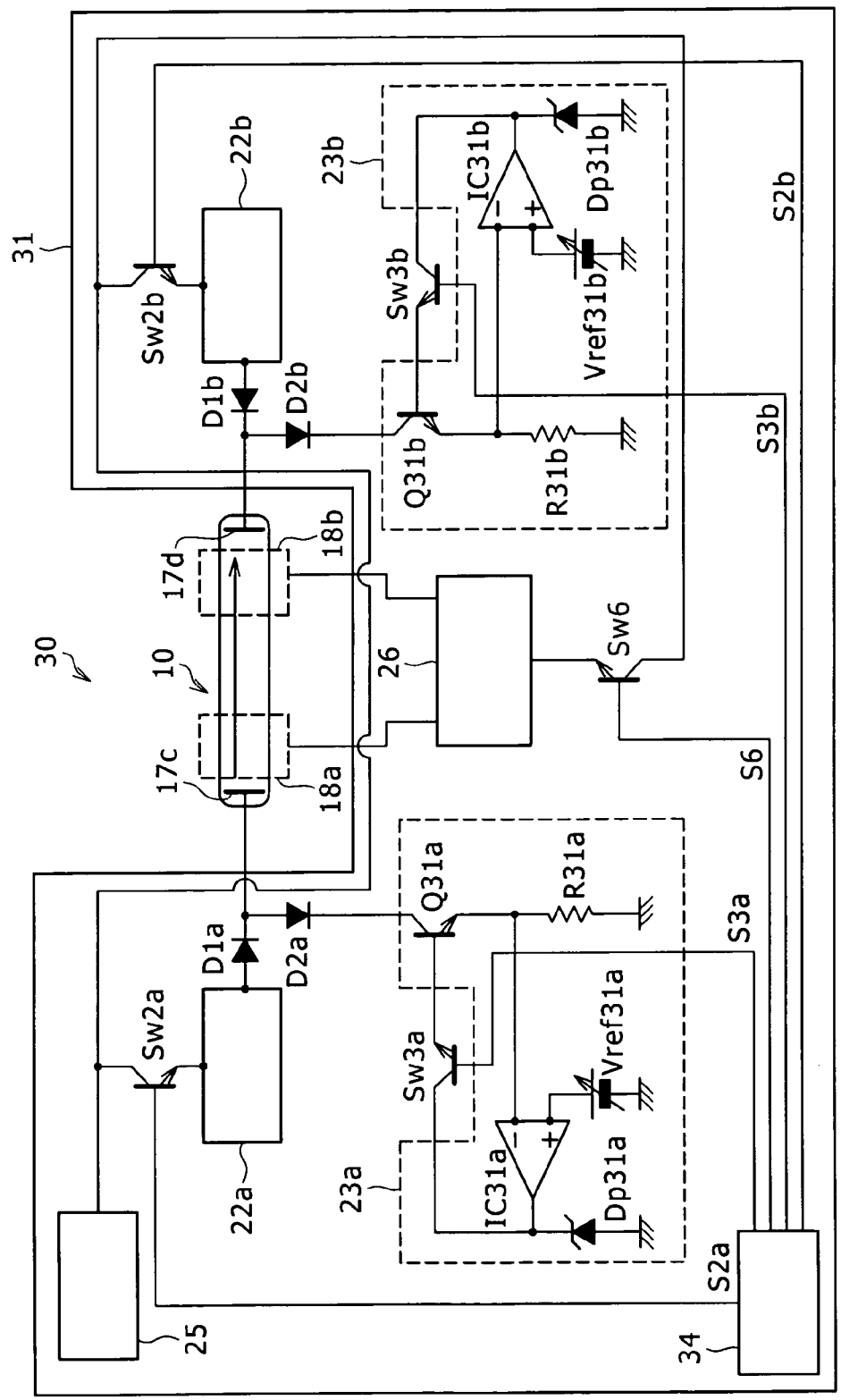
FIG. 7 is a circuit diagram showing a cold cathode fluorescent lamp apparatus according to a second embodiment of the present invention.

Now, a cold cathode fluorescent lamp apparatus 30 according to a second embodiment of the present invention is described with reference to FIG. 7.

The cold cathode fluorescent lamp apparatus 30 includes a cold cathode fluorescent lamp 10 and a cold cathode fluorescent lamp driving apparatus 31. The cold cathode fluorescent lamp driving apparatus 31 in turn includes a power supply 25, dc driving circuits 22a and 22b, an ac driving circuit 26, constant current circuits 23a and 23b, diodes D1a, D1b, D2a and D2b, a changeover control circuit 34, and switch elements Sw2a, Sw2b and Sw6.

The cold cathode fluorescent lamp 10 and the ac driving circuit 26 have individually similar configurations to those in the first embodiment described hereinabove, and therefore, overlapping description thereof is omitted herein to avoid redundancy. Further, the dc driving circuits 22a and 22b are configured and operate substantially similarly to the dc driving circuit 22 described hereinabove and also the diodes D1a and D1b are configured and operate similarly to the diode D1 described hereinabove and besides the diodes D2a and D2b are configured and operate similarly to the diode D2 described hereinabove. Therefore, overlapping description of the configurations and operations o# the dc driving circuits 22a and 22b and diodes D1a, D1b, D2a and d2b is omitted herein to avoid redundancy.

However, in the cold cathode fluorescent lamp apparatus 30 of the present embodiment, since a dc voltage Vdc whose polarity varies alternately is applied to the internal electrodes 17c and 17d, both of the internal electrodes 17c and 17d are formed from an electron emitting material. Further, although the bases of the transistors Q31a and Q31b disposed in the constant current circuits 23a and 23b are connected not directly but through switch elements Sw3a and Sw3b to the outputs of the operational amplifiers IC31a and IC31b, respectively, the remaining configuration of the constant current circuits 23a and 23b is similar to that of the constant current circuit 23. All elements to which the suffix a or b is added in the constant current circuits 23a and 23b, that is, the transistors Q31a and Q31b, operational amplifiers IC31a and IC31b, resistors R31a and R31b, reference voltage sources Vref31a and Vref31b, and Zener diodes Dp31a and Dp31b, are configured and operate similarly to the elements to which no such suffix is added in the constant current circuit 23 described hereinabove, and therefore, overlapping description of them is omitted herein to avoid redundancy.

In the present embodiment, the changeover control circuit 34 and the switch elements Sw2a, Sw2b, Sw3a and Sw3b form an example of a changeover circuit. The changeover control circuit 34 outputs signals S2a, S2b, S3a, S3b and S6 for controlling the switch elements Sw2a, Sw2b, Sw3a, Sw3b and Sw6, respectively. Operation of the cold cathode fluorescent lamp apparatus 30 of the second embodiment is described below with reference timing charts of the signals mentioned illustrated in FIGS. 8A to 8C.

Figure 8:
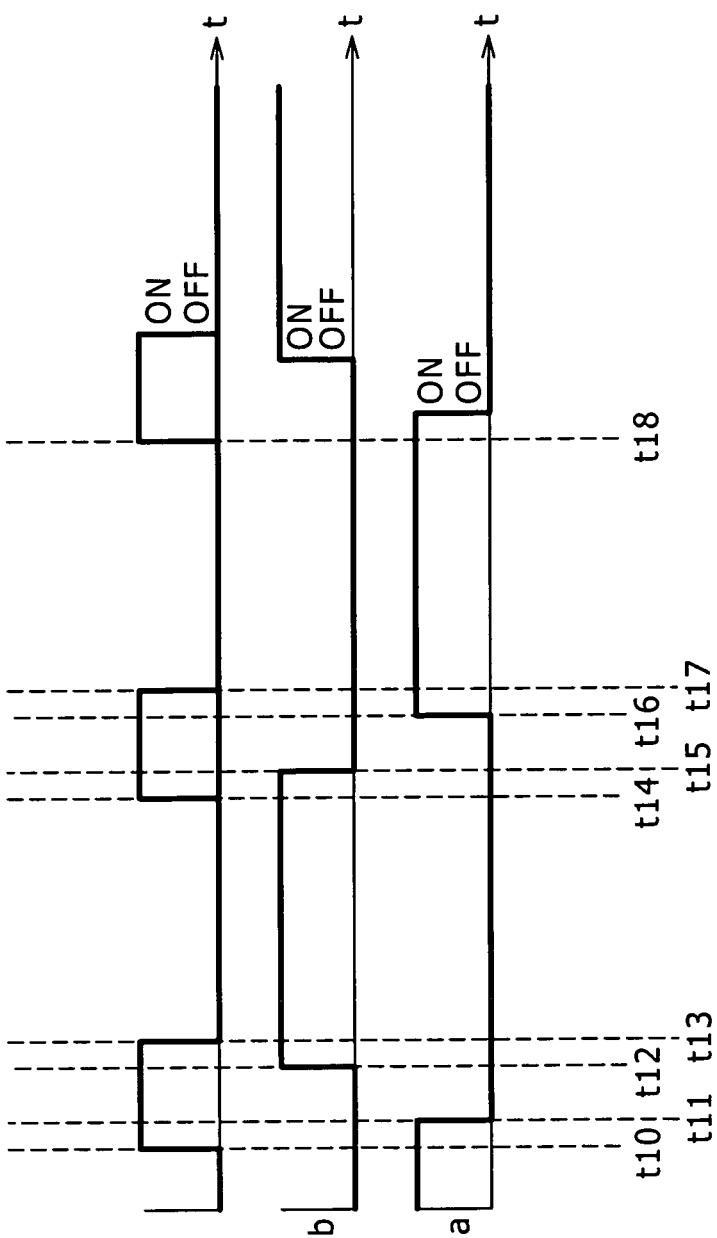
FIGS. 8A to 8C are timing charts of the cold cathode fluorescent lamp apparatus of FIG. 7.

In FIGS. 8A to 8C, the axis of abscissa indicates time t, and FIG. 8A illustrates the signal S6; FIG. 8B illustrates the signals S2a and S3b; and FIG. 8C illustrates the signals S2b and S3a. All of the signal S6, S2a, S3b, S2b and S3a control the switch elements Sw6, Sw2a, Sw3b, Sw2b and Sw3a to an on state when they have the high level (higher level in FIGS. 8A to 8C), but control the switch elements Sw6, Sw2a, Sw3b, Sw2b and Sw3a to an off, state when they have the low level (lower level in FIGS. 8A to 8C).

At time t10 at which the signal S6 changes to the high level, the switch element Sw6 is switched on, and consequently, the ac driving circuit 26 is rendered operative to perform ac lighting of the cold cathode fluorescent lamp 10. At this time, since the switch elements Sw2b and Sw3a are already in an on state, the dc driving circuit 22b and the constant current circuit 23a operate to perform ac lighting in an overlapping relationship with the dc lighting. It is to be noted that the time t10 at which the signal S6 changes to the high level and the time at which the ac lighting starts exhibit a difference therebetween in response to the period of time before the operation of the ac driving circuit 26 starts and the time at which collision between electrons and gas starts. However, the following description is given under the assumption that the period of time mentioned above is so short that it can be ignored. Similarly, although also the time at which the signals S2a, S3b, S2b and S3a change to the high level and the time at which dc lighting starts exhibit a difference in response to the time at which operation of the dc driving circuit 22 starts, the following description is given under the assumption that the period of time is so short that it can be ignored.

Then, although the switch elements Sw2b and Sw3a are switched off at time till and consequently the operation of the dc driving circuit 22b and the constant current circuit 23a is stopped to end the dc lighting, the ac lighting of the cold cathode fluorescent lamp 10 is continued.

Then at time t12, the switch elements Sw2a and Sw3b are switched on to start operation of the dc driving circuit 22a and the constant current circuit 23b, and also dc lighting of the cold cathode fluorescent lamp 10 is started in an overlapping relationship with the ac driving.

Then at time t13 at which the signal S6 changes to the low level, the switch element Sw6 is switched off. Consequently, the operation of the ac driving circuit 26 stops, but only the dc lighting of the cold cathode fluorescent lamp 10 is continued.

Then at time t14 at which the signal S6 changes to the high level, the switch element Sw2 is switched on. Consequently, the ac driving circuit 26 operates, and also ac driving is started simultaneously in an overlapping relationship with the dc lighting of the cold cathode fluorescent lamp 10.

Then at time t15, the switch elements Sw2a and Sw3b are switched off. Consequently, the operation of the dc driving circuit 22a and the constant current circuit 23b stops and the dc lighting stops. However, the ac lighting of the cold cathode fluorescent lamp 10 is continued.

Then at time t16, the switch elements Sw2b and Sw3a are switched on. Consequently, the operation of the dc driving circuit 22b and the constant current circuit 23a is started, and also dc lighting of the cold cathode fluorescent lamp 10 is started in an overlapping relationship with the ac lighting.

Then at time t17 at which the signal S6' changes to the low level, the switch element Sw6 is switched off. Consequently, the operation of the ac driving circuit 26 stops, and only the dc lighting of the cold cathode fluorescent lamp 10 is continued.

Then at time t18, one cycle is completed, and the same series of operations which starts at time t10 is repeated cyclically. At this time, the direction of current flowing through the cold cathode fluorescent lamp 10 within the period of time from time t13 to time t14 and the direction of current flowing through the cold cathode fluorescent lamp 10 within the period of time from time t17 to time t18 are opposite to each other.

The cold cathode fluorescent lamp apparatus 30 of the second embodiment described above achieves a similar effect to that achieved by the cold cathode fluorescent lamp apparatus 20 of the first embodiment described hereinabove. In particular, the cold cathode fluorescent lamp apparatus 30 can solve the problem that ac current from the ac driving circuit 26 flows as leak current to a floating capacitance formed between the cold cathode fluorescent lamp 10 and a member provided around the cold cathode fluorescent lamp 10 such as a reflecting member, a diffusing plate and so forth, and can achieve effective utilization of the driving power.

In particular, in the cold cathode fluorescent lamp apparatus 30 of the second embodiment, the period of the variation of the voltage polarity of the dc voltage Vdc to be applied to the internal electrodes 17c and 17d is set longer (the frequency of the variation of the voltage polarity is set lower) than the period of the ac voltage so that the ac voltage can be regarded as a dc voltage except at each changeover point of the polarity. Consequently, even if a floating capacitance exists, since the frequency of the variation of the voltage polarity is low, the reactance which the floating capacitance has is raised to almost the infinite thereby to almost establish an insulating state. Therefore, the leak current can be reduced.

Further, the cold cathode fluorescent lamp apparatus 30 of the second embodiment prevents appearance of a condition that, even where the cold cathode fluorescent lamp 10 adopted has an increased length, within a period of time within which dc lighting continues, leak current appears intermediately in the longitudinal direction of the cold cathode fluorescent lamp 10 and gives rise to variation of the light emission amount at different portions in the longitudinal direction, resulting in difference in brightness among different portions of the cold cathode fluorescent lamp 10. Consequently, uniform brightness can be achieved with the cold cathode fluorescent lamp apparatus 30.

Further, the cold cathode fluorescent lamp apparatus 30 of the second embodiment achieves the following effects which are not achieved by the cold cathode fluorescent lamp apparatus 20 of the first embodiment. In particular, if complete dc lighting of the cold cathode fluorescent lamp 10 wherein current flows only in one direction from the internal electrode 17c to the internal electrode 17d or reversely from the internal electrode 17d to the internal electrode 17c is performed in order to prevent leak current, then gas filled in the lamp inside of the cold cathode fluorescent lamp 10, for example, mercury gas, is one-sided, resulting in loss of the discharge balance in the cold cathode fluorescent lamp 10. This gives rise to a problem that the emitted light does not exhibit the color of white. However, if the polarity of the dc voltage Vdc is varied in such a manner as described above, then appearance of the phenomenon just described can be prevented.

Further, where current flows always in one direction from one to the other of the internal electrodes without reversing the polarity, there is a problem that deterioration of an electrode occurs in a concentrated manner on one of the electrodes on one side and this decreases the service life of the lamp. However, the cold cathode fluorescent lamp apparatus 30 can prevent occurrence of such a problem as just described because the direction of current in dc lighting is reversed alternately after every one half of a predetermined period.

This is described more particularly. The power loss by leak current can be reduced if the length of one period in dc lighting (length from time t10 to time t18 of FIGS. 8A to 8C) is set sufficiently longer than the period of time of ac lighting (length from time t10 to time t13 in FIGS. 8A to 8C, and length from time t14 to time t17 in FIGS. 8A to 8C). The magnitude of the power loss in this instance decreases as the ratio between the length of one cycle in dc lighting and the period of time of ac lighting increases.

In the cold cathode fluorescent lamp apparatus 30 of the second embodiment, for example, the length of one period in dc lighting was set to approximately 16.7 milliseconds, and the period of time of ac driving was set td approximately 0.5 milliseconds. At this time, the frequency of the ac supplied to the ac driving circuit 26 was set to approximately 30 kHz (kilohertz) to 50 kHz.

A cold cathode fluorescent lamp which is based on a principle similar to that of the cold cathode fluorescent lamp apparatus 20 of the first embodiment or the cold cathode fluorescent lamp apparatus 30 of the second embodiment described hereinabove can be used as a cold cathode fluorescent lamp apparatus (backlight apparatus) as a light source of a liquid crystal display apparatus.

Figure 9:
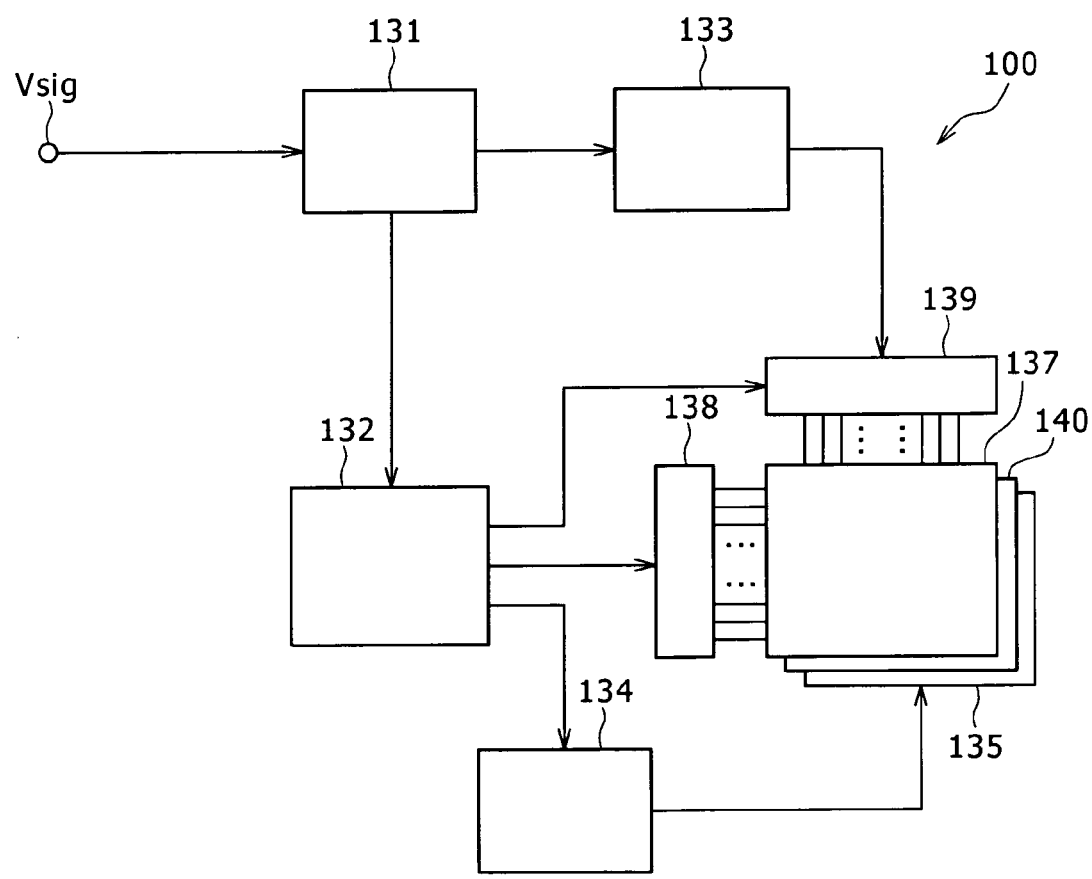
FIG. 9 is a block diagram showing a liquid crystal display apparatus according to the first embodiment of the present invention.

FIG. 9 is a block diagram of a liquid crystal display apparatus 100 which is an example of a liquid crystal display apparatus. Referring to FIG. 9, the liquid crystal display apparatus 100 includes an image processing section 131, a liquid crystal display apparatus control section 132, an image memory 133, and a changeover circuit 134. The liquid crystal display apparatus 100 further includes a backlight assembly section 135, an optical sheet and diffusing plate 140, a liquid crystal display panel 137, a Y driver 138, and an X driver 139. It is to be noted that, in the present embodiment, the changeover circuit 134 and the backlight assembly section 135 are an example of a cold cathode fluorescent lamp apparatus (backlight apparatus) of a liquid crystal display apparatus.

A configuration and operation of the liquid crystal display apparatus 100 having the components mentioned above are described briefly. When an image signal Vsig is inputted to the image processing section 131, the image processing section 131 demultiplexes the image signal Vsig into an image data signal and a synchronizing signal and transfers an image data signal for the X direction (horizontal scanning direction) to the image memory 133 for each one scanning line. Further, the image processing section 131 sends the synchronizing signal to the liquid crystal display apparatus control section 132. Furthermore, the image processing section 131 signals control signals for controlling the Y driver 138 and the X driver 139 and signals a control signal for controlling the changeover circuit 134.

Light emitted from the backlight assembly section 135 is optically processed by the optical sheet and diffusing plate 140 and projected to the rear face of the liquid crystal display panel 137. In the liquid crystal display panel 137, a horizontal scanning line for displaying an image is selected for each one line by the Y driver 138, and the amount of transmission light is controlled in accordance with the value stored in the image memory 133 by the X driver 139. Consequently, an image according to the image signal Vsig appears on the surface of the liquid crystal display panel 137. In other words, an image according to the image signal Vsig is displayed on the liquid crystal display panel 137. The display position is based on the synchronizing signal included in the image signal Vsig.

Figure 10:
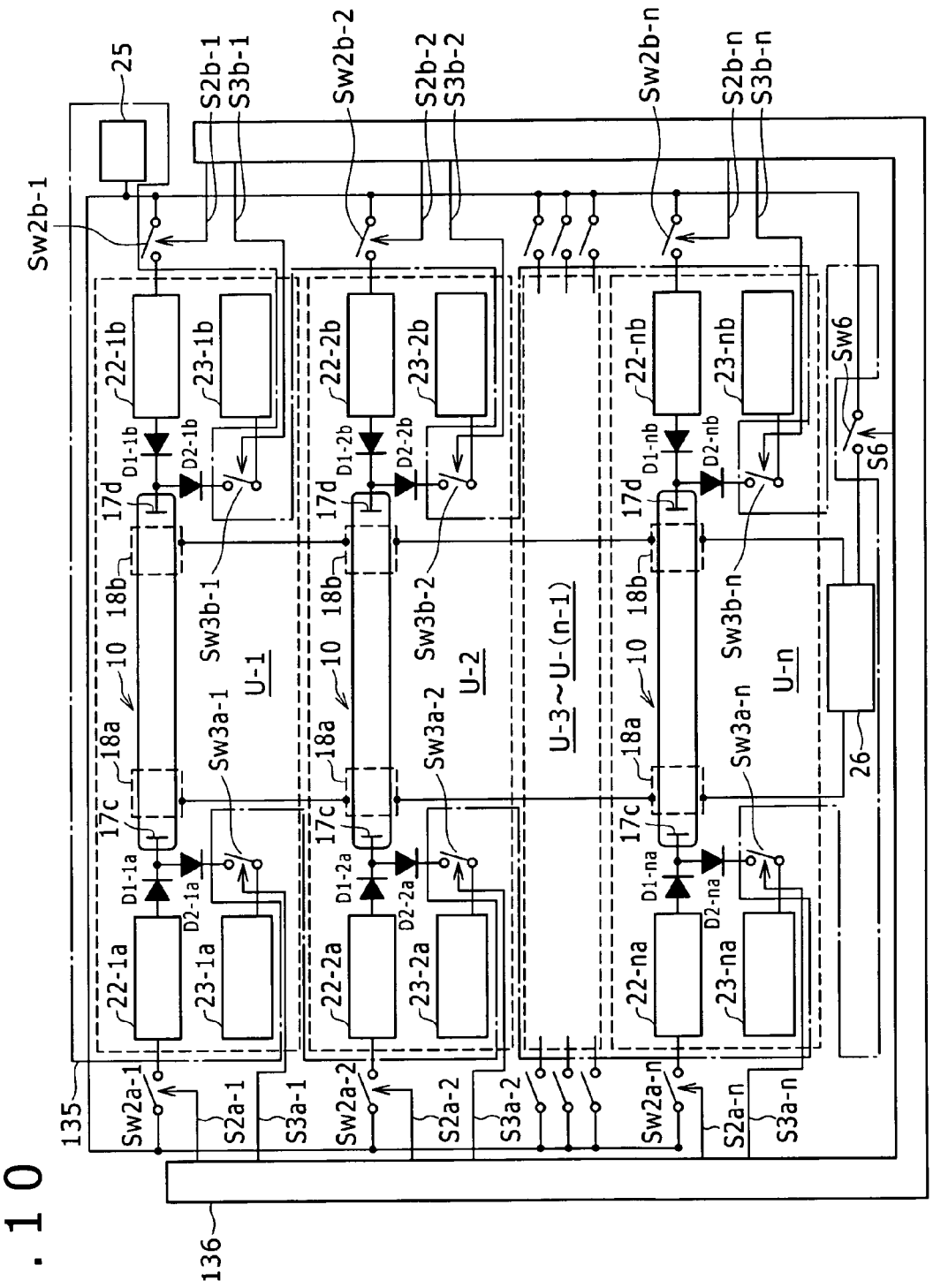
FIG. 10 is a circuit diagram showing a cold cathode fluorescent lamp apparatus used in the liquid crystal display apparatus of FIG. 9.

The backlight assembly section 135 and the changeover circuit 134 (which is not shown in FIG. 10) which are components of the cold cathode fluorescent lamp apparatus used in the liquid crystal display apparatus 100 are described with reference to FIG. 10. The backlight assembly section 135 includes n backlight units U-1 to U-n each of which includes a cold cathode fluorescent lamp 10 (totaling n cold cathode fluorescent lamps 10) and a driving circuit for the cold cathode fluorescent lamp 10 (totaling n driving circuits having the same configuration). The cold cathode fluorescent lamps 10 are disposed in parallel to each other and in a spaced relationship from each other by an equal distance on a plane. Further, the cold cathode fluorescent lamps 10 are disposed such that the longitudinal direction thereof substantially coincides with the horizontal scanning line direction of the liquid crystal display panel 137, and the plane on which the cold cathode fluorescent lamps 10 are disposed extend substantially in parallel to the liquid crystal display panel 137 and the optical sheet and diffusing plate 140. Here, n may be one or an arbitrary plural number, and the backlight assembly section 135 can include n backlight units. It is to be noted that, where n is 1, the configuration of the backlight assembly section 135 is similar to that shown in FIG. 7.

In the following, description is given of the backlight unit U-1 (refer to FIG. 10) which is regarded as a representative one of the n backlight units which form the backlight assembly section 135 and have the same configuration.

The backlight unit U-1 includes a cold cathode fluorescent lamp 10, a power supply 25, dc driving circuits 22-1$a$ and 22-1$b$, constant current circuits 23-1$a$ and 23-1$b$, diodes D1-1$a$, D1-1$b$, D2-1$a$ and D2-1$b$, and switch elements Sw2-1$a$, Sw2-1$b$, Sw6, Sw3-1$a$ and Sw3-1$b$.

The cold cathode fluorescent lamp 10 has a configuration same as that in the first embodiment and overlapping description thereof is omitted herein to avoid redundancy. Further, the dc driving circuits 22-1$a$ and 22-1$b$ have a configuration similar to that of and operate similarly to the dc driving circuit 22 in the first embodiment, and the diodes D1-1$a$ and D1-1$b$ have a configuration similar to that of and operate similarly to the diode D1 in the first embodiment. Further, the diodes D2-1$a$ and D2-1$b$ have a configuration similar to that of and operate similarly to the diode D2. Therefore, overlapping description of the dc driving circuits 22-1$a$ and 22-1$b$ and diodes D1-1$a$, D1-1$b$, D2-1$a$ and D2-1$b$ is omitted herein to avoid redundancy.

The constant current circuits 23-1$a$ and 23-1$b$ have a configuration different from that of the constant current circuits 23$a$ and 23$b$ in the second embodiment. In particular, the constant current circuits 23-1$a$ and 23-1$b$ do not include the switch elements Sw3$a$ and Sw3$b$ connected to the bases of the transistors Q31$a$ and Q31$b$ in the constant current circuits 23$a$ and 23$b$, respectively, but the bases of the transistors Q31$a$ and Q31$b$ are connected directly to the output terminal of the operational amplifier IC31$a$. Further, switches which operate substantially similarly to the switch elements Sw3$a$ and Sw3$b$ are provided on the collector side of the transistors Q31$a$ and Q31$b$, respectively. The switch corresponding to the switch element Sw3$a$ is the switch element Sw3$a$-1, and the switch corresponding to the switch element Sw3$b$ is the switch element Sw3$b$-1.

Further, the power supply 25 and the ac driving circuit 26 are used commonly to the n backlight units U-1 to U-n. In particular, the n backlight units U-1 to U-n receive power from the power supply 25, and all external electrodes 18$a$ and 18$b$ of the n cold cathode fluorescent lamps 10 are connected to the single ac driving circuit 26.

The changeover circuit 134 (not shown in FIG. 10, refer to FIG. 9) includes a changeover control circuit 136 and switch elements Sw2$a$-1 to Sw2$a$-n, Sw2$b$-1 to Sw2$b$-n, Sw3$a$-1 to Sw3$a$-n, and Sw3$b$-1 to Sw3$b$-n. The changeover circuit 134 produces signals S2$a$-1 to S2$a$-n, S2$b$-1 to S2$b$-n, S3$a$-1 to S3$a$-n, S3$b$-1 to S3$b$-n and S6 to control the corresponding switch elements mentioned above.

In the liquid crystal, display apparatus 100 according to the first embodiment, various control schemes are possible depending upon the output timings of the signals S2$a$-1 to S2$a$-n, S2$b$-1 to S2$b$-n, S3$a$-1 to S3$a$-n, S3$b$-1 to S3$b$-n and S6. Thus, a control method of the first embodiment for the liquid crystal display apparatus 100 of the first embodiment, a control method of the second, embodiment for the liquid crystal display apparatus 100 of the first embodiment, a control method of the liquid crystal display apparatus of the second embodiment, configurations of other backlight assemblies for a liquid crystal display apparatus and other control schemes are described successively.

[Control Method of the First Embodiment for the Liquid Crystal Display Apparatus 100 of the First Embodiment]

A control method of the first embodiment for the liquid crystal display apparatus 100 of the first embodiment is described below with reference to FIGS. 11A to 11C. The control method expands the control method for the cold cathode fluorescent lamp apparatus 30 of the second embodiment described hereinabove with reference to FIGS. 8A to 8C and controls the n backlight units U-1 to U-n simultaneously.

Figure 11:
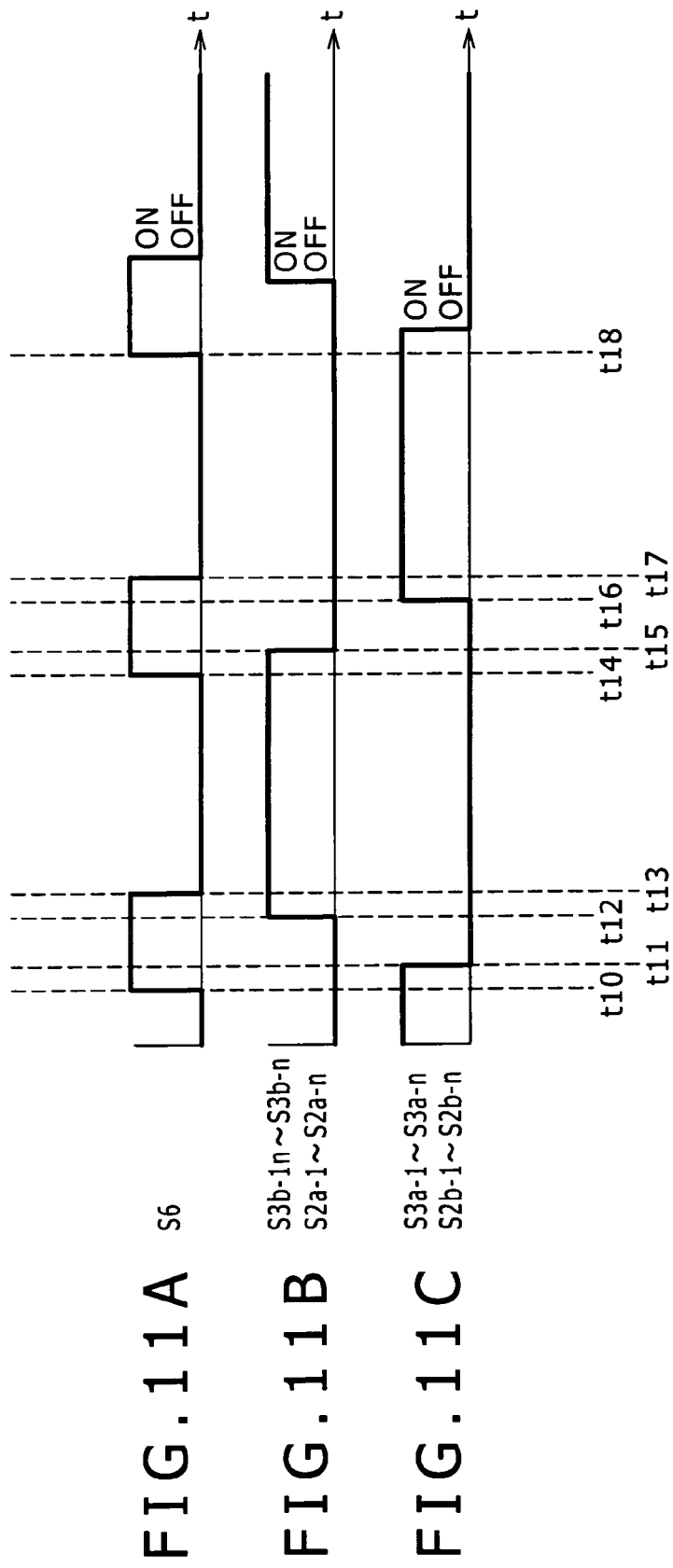
FIGS. 11A to 11C are timing charges of the cold cathode fluorescent lamp apparatus of FIG. 10.

The axis of abscissa in FIGS. 11A to 11C indicates time t, and FIG. 11A illustrates the signal S6; FIG. 11-B illustrates the signals S2$a$-1 to S2$a$-n and S3$b$-1 to S3$b$-n; and FIG. 11C indicates the signals S2$b$-1 to S2$b$-n and S3$a$-1 to S3$a$-n.

All of the signals S2$a$-1 to S2$a$-n, S2$b$-1 to S2$b$-n, S3$a$-1 to S3$a$-n, S3$b$-1 to S3$b$-n and S6 control the switch elements Sw2$a$-1 to Sw2$a$-n, Sw2$b$-1 to Sw2$b$-n, s Sw3$a$-1 to Sw3$a$-n, Sw3$b$-1 to Sw3$b$-n and Sw6, to an on state when they have the high level (higher level in FIGS. 11A to 11C), but control the switch elements Sw2$a$-1 to Sw2$a$-n, Sw2$b$-1 to Sw2$b$-n, Sw3$a$-1 to Sw3$a$-n, Sw3$b$-1 to Sw3$b$-n and Sw6 to an off state when they have the low level (lower level in FIGS. 11A to 11C).

Operation of the switch elements Sw2$a$-1 to Sw2$a$-n, Sw2$b$-1 to Sw2$b$-n, Sw3$a$-1 to Sw3$a$-n, Sw3$b$-1 to Sw3$b$-n and Sw6 as time passes is similar to that illustrated in FIGS. 8A to 8C, and therefore, overlapping description thereof is omitted herein to avoid redundancy. It is to be noted, however, that all of the n cold cathode fluorescent lamps 10 perform operation of starting and stopping of ac lighting, starting and stopping of dc lighting, and starting and stopping of dc lighting in which the direction of current is reversed from that in the dc lighting in the last cycle substantially simultaneously in a synchronized relationship with each other.

Even where such a control method of the first embodiment as just described is performed in the liquid crystal display apparatus 100 of the first embodiment, ac current from the ac driving circuit 26 flows as leak current for a very small period of time through the floating capacitance formed between the backlight assembly section 135 and reflecting members (not shown) and various optical members provided around the backlight assembly section 135 such as the optical sheet and diffusing plate 140 and so forth. However, if the period of variation of the voltage polarity of the dc voltage Vdc to be applied to the internal electrodes 17$c$ and 17$d$ disposed in all of the cold cathode fluorescent lamps 10 is set long, then even if the floating capacitance exists, since the frequency of variation of the voltage polarity is low, the reactance which the floating capacitance has is raised to a substantially infinite level and an almost insulating condition is established. Consequently, the leak current which flows through the liquid crystal display apparatus 100 can be reduced.

Further, if such a control method as described above is adopted, then also where the cold cathode fluorescent lamps 10 adopted have an increased length, within a period of time within which dc lighting continues, appearance of a condition can be prevented that leak current appears intermediately in the longitudinal direction of the cold cathode fluorescent lamp 10 within a period of time within which ac lighting is performed and gives rise to variation of the light emission amount at different portions in the longitudinal direction, resulting in difference in brightness among different portions of the cold cathode fluorescent lamp 10. Consequently, uniform brightness can be achieved with the control method. As a result, a clear image can be obtained without suffering from an uneven color which appears on the surface of the liquid crystal display panel 137.

Here, the length of one period in dc lighting (length from time t10 to time t18 in FIGS. 11A to 11C) and the length of one period in ac lighting (length from time t10 to time t13 and length from time t14 to time t17 in FIGS. 11A to 11C) are periods of time determined in advance. For example, the length of one period in dc lighting was set to approximately 16.7 milliseconds, and the length of one period in ac lighting was set to approximately 0.5 milliseconds. At this time, the frequency of the ac current to be supplied to the ac driving circuit 26 was set to approximately 30 kHz to 50 kHz.

[Control Method of the Second Embodiment for the Liquid Crystal Display Apparatus 100 of the First Embodiment]

The control method of the second embodiment for the liquid crystal display apparatus 100 of the first embodiment controls the n cold cathode fluorescent lamps 10 disposed in the backlight assembly section 135 in response to a synchronizing signal extracted from the image signal Vsig by the liquid crystal display apparatus control section 132.

The following description of the control method of the second embodiment for the liquid crystal display apparatus 100 of the first embodiment is given under the assumption that the image signal Vsig is an NTSC composite video-video signal used in television broadcasting in Japan. However, the application of the present embodiment is not limited to the NTSC composite video-video signal.

The NTSC composite video-video signal involves interlaced scanning and successively scans an image in a direction from an upper portion to a lower portion of the liquid crystal display panel 137. In the present embodiment, since data for one horizontal line (1H) are stored in the image memory 133, an image for 1H is displayed at a time on the liquid crystal display panel 137 by control of the X driver 139, and an image for 1H stored in the image memory 133 is updated successively. It is to be noted that the cycle frequency of horizontal scanning is 15.75 kHz, and therefore, the cycle period is approximately 63.5 microseconds.

Then, the place at which the image is displayed is successively shifted in a direction from an upper portion to a lower portion of the liquid crystal display panel 137 by the Y driver 138 to display a first field whose image is formed from one half of information. Thereafter, a second field whose image is formed from the remaining one half of the information. Thus, a first frame which is a single image is formed from the first and second fields. The number of horizontal scanning lines in one frame is 525. It is to be noted that the cycle frequency of the first and second fields is 60 Hz, that is, the cycle period is approximately 16.7 milliseconds, and the cycle frequency of one frame is 30 Hz, that is, the cycle period of one frame is approximately 33.3 milliseconds.

However, not all of the horizontal scanning lines are displayed on the liquid crystal display panel 137, but approximately 483 scanning lines are displayed while the remaining 42 horizontal scanning lines do not appear on the liquid crystal display panel 137 but provide a vertical blanking period. The length of the period is approximately 2.6 milliseconds in one frame. Accordingly, where the progressive scanning is used, approximately 2.6 milliseconds can be, assured as a period of time, within which no image is displayed on the liquid crystal display panel 137, but where the interlaced scanning is used, a period of time equal to one half that in the case of the progressive scanning, that is, approximately 1.3 milliseconds, can be assured. It is to be noted that the liquid crystal display apparatus 100, can control the Y driver 138 to perform progressive scanning if it includes a memory of a capacity for two and one half frames.

Figure 12:
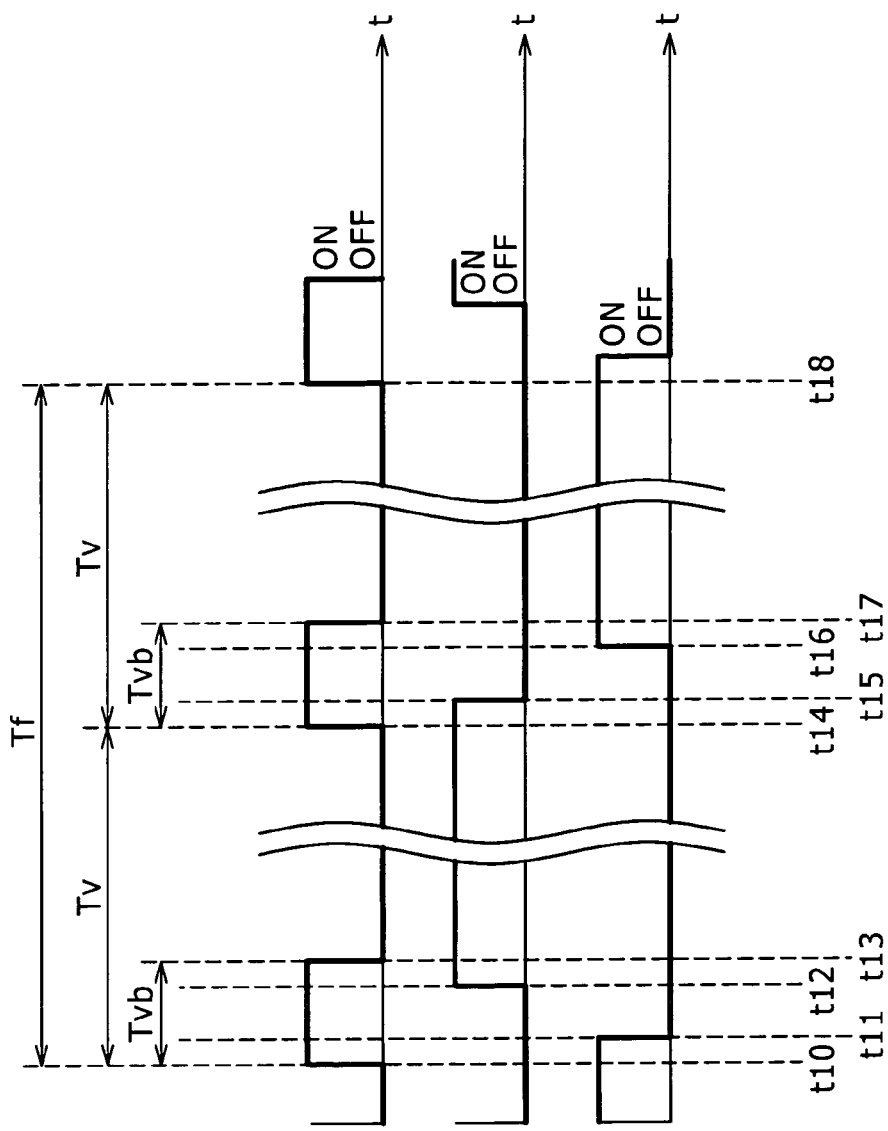
FIGS. 12A to 12C are timing charts of the liquid crystal display apparatus of FIG. 9.

Now, a relationship between a vertical synchronizing signal in the interlaced scanning and signals for controlling the switch elements is described with reference to FIGS. 12A to 12C. In particular, FIG. 12A illustrates the signal S6; FIG. 12B illustrates the signals S2a-1 to S2a-n and S3b-1 to S3b-n; and FIG. 12C illustrates the signals S2b-1 to S2b-n and S3a-1 to S3a-n. When the signals mentioned have the high level (higher level in FIGS. 12A to 12C), the corresponding switch elements exhibit an on state, and when the signals have the low level (lower level in FIGS. 12A to 12C), the corresponding switch elements exhibit an off state.

Referring to FIGS. 12A to 12C, a period Tf corresponds to one frame and is approximately 33.3 milliseconds; another period Tv corresponds to one field and is approximately 16.7 milliseconds; and a further period Tvb corresponds to a vertical blanking period and is approximately 1.3 milliseconds. Within the period Tf of one frame, each of the periods Tv and Tvb appear twice.

It is to be noted that, though not shown in the drawings, where the progressive scanning is used, each of the periods Tv and Tvb appears once within one frame, and the periods Tf and Tv are equal to each other and approximately 16.7 milliseconds while the period Tvb is approximately 1.3 milliseconds.

The second control method of, the second embodiment for the liquid crystal display apparatus 100 of the first embodiment is generally configured such that it uses the changeover circuit to perform such control as to reverse the polarity of the dc voltage from the dc driving circuit in synchronism with the period Tvb which is a blanking period of the vertical synchronizing signal from the synchronizing signal extraction circuit in this manner.

Where such control as just described is performed, the period Tvb in which a changeover point between ac driving and dc driving and a changeover point of the direction of current in the dc driving are included is a vertical blanking period. Therefore, light from the cold cathode fluorescent lamp 10 does not pass through the liquid crystal display panel 137. As a result, the polarity of the dc voltage Vdc can be changed over without causing any change in light amount of the image to be displayed on the liquid crystal display panel 137.

[Control Method of the Liquid Crystal Display Apparatus (not Shown) of the Second Embodiment]

Figure 13:
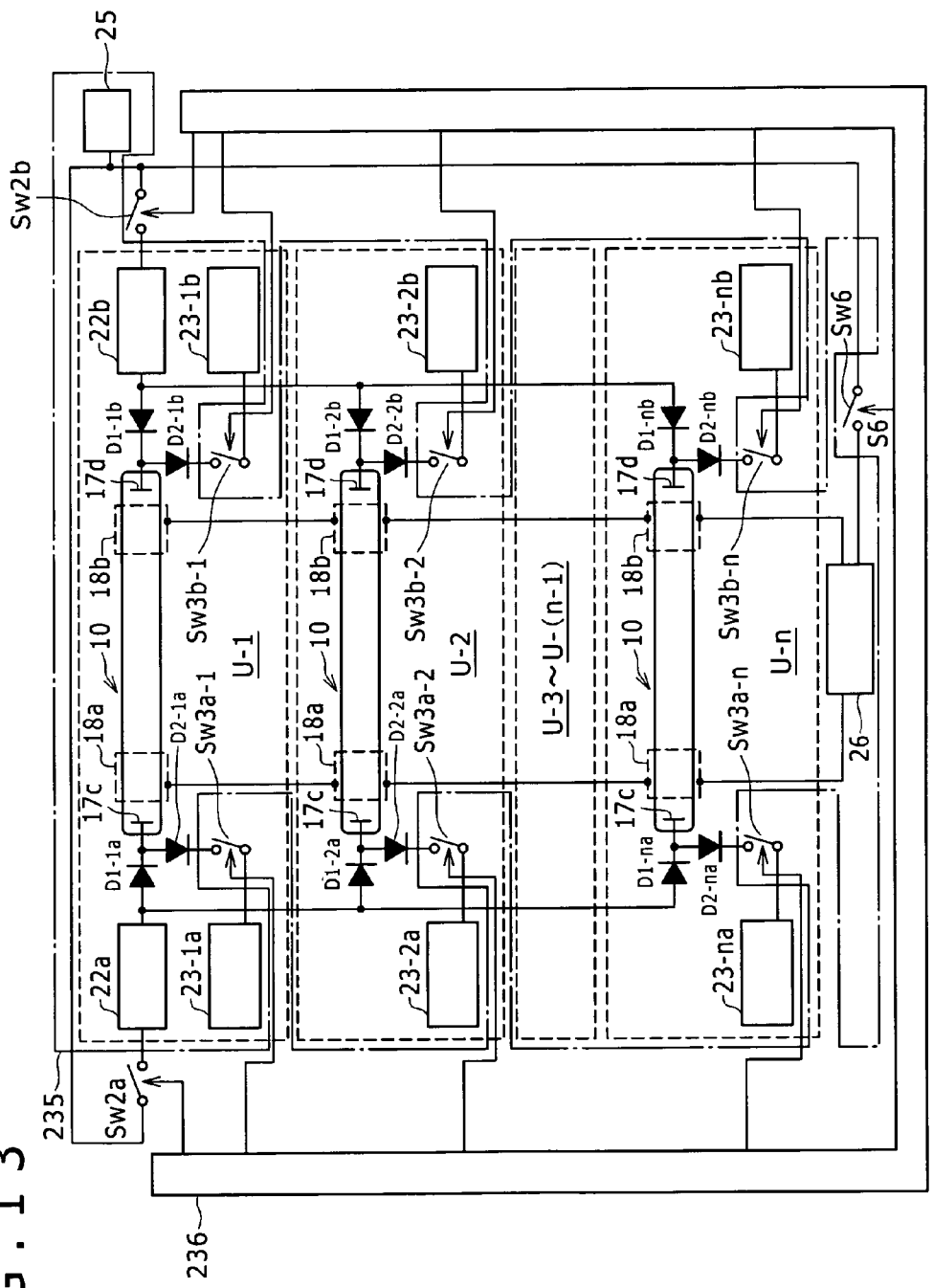
FIG. 13 is a circuit diagram showing a cold cathode fluorescent lamp apparatus used in a liquid crystal display apparatus according to the second embodiment of the present invention.

A liquid crystal display apparatus (not shown) of the second embodiment is described. The liquid crystal display apparatus of the second embodiment uses a backlight assembly section 235 and a changeover control circuit 236 shown in FIG. 13 in place of the backlight assembly section 135 and the changeover control circuit 136 shown in FIG. 10. Further, the liquid crystal display apparatus of the second embodiment uses only a switch element Sw2a in place of the switch elements Sw2a-1 to Sw2a-n and uses only a switch element Sw2b in place of the switch elements Sw2b-1 to Sw2b-n. Further, dc power is supplied from dc driving circuits 22a and 22b provided in the backlight unit U-1 to the backlight units U-2 to U-n without using the dc driving circuits 22-1a to 22-na and the dc driving circuits 22-1b to 22-nb in the n backlight units U-1 to U-n. In other words, the liquid crystal display apparatus is configured such that, although the uniformity in configuration among the backlights is lost, the number of parts in the entire apparatus is decreased.

In the present embodiment, the changeover control circuit 236 and the switch elements Sw2a and Sw2b, Sw3a-1 to Sw3a-n and Sw3b-1 to Sw3b-n form an example of the changeover circuit.

The liquid crystal display apparatus of the second embodiment is different from the liquid crystal display apparatus 100 of the first embodiment only in the backlight assembly section 235 and the changeover circuit which includes the changeover control circuit 236. Particularly, the differences are that the number of dc driving circuits in the backlight assembly section 235 in the second embodiment is reduced from 2n to 2 and that the number of switch elements for controlling the dc driving circuits is reduced from 2n to 2.

In the liquid crystal display apparatus of the second embodiment, one of the switch elements Sw2a and Sw2b is switched on and the switch elements Sw3b-1 to Sw3b-n are switched on in synchronism with the switching on of the switch element Sw2a or the switch elements Sw3a-1 to Sw3a-n are switched on in synchronism with the turning on of the switch element Sw2b to dc light the corresponding cold cathode fluorescent lamps 10.

By performing such operation as described above, control of lighting of the cold cathode fluorescent lamps 10 can be achieved by means of a reduced number of dc driving circuits and switch elements. In particular, if, in the timing charts of FIGS. 11A to 12C, only the switch element Sw2a is controlled in place of the switch elements Sw2a-1 to Sw2a-n and only the switch element Sw2b is controlled in place of the switch elements Sw2b-1 to Sw2b-n, then control for lighting of the cold cathode fluorescent lamp 10 quite similar to the control methods of the first and second embodiments of the liquid crystal display apparatus 100 of the first embodiment can be achieved.

In particular, one of the switch elements Sw2a and Sw2b can be switched on to individually control the current to flow through the plural cold cathode fluorescent lamps 10 by means of a plurality of the constant current circuits of 23-1a to 23-na and 23-1b to 23-nb.

[Other Configurations of the Backlight Assembly Section]

The configuration of the backlight assembly section is not limited to those of the backlight assembly section 135 or 235 but may have various forms. For example, the backlight assembly section may be configured such that n backlight units are divided into groups each including a plural number of backlight units equal to or greater than two while a dc driving circuit for supplying current in the opposite directions to a cold cathode fluorescent lamp 10 is provided for each of the groups.

Further, the backlight assembly section may be configured such that n backlight units are divided into groups each including one or a plurality of backlight units, and one constant current driving circuit for supplying current in the opposite directions to a cold cathode fluorescent lamp 10 is provided for each of the groups. In this instance, the direction in which current is to be supplied to each cold cathode fluorescent lamp 10 may be selected by control of switching on/off of 2n dc driving circuits each for supplying current in the opposite directions to a cold cathode fluorescent lamp 10.

Furthermore, the backlight assembly section may be configured such that one ac driving circuit is provided for each n backlight units and wiring lines from the ac driving circuits to the external electrodes 18a and 18b are formed with a minimized length to further reduce leak current in ac driving. Or, the backlight assembly section may be configured otherwise such that n backlight units are divided into groups each including two or more backlight units to achieve optimization of the number of ac driving circuits and the magnitude of leak current as well as the facility in control of the ac driving circuit.

Whichever one of the configurations described above is used, the control therefor is dealt with suitably by the changeover circuit. However, the effect that the control is facilitated by performing changeover on the primary side of a low voltage and the effect that leak current is reduced by adopting both of ac driving and dc driving are not lost. Also such changeover circuits are disposed suitably in accordance with ac driving, dc driving and the number and the form of arrangement of constant current circuits.

[Other Control Methods]

Not only the control methods described above but also other various control methods are possible with the liquid crystal display apparatus 100 of the first embodiment and the liquid crystal display apparatus of the second embodiment. Therefore, several other exemplary control methods are described below.

[Control Method of Individually Turning Off Some of a Plurality of Cold Cathode Fluorescent Lamps 10]

Figure 14:
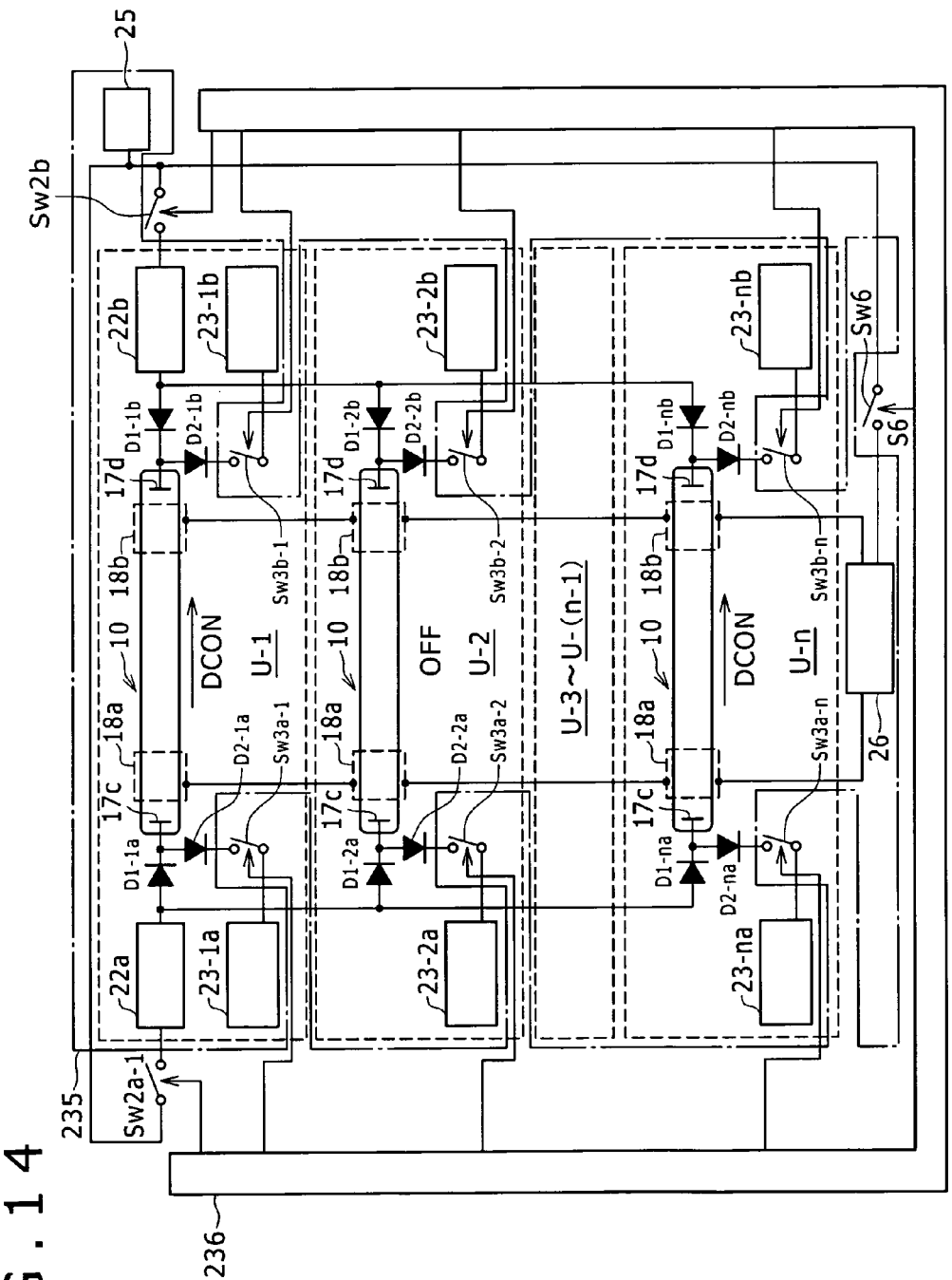
FIG. 14 is a circuit diagram showing another cold cathode fluorescent lamp apparatus used in the liquid crystal display apparatus according to the second embodiment.

An example of control of selective turning off of some of the cold cathode fluorescent lamps 10 when the voltage polarity of the cold cathode fluorescent lamps 10 disposed in the backlight assembly section 135 or 235 is changed over is shown in FIG. 14. In FIG. 14, reference character DCON applied below any of the cold cathode fluorescent lamps 10 in FIG. 14 schematically represents that the cold cathode fluorescent lamp 10 is in a dc lit state.

Referring to FIG. 14, it can be seen that the switch elements Sw3a-2 and Sw3b-2 are switched off so that the cold cathode fluorescent lamp 10 of the backlight unit U-2 does not emit light. If such a control method as just described is adopted, then the speed of response and the contrast of an image displayed on the liquid crystal display panel 137 can be improved visually. It is to be noted that which one of the backlight units U-1 to U-n should be turned off is suitably selected by the changeover control circuit 236.

[Control Method of Individually Lighting Some of a Plurality of Cold Cathode Fluorescent Lamps 10 Successively]

Figure 15:
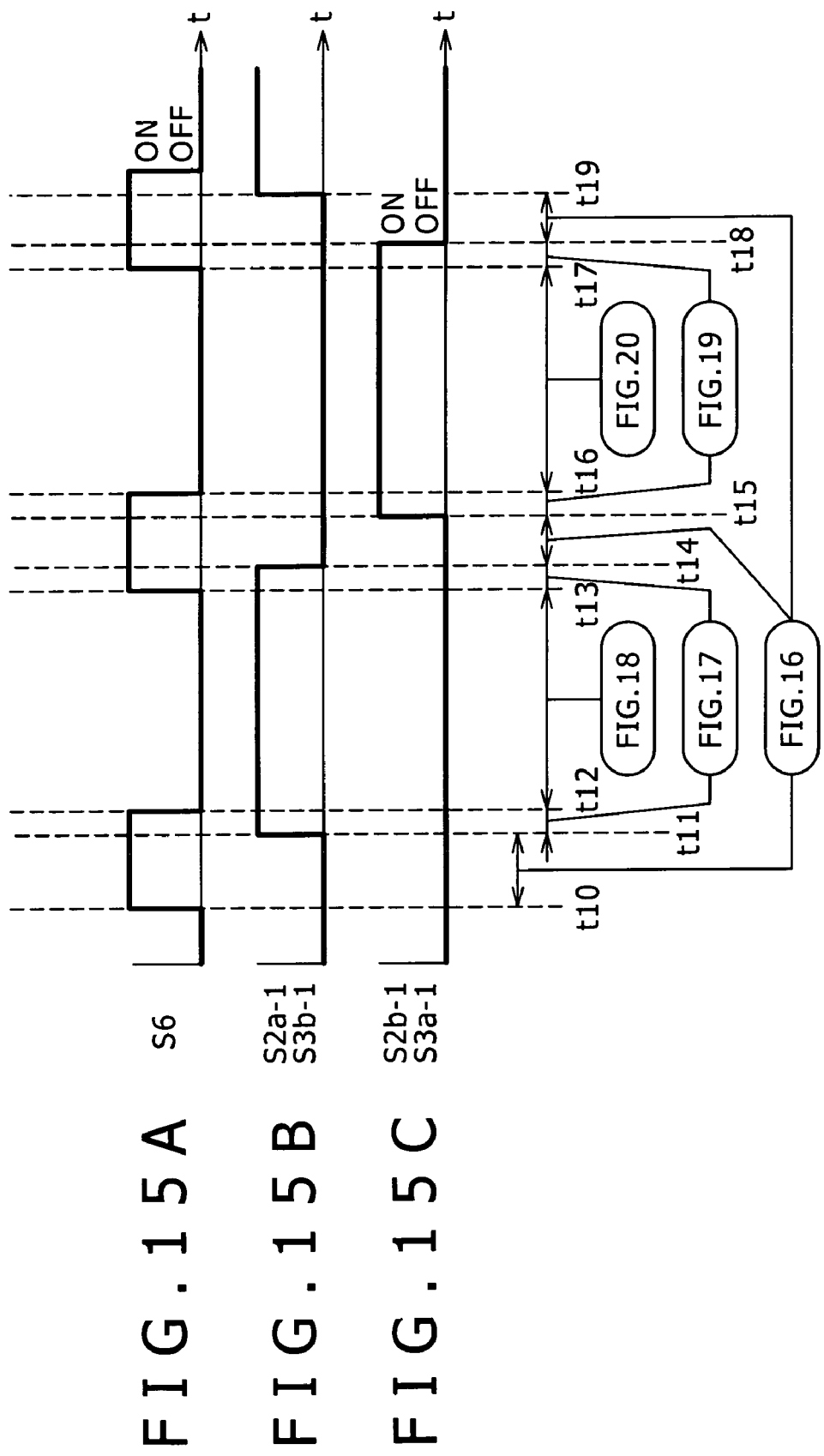
FIGS. 15A to 15C are timing charts of the cold cathode fluorescent lamp apparatus of FIG. 14.

If control is performed in accordance with a timing chart illustrated in FIG. 15, then only one of the backlight units U-1 to U-n disposed on the backlight assembly section 135 can be lit successively.

In what manner the control is performed is described with reference to FIGS. 15A to 15C. In FIGS. 15A to 15C, the axis of abscissa indicates time t, and FIG. 15A illustrates the signal S6; FIG. 15B illustrates the signals S2a-1 and S3b-1; and FIG. 15C illustrates the signals S2b-1 and S3a-1.

When the signals S2a-1, S2b-1, S3a-1, S3b-1 and S6 have the high level (higher level in FIGS. 15A to 15C), the switch elements Sw2a-1 and Sw2b-1, Sw3a-1 and Sw3b-1 and Sw6 exhibit an on state, and when the signals S2a-1, S2b-1, S3a-1, S3b-1 and S6 have the low level (lower level in FIGS. 15A to 15C), the switch elements Sw2a-1 and Sw2b-1, Sw3a-1 and Sw3b-1 and Sw6 exhibit an off state.

Figure 16:
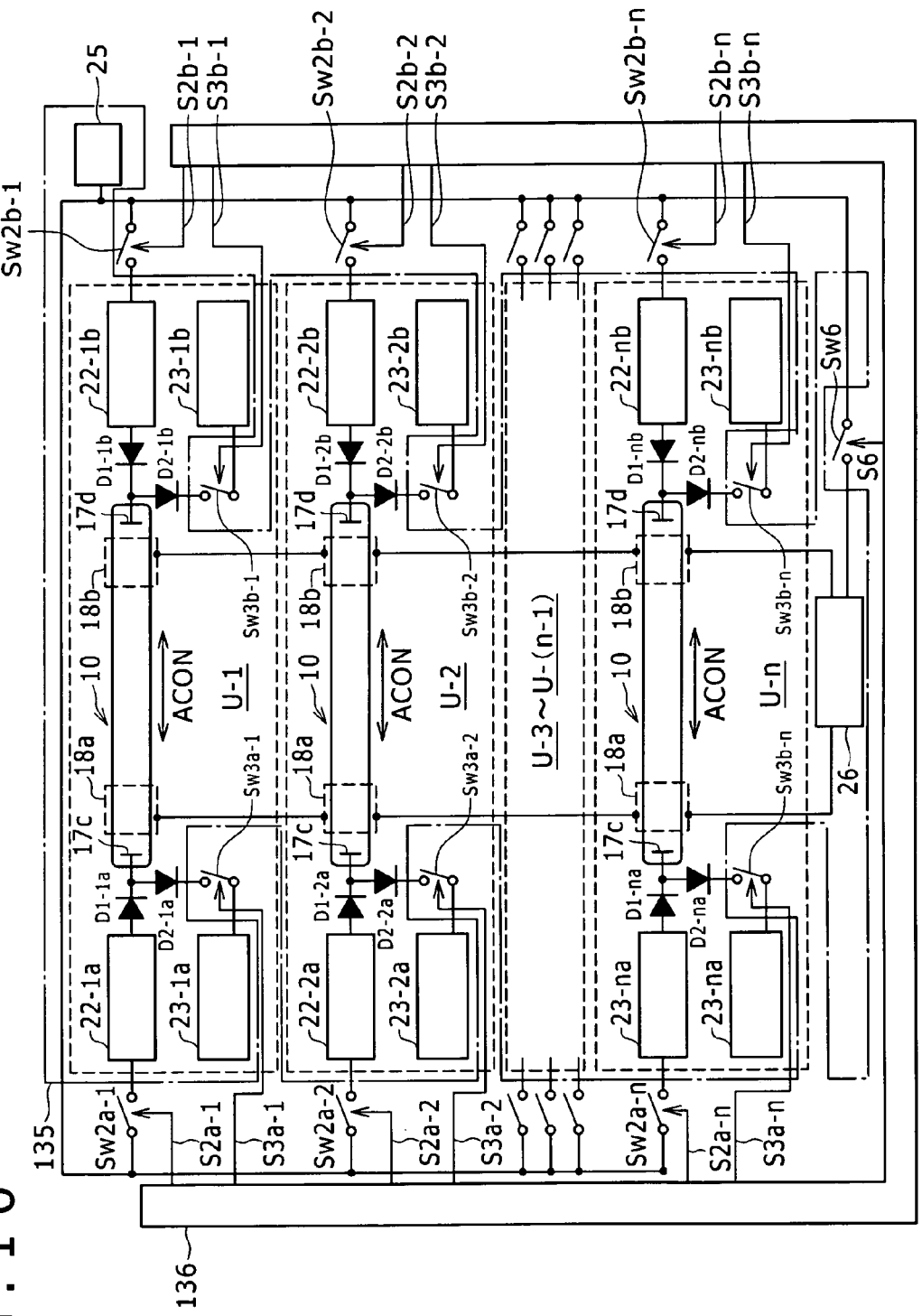
FIGS. 16 to 20 are circuit diagrams illustrating operation of the cold cathode fluorescent lamp apparatus of FIG. 14.
Figure 17:
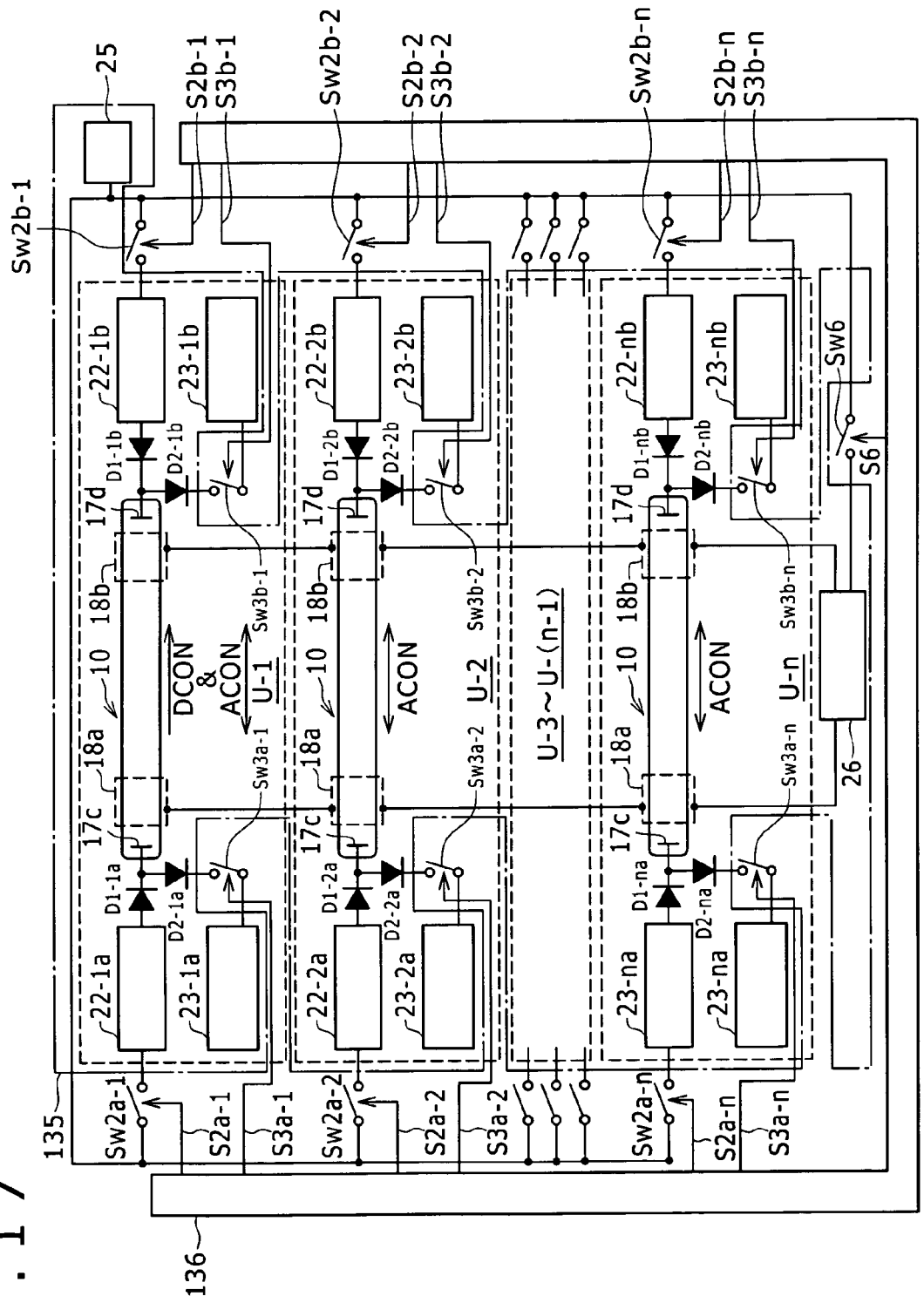
Figure 18:
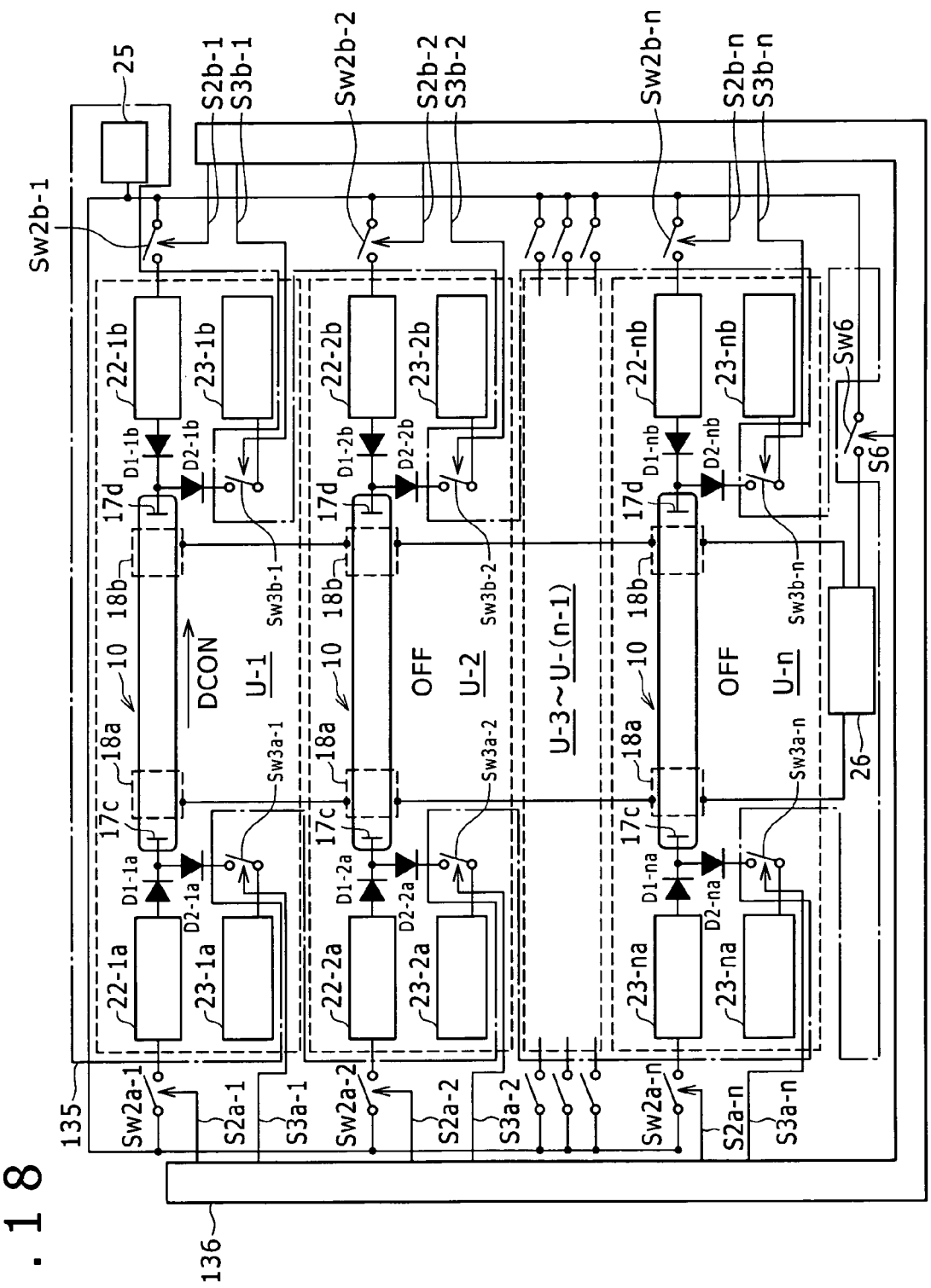
Figure 19:
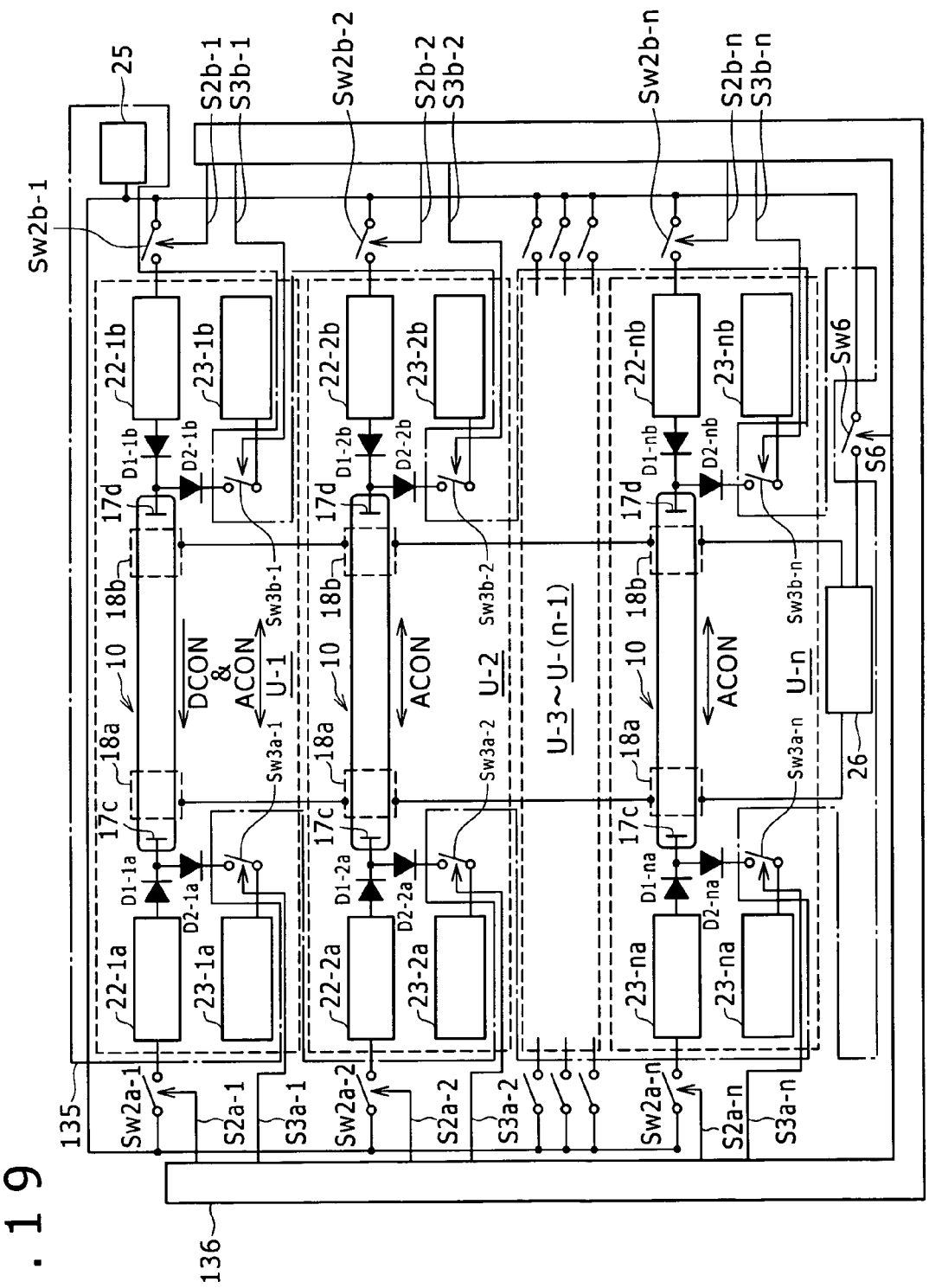
Figure 20:
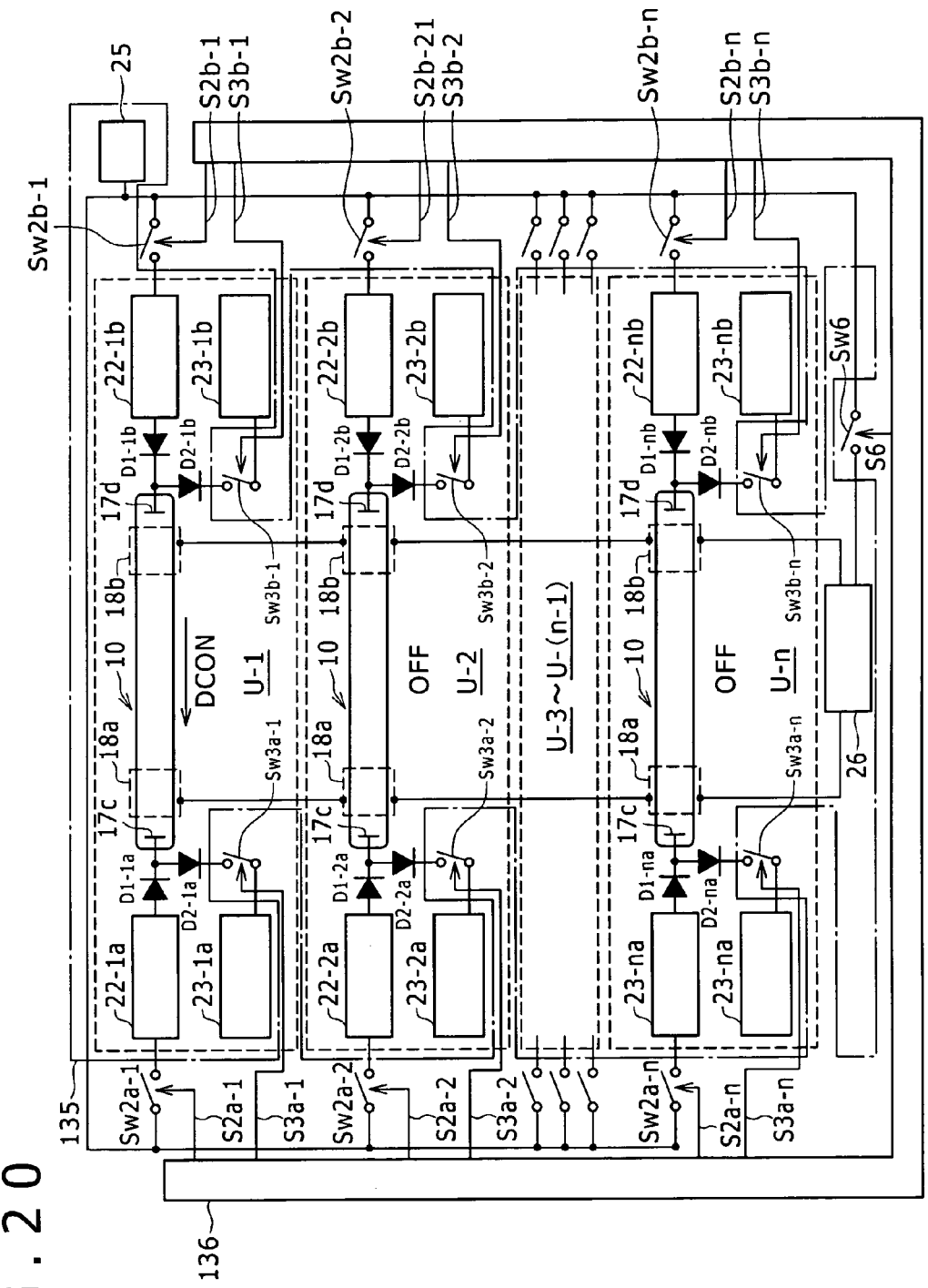

First, at time t10 at which the signal S6 changes to the high level, the switch element Sw6 is placed into on state, and consequently, ac lighting is started (refer to FIG. 16). It is to be noted that reference character DCON applied below any of the cold cathode fluorescent lamps 10 in FIG. 16 schematically represents that the cold cathode fluorescent lamp 10 is in a dc lit state, and reference character ACON applied below any of the cold cathode fluorescent lamps 10 schematically represents that the cold cathode fluorescent lamp 10 is in an ac lit state. Reference characters DCON and ACON also in FIGS. 17 to 20 have the same significance.

Then at time t11, the switch elements Sw2a-1 and Sw3b-1 are turned on, and operation of the dc driving circuit 22-1a and the constant current circuit 23-1b is started. Consequently, also dc lighting of the cold cathode fluorescent lamp 10 is started in an overlapping relationship with the ac lighting (refer to FIG. 17).

Then at time t12 at which the signal S6 changes to the low level, the switch element Sw6 is switched off. Consequently, the operation of the ac driving circuit 26 stops and only the dc lighting of the cold cathode fluorescent lamp 10 of the backlight unit U-1 is continued (refer to FIG. 18).

Then at time t13 at which the signal S6 changes to the high level, the switch element Sw6 is switched on. Consequently, the ac driving circuit 26 operates so that also ac lighting is started simultaneously in an overlapping relationship with the dc lighting of the cold cathode fluorescent lamp 10 of the backlight unit U-1 (refer to FIG. 17).

Then at time t14, the switch elements Sw2a-1 and Sw3b-1 are switched off, and the operation of the dc driving circuit 22-1a and the constant current circuit 23-1b is stopped and the dc lighting stops. However, the ac driving of the cold cathode fluorescent lamp 10 of the backlight unit U-1 is continued (refer to FIG. 16).

Then at step time t15, the switch elements Sw2b-1 and Sw3a-1 are switched on, and operation of the dc driving circuit 22-1b and the constant current circuit 23-1a is started. Consequently, also dc lighting of the cold cathode fluorescent lamp 10 of the backlight unit U-1 is started in an overlapping relationship with the ac lighting. At this time, the direction of current flowing through the cold cathode fluorescent lamp 10 of the backlight unit U-1 is the opposite direction (refer to FIG. 19).

Then at time t16 at which the signal S6 changes to the low level, the switch element Sw6 is switched off. Consequently, the operation of the ac driving circuit 26 stops and only the dc driving of the cold cathode fluorescent lamp 10 of the backlight unit U-1 is continued (refer to FIG. 20).

Then at time t17, the switch element Sw6 is switched on, and consequently, ac lighting is started. At this time, since the switch elements Sw2b-i and Sw3a-1 are already in an on state, the dc driving circuit 22-1b and the constant current circuit 23-1a are operating. Therefore, also ac lighting is performed in an overlapping relationship with the dc lighting (refer to FIG. 19).

Then at time t18, the switch elements Sw2b-1 and Sw3a-1 are switched off and the operation of the dc driving circuit 22-1b and the constant current circuit 23-1a is stopped to end the dc lighting. However, the ac lighting of the cold cathode fluorescent lamp 10 is continued (refer to FIG. 16).

Then at time t19, a state same as that at time t11 is reached. Consequently, the operations described above are repeated thereafter as time passes.

It is to be noted that, although the control only of the backlight unit U-1 is illustrated in the timing charts of FIGS. 15A to 15C and FIGS. 16 to 20, where the backlight units U-1 to U-n are to be successively lit, the backlight unit U-1, backlight unit U-2, backlight unit U-3, . . . , and backlight unit U-n are controlled successively.

In this instance, for example, where the backlight unit U-2 is to be controlled, in FIG. 15B, the signals S2a-2 and S3b-2 are controlled in place of the signals S2a-1 and S3b-1, and the signals S2b-2 and S3a-2 are controlled in place of the signals S2b-1 and S3a-1. Also where any other backlight unit is to be controlled, the pertaining backlight unit can be lit by changing the signals to be used to control the associated switch elements.

In particular, the changeover circuit can control the polarity direction of the dc current and supplying (supplying of current to the cold cathode fluorescent lamp 10) and stopping (stopping of the supply of current to the cold cathode fluorescent lamp 10) of the current to control the direction of current to flow through each of the cold cathode fluorescent lamps 10 and selective lighting and partial turning off of some of the plural cold cathode fluorescent lamps 10.

[Cold Cathode Fluorescent Lamp Apparatus of the Third Embodiment]

A cold cathode fluorescent lamp apparatus of the third embodiment which uses a cold cathode fluorescent lamp which is different from that used in the first or second embodiment is described with reference to FIG. 21.

A cold cathode fluorescent lamp 41 of the cold cathode fluorescent lamp apparatus 40 of the third embodiment has a configuration same as that of the cold cathode fluorescent lamp 10 except that it does not include any of the external electrodes 18a and 18b. Since the internal electrodes 17c and 17d in FIG. 21 have a configuration same as that of the cold cathode fluorescent lamp 10, overlapping description thereof is omitted herein to avoid redundancy.

The cold cathode fluorescent lamp apparatus 40 includes an ac driving circuit 26 and a dc driving circuit 22. The ac driving circuit 26 and the dc driving circuit 22 individually have substantially similar configurations and exhibit similar effects to those in the first and second embodiments, and therefore, overlapping description of them is omitted herein to avoid redundancy. However, although the dc driving circuit 22 shown in FIG. 3 uses the single capacitor C22, the dc driving circuit 22 in the present embodiment includes two capacitors, that is, capacitors C23 and C24. Meanwhile, although the ac driving circuit 26 shown in FIG. 4 includes the oscillation and conversion transformer L61 wherein the secondary side winding has a center tap, the ac driving circuit 26 in the present embodiment includes a secondary side winding N64 and another secondary side winding N65 which are separate from each other.

Figure 22:
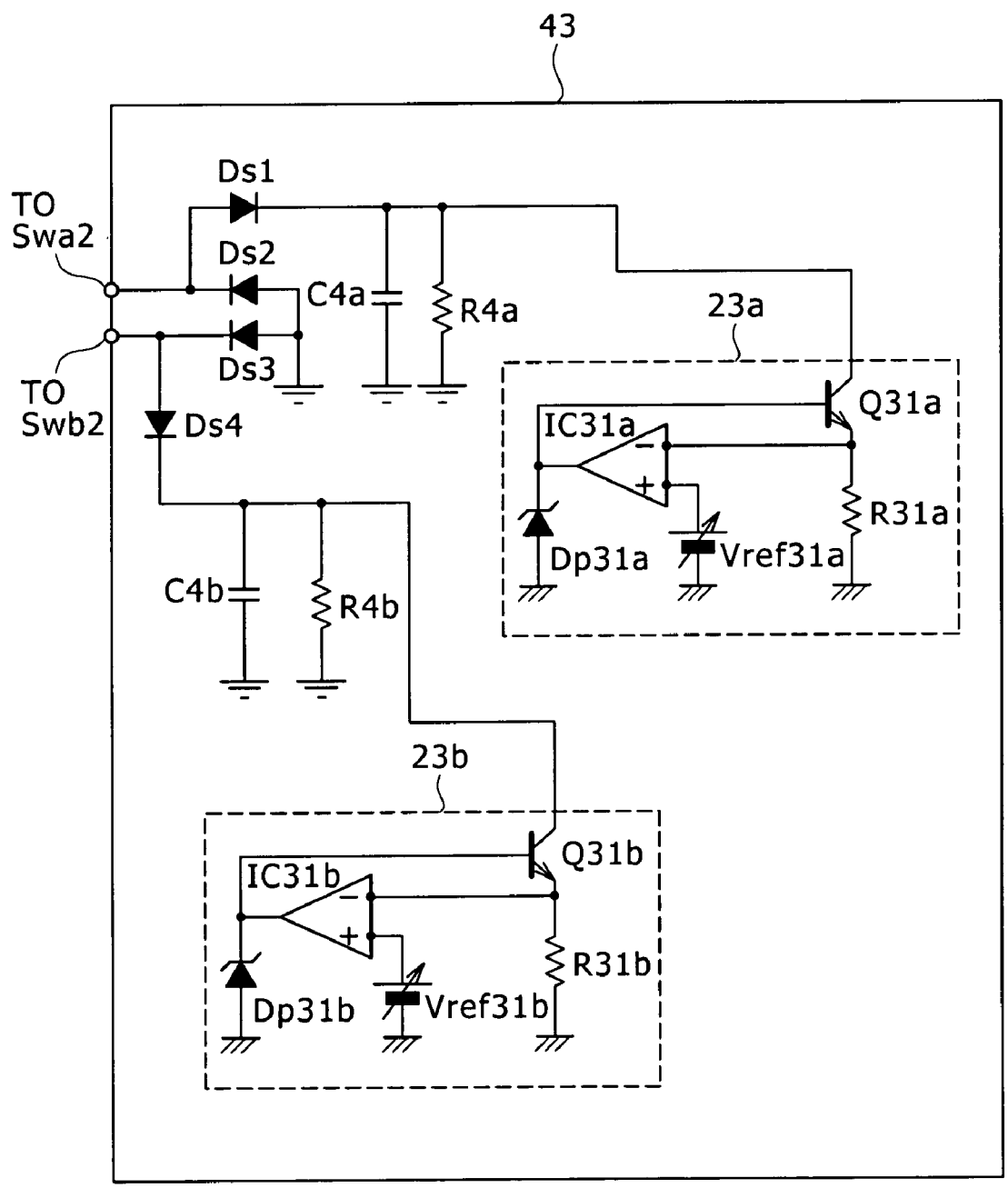
FIG. 22 is a circuit diagram of a current direction controlling constant current circuit shown in FIG. 21.

Further, the cold cathode fluorescent lamp apparatus 40 includes a current direction control and constant current circuit 43. The current direction control and constant current circuit 43 shown in FIG. 22 includes constant current circuits 23a and 23b for supplying fixed current, high-speed diodes Ds1 to Ds4 for controlling the direction of current, and a smoothing circuit having a predetermined time constant. The constant current circuits 23a and 23b have a configuration same as that of and operate similarly to the constant current circuit 23 in the first embodiment, and therefore, overlapping description of them is omitted herein to avoid redundancy.

The smoothing circuit includes capacitors C4a and C4b and resistors R4a and R4b, and the time constant defined by the capacitor C4a and the resistor R4a and the time constant defined by the capacitor C4b and the resistor R4b are selected sufficiently longer than the cycle period of the ac voltage Vac. Further, the voltages across the capacitors C4a and C4b are peak held because passage of current in the reverse direction is blocked by the high-speed diodes Ds1 and Ds2.

Further, the cold cathode fluorescent lamp apparatus 40 includes a changeover control circuit 44 and switch elements Swa and Swb. The changeover control circuit 44 and the switch elements Swa and Swb in the present embodiment form the changeover circuit. The switch element Swa has contacts Swa1, Swa2 and Swac and is selectively operated such that the contact Swac and the contact Swa1 are connected to each other or the contact Swac and the contact Swa2 are connected to each other or else the contact Swac is connected to none of the contacts Swa1 and Swa2. Further, the contact Swac is connected to one end of the secondary side winding N64.

The switch element Swb has contacts Swb1, Swb2 and Swbc and is selectively operated such that the contact Swbc and the contact Swb1 are connected to each other or the contact Swbc and the contact Swb2 are connected to each other or else the contact Swbc is connected to none of the contacts Swb1 and Swb2. Further, the contact Swbc is connected to one end of the secondary side winding N65.

Meanwhile, the other end of the secondary side winding N64 is connected to the internal electrode 17c of the cold cathode fluorescent lamp 41, and the other end of the secondary side winding N65 is connected to the internal electrode 17d of the cold cathode fluorescent lamp 41. The winding directions of the secondary side windings N64 and N65 are managed such that the direction of an ac voltage Vac1 generated in the secondary side winding N64 at the internal electrode 17c and the direction of another ac voltage Vac2 generated in the secondary side winding N65 at the internal electrode 17d are opposite to each other.

The switch elements Swa and Swb are controlled with switch elements Swa and Swb from the changeover control circuit 44, respectively. Meanwhile, the switch element Sw6 is controlled with a signal Sac, and the switch element Sw2 is controlled with a signal Sdc. Operation of the cold cathode fluorescent lamp apparatus 40 is described below with reference to timing charts shown in FIGS. 23A to 23F.

Figure 23:
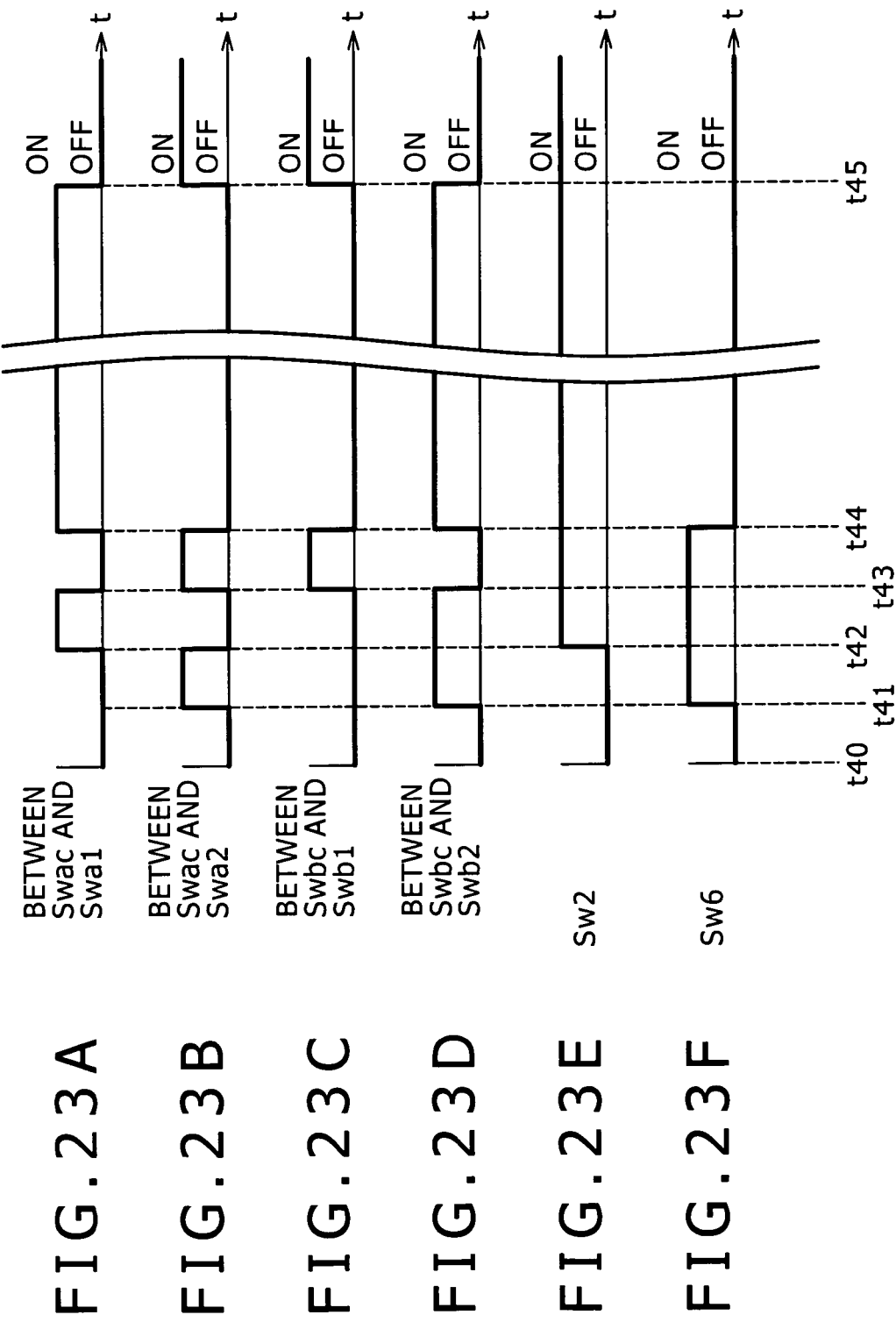
FIGS. 23A to 23F are timing charts of the cold cathode fluorescent lamp apparatus of FIG. 21.

FIG. 23A illustrates a connection between the contact Swac and the contact Swa1, and an on state of the connection (higher level in FIG. 23A) represents that the contacts Swac and Swa1 are connected to each other. On the other hand, an off state of the connection (lower level in FIG. 23A) represents that the contacts Swac and Swa1 are not connected to each other. FIG. 23B illustrates a connection between the contacts Swac and Swa2, and an on state of the connection (higher level in FIG. 23B) represents that the contacts Swac and Swa2 are connected to each other. On the other hand, an off state of the connection (lower level in FIG. 23B) represents that the contacts Swac and Swa2 are not connected to each other. FIG. 23C illustrates a connection between the contact Swbc and Swb1, and an on state of the connection (higher level in FIG. 23C) represents that the contacts Swbc and Swb1 are connected to each other. On the other hand, an off state of the connection (lower level in FIG. 23C) represents that the contacts Swbc and Swb1 are not connected to each other. FIG. 23D illustrates a connection between the contacts Swbc and Swb2, and an on state of the connection (higher level in FIG. 23D) represents that the contacts Swbc and Swb2 are connected to each other. On the other hand, an off state of the connection (lower level in FIG. 23D) represents that the contacts Swbc and Swb2 are not connected to each other. FIG. 23E illustrates a connection of the switch element Sw2, and an on state of the switch element Sw2 (higher level in FIG. 23E) represents that the switch element Sw2 is in a conducting state. On the other hand, an off state of the switch element Sw2 (lower level in FIG. 23E) represents that switch element Sw2 is in a non-conducting state. FIG. 23F illustrates a connection of the switch element Sw6, and an on state of the switch element Sw6 (higher level in FIG. 23F) represents that the switch element Sw6 is in a conducting state. On the other hand, an off state of the switch element Sw6 (lower level in FIG. 23F) represents that switch element Sw6 is in a non-conducting state.

Operation of the cold cathode fluorescent lamp apparatus 40 is described with reference to the time charts of FIGS. 23A to 23F.

Within a period of time from time t40 to time t41, the contact Swac is not connected to any of the contacts Swa1 and Swa2, and the contact Swbc is not connected to any of the contacts Swb1 and Swb2, either. Further, both of the switch elements Sw6 and Sw2 are in an off state, and none of the ac driving circuit 26 and the dc driving circuit 22 is operative and all of the ac voltages Vac1 and Vac2 and a dc voltage Vd22 are 0 V. Accordingly, none of power from the ac driving circuit 26 and power from the dc driving circuit 22 is applied to the cold cathode fluorescent lamp 41.

Within a period of time from time t41 to time t42, the contact Swac is connected to the contact Swa2 and the contact Swbc is connected to the contact Swb2. Further, the switch element Sw6 is on and the ac driving circuit 26 is operative. Thus, the ac voltage Vac1 generated in the secondary side winding N64 of the ac driving circuit 26 is applied between the internal electrode 17c of the cold cathode fluorescent lamp 41 and the current direction control and constant current circuit 43 through the contacts Swac and Swa2. Meanwhile, the ac voltage Vac2 generated in the secondary side winding N65 of the ac driving circuit 26 is applied between the internal electrode 17d of the cold cathode fluorescent lamp 41 and the current direction control and constant current circuit 43 through the contacts Swbc and Swb2. In other words, the cold cathode fluorescent lamp 41 is in an ac driven state. In what manner current flows at this time is described in detailed below.

First, within one half cycle of ac current wherein the voltage at the node between the secondary side winding N64 and the internal electrode 17c and at the node between the secondary side winding N64 and the contact Swb2 indicates a positive direction, the current flows along a route of the ground→high-speed diode Ds2→contact Swa2→contact Swac→secondary side winding N64→internal electrode 17c→internal electrode 17d→secondary side winding N65→contact Swbc→contact Swb2→high-speed diode Ds4→(principally) capacitor C4b→ground. In this manner, the cold cathode fluorescent lamp 41 is ac driven for a period of time of one half cycle. It is to be noted that, in the current route described above, the ac voltage Vac1 and the ac voltage Vac2 have phases same as each other and act in an adding direction. Meanwhile, fixed dc current flows through the constant current circuit 23b owing to charge accumulated in the capacitor C4b.

Within the other one half cycle of ac current wherein the voltage at the node between the secondary side winding N64 and the internal electrode 17c and at the node between the secondary side winding N64 and the contact Swb2 indicates a negative direction, the current flows along another route of the ground→high-speed diode Ds3→contact Swb2→contact Swbc→secondary side winding N65→internal electrode 17d→internal electrode 17c→secondary side winding N64→contact Swac→contact Swa2→high-speed diode Ds1→(principally) capacitor C4a→ground. In this manner, the cold cathode fluorescent lamp 41 is ac driven for a period of time of one half cycle in the opposite phase to that in the preceding one half cycle. It is to be noted that, in the current route described above, the ac voltages Vac1 and Vac2 have phases same as each other and act in an adding direction. Meanwhile, fixed dc current flows through the constant current circuit 23a owing to charge accumulated in the capacitor C4a.

In this manner, within a period from time t41 to time t42, the cold cathode fluorescence lamp 41 is ac driven to light, and then after a steady state is reached, such control is performed that the magnitude of the effective value of the ac current to flow is fixed by action of the constant current circuits 23a and 23b.

Within a period of time from time t42 to time t43, the contact Swac is connected to the contact Swa1, and the added voltage of the ac voltage Vac1 and the dc voltage Vd22 is applied between the internal electrode 17c of the cold cathode fluorescent lamp 41 and the ground. Meanwhile, the ac voltage Vac2 is applied between the internal electrode 17d of the cold cathode fluorescent lamp 41 and the current direction control and constant current circuit 43 through the contacts Swbc and Swb2.

Where the absolute value of a peak value of the added voltage of the ac voltages Vac1 and Vac2 is lower than the value of the dc voltage Vd22, a pulsating voltage whose polarity is one direction is applied to the cold cathode fluorescent lamp 41. In this instance, an ac component of the current flows along the route of the ground→dc driving circuit 22→contact Swa1→contact Swac→secondary side winding N64→internal electrode 17c→internal electrode 17d→secondary side winding N65→contact Swbc→contact Swb2→high-speed diode Ds4→(principally) capacitor C4b→ground, and fixed dc current flows through another route of the constant current circuit 23b and the ground. In this manner, dc current and ac current flow in an overlapping relationship with each other through the cold cathode fluorescent lamp 41 in the direction from the internal electrode 17c to the internal electrode 17d.

In this manner, within the period from time t42 to time t43, ac current overlapping with dc current flows through the cold cathode fluorescent lamp 41 to continue lighting of the cold cathode fluorescent lamp 41. At this time, the magnitude of the effective value of the current is controlled to a fixed level by the constant current circuit 23b.

It is to be noted that, if the absolute value of the peak value of the added value of the ac voltage Vac1 and the ac voltage Vac2 is higher than the value of the dc voltage Vd22, then ac current flows, within part of one cycle thereof, along the route of the ground→high-speed diode Ds3→contact Swb2→contact Swbc→secondary side winding N65→internal electrode 17d→internal electrode 17c→secondary side winding N64→contact Swac→contact Swa2→high-speed diode Ds1→(principally) capacitor C4a→ground. Also in this instance, ac current overlapping with dc current flows through the cold cathode fluorescent lamp 41 to continue lighting of the cold cathode fluorescent lamp 41.

Within a period of time from time t43 to time t44, the contact Swbc is connected to the contact Swb1, and the added voltage of the ac voltage Vac2 and the dc voltage Vd22 is applied between the internal electrode 17d of the cold cathode fluorescent lamp 41 and the ground. Meanwhile, the ac voltage Vac1 is applied between the internal electrode 17c of the cold cathode fluorescent lamp 41 and the current direction control and constant current circuit 43 through the contacts Swac and Swa2.

Where the absolute value of a peak value of the added voltage of the ac voltage Vac1 and the ac voltage Vac2 is lower than the value of the dc voltage Vd22, a pulsating voltage whose polarity is one direction is applied to the cold cathode fluorescent lamp 41. In this instance, an ac component of the current flows along the route of the ground→dc driving circuit 22→contact Swb1→contact Swbc→secondary side winding N65→internal electrode 17d→internal electrode 17c→secondary side winding N64→contact Swac→contact Swa2→high-speed diode Ds1→(principally) capacitor C4a→ground, and fixed dc current flows through another route of the constant current circuit 23a and the ground. In this manner, ac current flows in an overlapping relationship with dc current through the cold cathode fluorescent lamp 41 in the direction from the internal electrode 17d to the internal electrode 17c.

In this manner, within the period from time t43 to time t44, ac current overlapping with dc current flows through the cold cathode fluorescent lamp 41 to continue lighting of the cold cathode fluorescent lamp 41. At this time, the magnitude of the effective value of the current is controlled to a fixed level by the constant current circuit 23a.

It is to be noted that, if the absolute value of the peak value of the added value of the ac voltage Vac1 and the ac voltage Vac2 is higher than the value of the dc voltage Vd22, then ac current flows, within part of one cycle thereof, along the route of the ground→high-speed diode Ds2→contact Swa2→contact Swac→secondary side winding N64→internal electrode 17c→internal electrode 17d→secondary side winding N65→contact Swbc→contact Swb2→high-speed diode Ds4→(principally) capacitor C4a→ground. Also in this instance, ac current overlapping with dc current flows through the cold cathode fluorescent lamp 41 to continue lighting of the cold cathode fluorescent lamp 41.

Within a period of time from time t44 to time t45, the switch element Sw6 is off, and the value of the ac voltage Vac from the ac driving circuit 26 is 0 V. Meanwhile, the contact Swac is connected to the contact Swa1, and the dc voltage Vd22 from the dc driving circuit 22 is applied between the internal electrode 17c of the cold cathode fluorescent lamp 41 and the ground. Meanwhile, the internal electrode 17d of the cold cathode fluorescent lamp 41 is connected to the current direction control and constant current circuit 43 through the contacts Swbc and Swb2.

The dc current supplied from the dc driving circuit 22 flows along a route of the ground→contact Swa1→contact, Swac→secondary side winding N64→internal electrode 17c→internal electrode 17d→secondary side winding N65→contact Swbc→contact Swb2→high-speed diode Ds4→(principally) constant current circuit 23b→ground.

In this manner, within the period from time t44 to time t45, predetermined dc current determined by the constant current circuit 23b flows through the cold cathode fluorescent lamp 41 to continue lighting of the cold cathode fluorescent lamp 41. At this time, the direction of the current is the direction from the internal electrode 17c to the internal electrode 17d.

At time t45, the contact Swbc is connected to the contact Swb1, and the dc voltage Vd22 from the dc driving circuit 22 is applied between the internal electrode 17d of the cold cathode fluorescent lamp 41 and the ground. Meanwhile, the internal electrode 17c of the cold cathode fluorescent lamp 41 is connected to the current direction control and constant current circuit 43 through the contacts Swac and Swa2.

At this time, the dc current supplied from the dc driving circuit 22 flows along a route of the ground→contact Swb1→contact Swbc→secondary side winding N65→internal electrode 17d→internal electrode 17c→secondary side winding N64→contact Swac→contact Swa2→high-speed diode Ds1→(principally) constant current circuit 23a→ground. It is to be noted that, since the switch element Sw6 is in an off state, the values of the ac voltages Vac1 and Vac2 from the ac driving circuit 26 are 0 V.

In this manner, after time t45, predetermined dc current determined by the constant current circuit 23a flows through the cold cathode fluorescent lamp 41 to continue lighting of the cold cathode fluorescent lamp 41. At this time, the direction of the current is the direction from the internal electrode 17d to the internal electrode 17c.

As described above, in the cold cathode fluorescent lamp apparatus 40 of the third embodiment, after ac lighting is started by the ac driving circuit 26 once, the lighting mode can be changed over to dc lighting to continue lighting. In this instance, if the period of time for ac lighting, that is, the period of time from time t1 to time t44, is decreased, then the amount of power loss by leak current can be reduced, and the period of time within which the luminance is varied in the longitudinal direction of the cold cathode fluorescent lamp 41 by appearance of leak current can be reduced.

Further, since the cold cathode fluorescent lamp 41 merely includes the internal electrode 17c and the internal electrode 17d, it is simple in structure, and the cost of the entire cold cathode fluorescent lamp apparatus 40 can be reduced. If such a cold cathode fluorescent lamp apparatus 40 as just described is adopted as part of a configuration of the backlight apparatus or liquid crystal display apparatus, then reduction of the cost of the entire backlight apparatus or liquid crystal display apparatus can be anticipated. Besides, the backlight apparatus or liquid crystal apparatus is superior in power efficiency, fixed in luminance and small in size, and also the service life of the cold cathode fluorescent lamp 41 before replacement can be increased.

[Cold Cathode Fluorescent Lamp Apparatus of the Fourth Embodiment]

A cold cathode fluorescent lamp apparatus of the fourth embodiment is described. In order to make characteristics of the cold cathode fluorescent lamp apparatus of the fourth embodiment clear, basic operation of a circuit of the cold cathode fluorescent lamp apparatus of the fourth embodiment is described first with reference to FIGS. 24 to 26.

Figure 24:
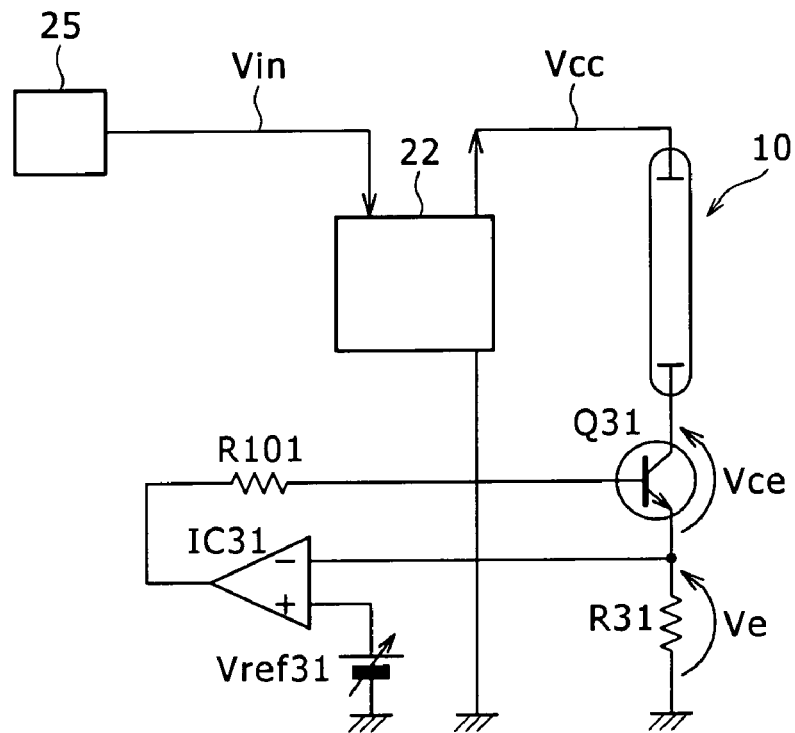
FIG. 24 is a circuit diagram illustrating an operation principle of the dc driving circuit of the cold cathode fluorescent lamp apparatus of FIG. 2.

FIG. 24 illustrates a principle of operation of the dc driving circuit of the cold cathode fluorescent lamp apparatus of the first embodiment shown in FIG. 2. Referring to FIG. 24, a power supply 25, a dc driving circuit 22, a transistor Q31, a resistor R31, a cold cathode fluorescent lamp 10, an operational amplifier IC31 and a reference power supply Vref31 have same configurations as those of and operate similarly to the elements denoted by like reference characters in FIG. 2. Therefore, description of the individual components mentioned above is omitted herein to avoid redundancy. It is to be noted that a resistor R101 is an overcurrent limiting resistor.

In the dc driving circuit shown in FIG. 24, a voltage given as a dc voltage Vin from the power supply 25 is boosted by the dc driving circuit 22 to obtain a dc voltage Vcc. Here, the value of the dc voltage Vcc is not controlled but has a voltage value according to the dc voltage Vin. Then, the magnitude of current to flow to the cold cathode fluorescent lamp 10 is controlled to a predetermined value by adjusting the value of a voltage Vce which is a voltage between the collector and the emitter of the transistor Q31. At this time, such a feedback control system is formed that a voltage Ve across the resistor R31 is detected, and a voltage error between the voltage Ve and the reference voltage Vref31 is amplified by the operational amplifier IC31 and applied to the base of the transistor Q31. By the feedback control system, the transistor Q31 is controlled to control the value of the voltage Vce so that predetermined current flows through the resistor R31, that is, predetermined current flows through the cold cathode fluorescent lamp 10, in order that the voltage Ve becomes equal to the reference voltage Vref31.

Figure 25:
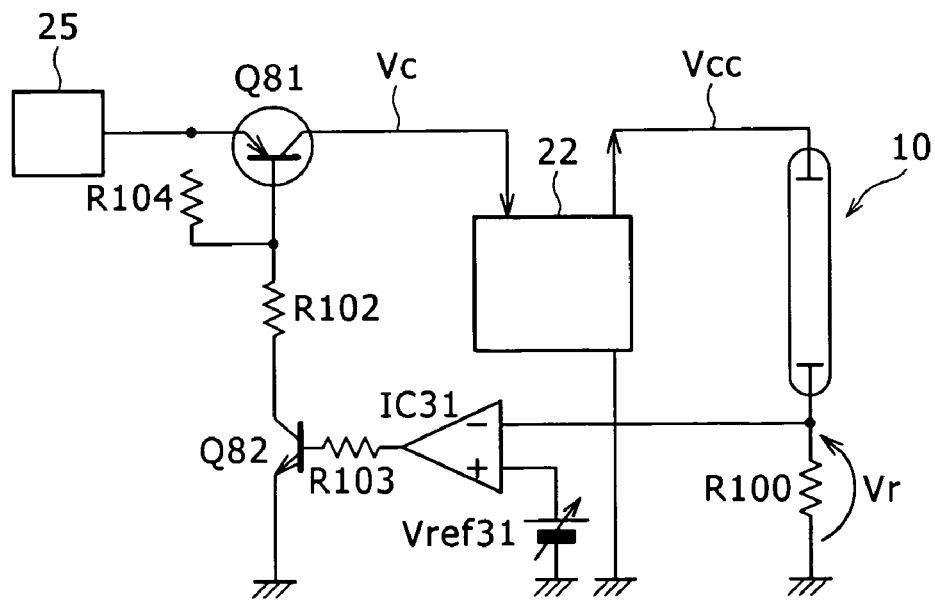
FIG. 25 is a circuit diagram showing part of a cold cathode fluorescent lamp apparatus according to a fourth embodiment of the present invention.

Meanwhile, in the cold cathode fluorescent lamp apparatus of the fourth embodiment whose principle circuit is shown in FIG. 25, the dc voltage Vin from the power supply 25 is applied to the emitter of the transistor Q81 to obtain a dc voltage Vc at the collector of the transistor Q81, and the dc voltage Vc is boosted by the dc driving circuit 22 to obtain a dc voltage Vcc. Here, the values of the dc voltages Vc and Vcc are controlled so that the voltage across a resistor R100 has a predetermined value. Here, since a voltage Vr across the resistor R100 increases in proportion to the magnitude of current flowing through the cold cathode fluorescent lamp 10, the magnitude of the current flowing through the cold cathode fluorescent lamp 10 can be set to a predetermined value by varying the values of the dc voltages Vc and vcc in this manner. Here, the transistor Q81 functions as a power control element of a series regulator.

Figure 26:
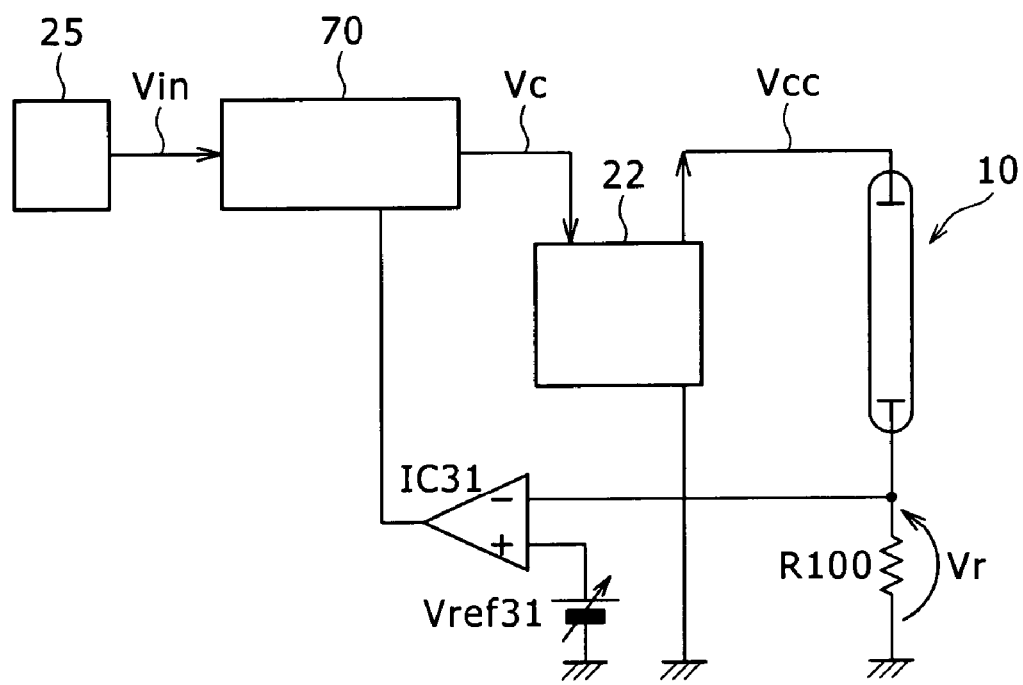
FIG. 26 is a modification to the cold cathode fluorescent lamp apparatus of FIG. 25.

In particular, such a feedback control system is formed that the voltage Vr across the resistor R100 is detected, and a voltage error between the voltage Vr and the reference voltage Vref31 is amplified by the operational amplifier IC31 and applied to the base of the transistor Q81. By the feedback control system, the voltage Vr is controlled so as to be equal to the reference voltage Vref31 so that predetermined current flows through the resistor R31, that is, through the cold cathode fluorescent lamp 10. Here, the resistors R102 and R103 are used for limitation of the current, and another resistor R104 is used to enhance the speed of reference of the transistor Q81.

Where the circuit shown in FIG. 25 and the circuit shown in FIG. 26 are compared with each other, voltage withstanding properties required for the transistor Q31 and the transistor Q81 are different from each other. In particular, a withstanding voltage corresponding to the dc voltage Vcc is required for the transistor Q31, and another withstanding voltage corresponding to the dc voltage Vin is required for the transistor Q81. Here, since the dc driving circuit 22 is formed as a power supply circuit of the stepping up type, the withstanding voltage of the transistor Q81 may be lower than that of the transistor Q31. Consequently, selection of a transistor is facilitated and reduction in cost of the apparatus can be anticipated.

FIG. 26 shows a circuit configuration where a switching regulator is used in place of the series regulator described hereinabove. The switching regulator includes a switching regulator power section 70 and produces, from the dc voltage Vin, dc voltages Vc and Vcc with which the magnitude of current flowing to the cold cathode fluorescent lamp 10 is controlled to a predetermined value. Here, a power supply 25, a dc driving circuit 22, the cold cathode fluorescent lamp 10, an operational amplifier IC31, a reference voltage source Vref31 and a resistor R100 have a configuration similar to and operate similarly to those shown in FIG. 25. Therefore, overlapping description of the individual components is omitted herein to avoid redundancy.

Where the circuit shown in FIG. 24 and the circuit shown in FIG. 25 are compared with each other, the circuit shown in FIG. 25 is further reduced in power consumption because a switching regulator is used in place of a series regulator.

Since the circuits shown in FIGS. 25 and 26 are circuits of a principle, various modifications to them and various combinations of such modifications can be applied to the cold cathode fluorescent lamp apparatus. For example, the ac driving circuit 26 (refer to FIG. 4 or 7) can be connected in place of the dc driving circuit 22 next to the power supply 25 shown in FIG. 25 or 26 with a series regulator or a switching regulator interposed therebetween. Further, the dc driving circuit 22 and the ac driving circuit 26 may be connected next to the power supply 25 through a series regulator or a switching regulator.

While FIGS. 25 and 26 show the circuits wherein current flows out from one of two electrodes of the cold cathode fluorescent lamp 10 in one direction, the circuits can be applied similarly also where current flows out alternately in the opposite directions from the two electrodes of the cold cathode fluorescent lamp 10. An apparatus wherein current flows out in the opposite directions from the cold cathode fluorescent lamp 10 is shown as a cold cathode fluorescent lamp apparatus 130 of the fifth embodiment in FIG. 27. In the following, the cold cathode fluorescent lamp apparatus 130 is described with reference to FIG. 27.

[Cold Cathode Fluorescent Lamp Apparatus of the Fifth Embodiment]

Figure 21:
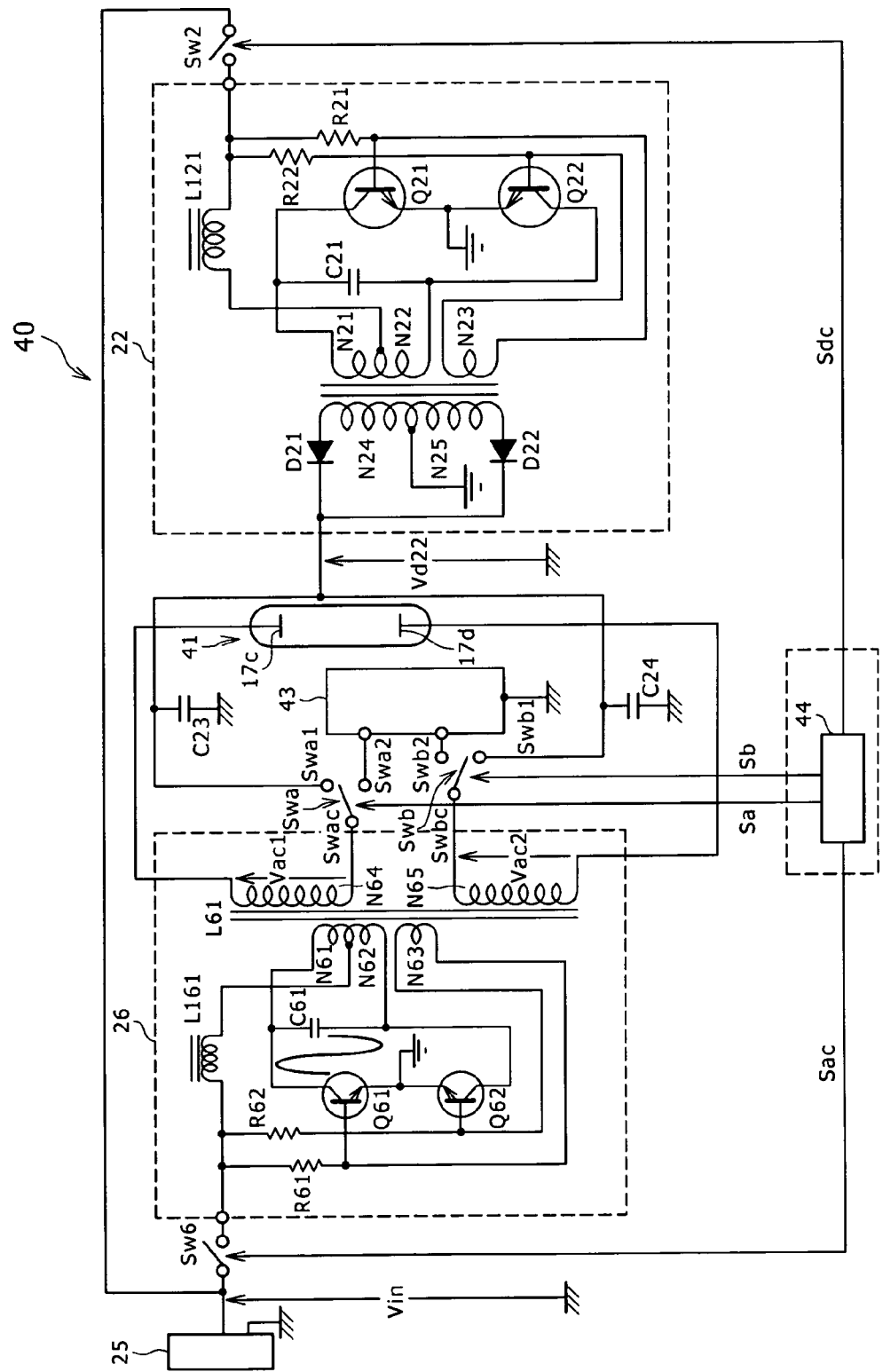
FIG. 21 is a circuit diagram showing a cold cathode fluorescent lamp apparatus according to a third embodiment of the present invention.
Figure 27:
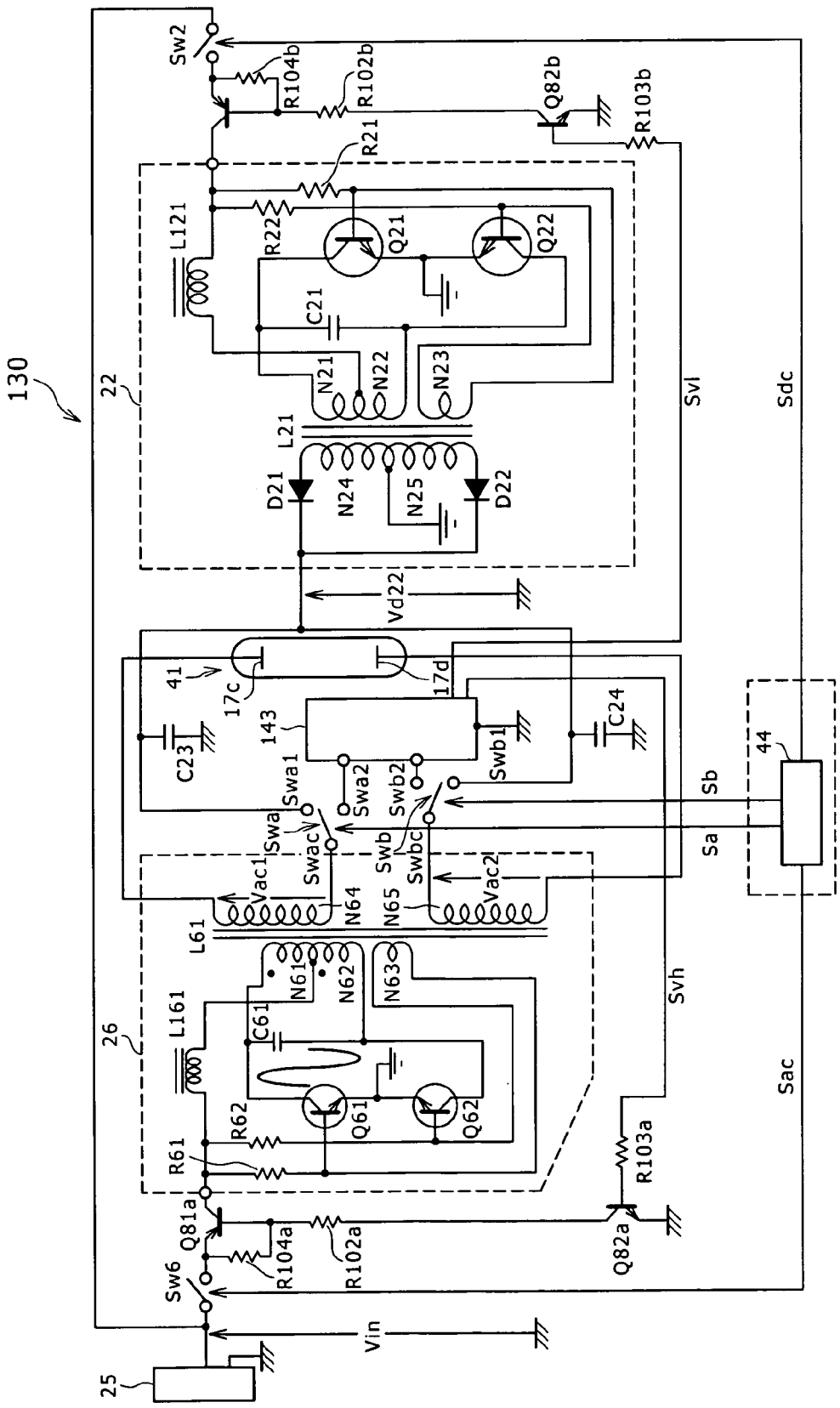
FIG. 27 is a circuit diagram showing a cold cathode fluorescent lamp apparatus according to a fifth embodiment of the present invention.

The cold cathode fluorescent lamp apparatus 130 of the fifth embodiment shown in FIG. 27 has a basic configuration similar to that of the cold cathode fluorescent lamp apparatus 40 shown in FIG. 21. Thus, description of components of the cold cathode fluorescent lamp apparatus 130 which have similar configurations and operate similarly to those of the third embodiment is omitted herein to avoid redundancy, but description is given principally of different features of the cold cathode fluorescent lamp apparatus 130.

The cold cathode fluorescent lamp apparatus 130 of the fifth embodiment includes a series regulator formed between the power supply 25 and the dc driving circuit 22 and including a transistor Q81b as a power control element and another series regulator formed between the power supply 25 and the ac driving circuit 26 and including another transistor Q81a as a power control element. The transistors Q81a and Q81b have a configuration similar to that of and operate similarly to the transistor Q81 described hereinabove; transistors Q82a and Q82b have a configuration similar to that of and operate similarly to the transistor Q82 described hereinabove; resistors R102a and R102b have a configuration similar to that of and operate similarly to the resistor R102 described hereinabove; and resistors R103a and R103b have a configuration similar to that of and operate similarly to the resistor R103 described hereinabove. A current direction control circuit 143 outputs a signal Svh to control the transistor Q82a and outputs another signal Svl to control the transistor Q82b.

Figure 28:
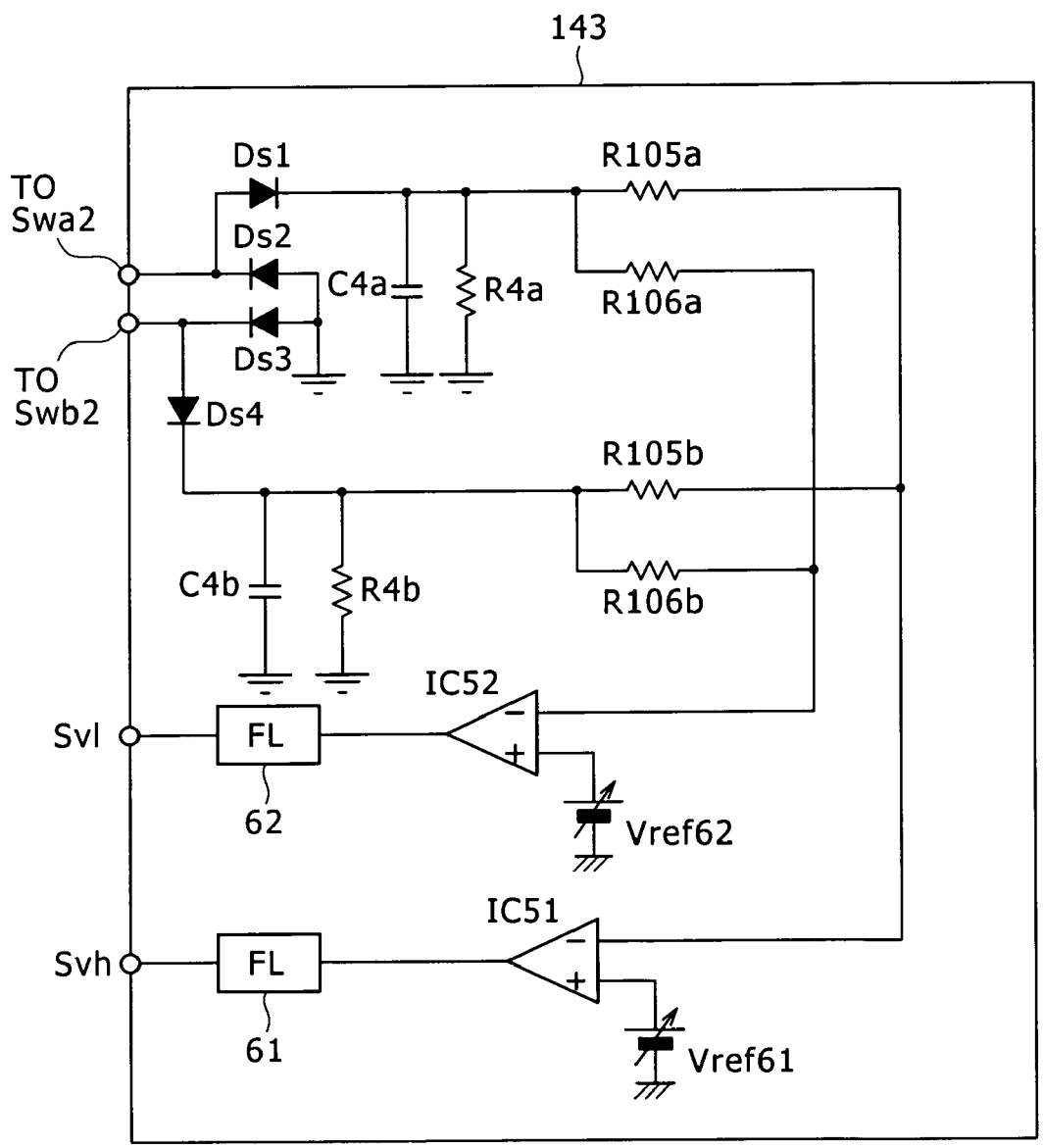
FIG. 28 is a circuit diagram showing a current direction control circuit shown in FIG. 27.

The current direction control circuit 143 is described with reference to FIG. 28. In the current direction control circuit 143, high-speed diodes Ds1 to Ds4 function as a circuit for controlling the direction of current. The current direction control circuit 143 further includes a smoothing circuit formed from a resistor R4a and a capacitor C4a and having a predetermined time constant and another smoothing circuit formed from another resistor R4b and another capacitor C4b for detecting the magnitude of current flowing in both directions. Further, an operational amplifier IC51 which functions as an error amplifier, a filter 61, a reference voltage source Vref61 and resistors R105a and R105b form part of a series regulator for controlling the voltage to be applied to the ac driving circuit 26. Further, an operational amplifier IC52 which functions as an error amplifier, a filter 62, a reference voltage source Vref62 and resistors R106a and R106b form part of another series regulator which controls the voltage to be applied to the dc driving circuit 22.

The high-speed diodes Ds1 to Ds4 operate similarly to those in the third embodiment to perform rectification so that current flows in the opposite directions to the cold cathode fluorescent lamp 41, that is, in a direction from the internal electrode 17c to the internal electrode 17d and another direction from the internal electrode 17d to the internal electrode 17c. Further, similarly as in the third embodiment, each of the smoothing circuit formed from the resistor R4a and the capacitor C4a and the smoothing circuit formed from the resistor R4b and the capacitor C4b detects the magnitude of current in the opposite directions as a voltage across the resistors R4a and R4b and smoothens the current in accordance with the time constant.

Now, a series regulator formed using the transistor Q81a, which controls the voltage to be applied to the ac driving circuit 26, as a power control element is described. The resistors R105a and R105b have resistance values equal to each other so that currents to flow in the opposite directions through the cold cathode fluorescent lamp 41 are added at an equal ratio, and a resulting voltage is inputted to the negated input terminal of the operational amplifier IC51. Thus, a voltage error between the voltage inputted to the negative input terminal and the reference voltage source Vref61 inputted to the non-negated terminal of the operational amplifier IC51 is detected by the operational amplifier IC51. Consequently, a signal Svh is applied to the base of the transistor Q82a through the resistor R103a to the filter 61 provided for optimizing the response of the feedback loop. Consequently, in ac driving, the value of current flowing through the cold cathode fluorescent lamp 41 is controlled to a fixed value.

Now, the series regulator which includes the transistor Q81b, which controls the voltage to be applied to the dc driving circuit 22, as a power control element is described. The resistors R106a and R106b have resistance values equal to each other so that currents to flow in the opposite directions through the cold cathode fluorescent lamp 41 are added at an equal ratio, and a resulting voltage is inputted to the negated input terminal of the operational amplifier IC52. Thus, a voltage error between the voltage inputted to the negative input terminal and the reference voltage Vref62 inputted to the non-negated terminal of the operational amplifier IC52 is detected by the operational amplifier IC52. Consequently, a signal Svl is applied to the base of the transistor Q82b through the resistor R103b to the filter 62 provided for optimizing the response of the feedback loop. Consequently, in dc driving, the value of current flowing through the cold cathode fluorescent lamp 41 is controlled to a fixed value. Although, in FIG. 27, the transistor Q82a is controlled with the signal Svh and the transistor Q82b is controlled with the signal Svl, where the response of the dc driving circuit 22 has a higher speed than the response of the ac driving circuit 26, the transistor Q82a is controlled with the signal Svl and the transistor Q82b is controlled with the signal Svh. Alternatively, the transistor Q82a may be controlled with the signal Svh so that both of the dc driving circuit 22 and the ac driving circuit 26 may respond at a high speed. Or, the transistors Q82a and Q82b may be controlled with the signal Svl so that the both of the dc driving circuit 22 and the ac driving circuit 26 may respond at a lower speed.

Figure 29:
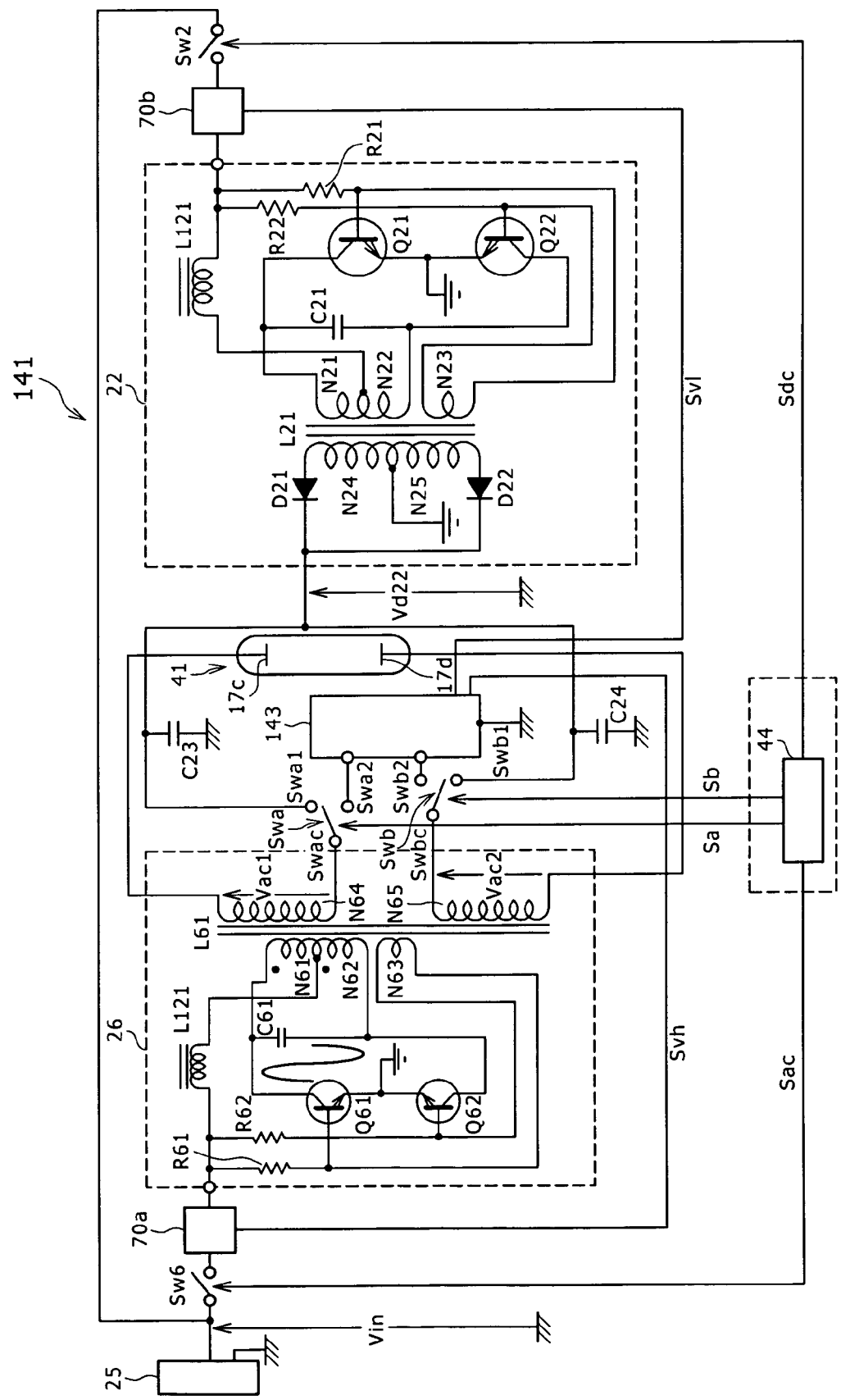
FIG. 29 is a circuit diagram showing a modification to the cold cathode fluorescent lamp of FIG. 27.

A cold cathode fluorescent lamp apparatus 141 shown in FIG. 29 is a modification to the cold cathode fluorescent lamp apparatus 130 of the fifth embodiment. The cold cathode fluorescent lamp apparatus 141 includes, in place of the series regulator, a switching regulator having a switching regulator power section 70a and another switching regulator having another switching regulator power section 70b.

[Cold Cathode Fluorescent Lamp Apparatus of the Sixth Embodiment]

Where driving power from the ac driving circuit 26 is used to perform turning on and off of the cold cathode fluorescent lamp 41 (to cause the cold cathode fluorescent lamp 41 to emit light and emit no light) at a high speed, a high-speed high-power switching element is required in order to turn on/off the current of a system which handles high power. Further, where such a switching regulator as is used in the fifth embodiment is used to control the output voltage, the turning on/off of the current cannot be performed at a speed higher than that provided by the time constant of the filter of the switching regulator.

Taking the foregoing into consideration, the cold cathode fluorescent lamp apparatus of the sixth embodiment achieves high speed on/off turning where the driving power from the ac driving circuit 26 is used to drive the cold cathode fluorescent lamp 41. The sixth embodiment and modifications thereto are described with reference to FIGS. 30 to 34.

Figure 30:
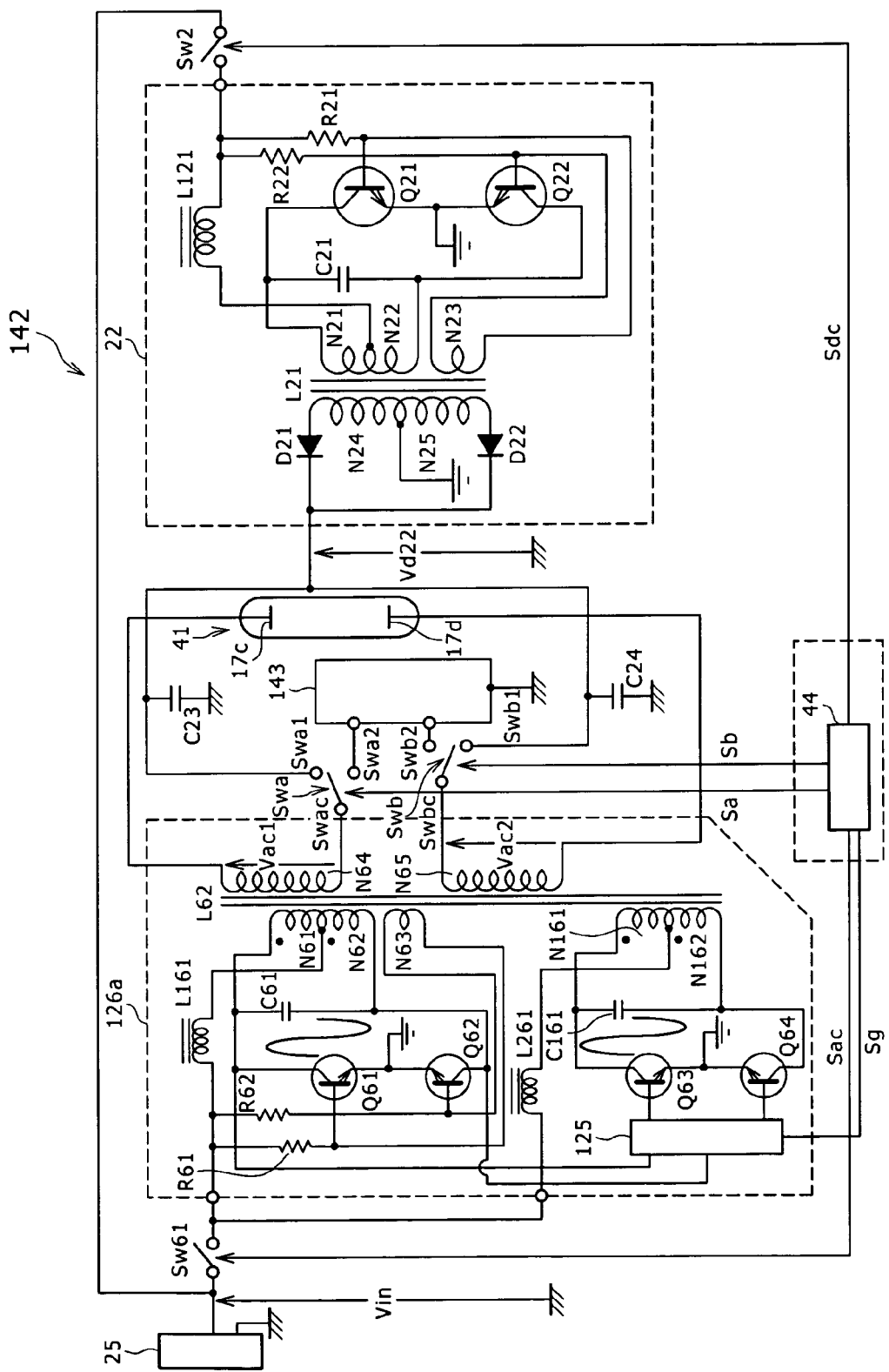
FIG. 30 is a circuit diagram showing a cold cathode fluorescent lamp apparatus according to a sixth embodiment of the present invention.

FIG. 30 shows a cold cathode fluorescent lamp apparatus 142 of the sixth embodiment. In the cold cathode fluorescent lamp apparatus 142, in addition to primary side windings N61 and N62, different primary side windings N161 and N162 are wound on the core of an oscillation and conversion transformer L62 disposed in an ac driving circuit 126a. Further, a capacitor C161 is connected in parallel to the primary side windings N161 and N162, and a dc voltage Vin can be supplied through an inductor L261 to a center tap which is a node between the primary side windings N161 and N162. A resonance circuit is formed from the capacitor C161, the inductance values of the primary side windings N161 and N162 and the total reactance of the secondary side as viewed equivalently from the primary side. The resonance circuit has a resonance frequency set equal to that of another resonance circuit which is formed from the capacitor C61, the inductance values of the primary side windings N61 and N62 and, the total reactance of the secondary side as viewed equivalently from the primary side. In this manner, the two resonance circuits resonate with an equal resonance frequency.

Referring to FIG. 30, a dark round mark (●) applied in the proximity of each of the primary side windings N61, N62, N161 and N162 of the oscillation and conversion transformer L62 represents a winding starting end. Here, a first ac power generation section formed from the transistors Q61 and Q62 supplies ac power having a waveform proximate to a sine waveform to the primary side windings N61 and N62 by self-excited oscillation. Meanwhile, a second ac power generation section formed from transistors Q63 and Q64 drives the bases of the transistors Q63 and Q64 with a signal obtained by a driving waveform control section 125 processing an oscillation signal from the first ac power generation section. Then, the resonance frequency which depends upon the capacitor. C161, the inductance values of the primary side windings N161 and N162 and the total reactance of the secondary side as viewed equivalently from the primary side is set so as to be equal to the self-excited oscillation frequency. Then, ac power of the sine wave of the self-excited oscillation frequency is supplied to the primary side windings N161 and N162.

Here, two cases are available including a case wherein magnetic fluxes generated by the primary side windings N61 and N62 and magnetic fluxes generated by the primary, side windings N161 and N162 are operated for addition and another case wherein magnetic fluxes generated by the primary side windings N61 and N62 and magnetic fluxes generated by the primary side windings N161 and N162 are operated for subtraction. In particular, whether the magnetic fluxes should be operated for addition or subtraction depends upon a combination of two relationships including a relationship between the winding direction of the primary side windings N61 and N62 and the winding direction of the primary side windings N161 and N162 and another relationship of whether the phases of a voltage generated in the first ac power generation section and another voltage generated in the second ac power generation section are the same phase or the opposite phases. This is hereinafter described in detail with further reference to FIGS. 32 and 33.

Figure 31:
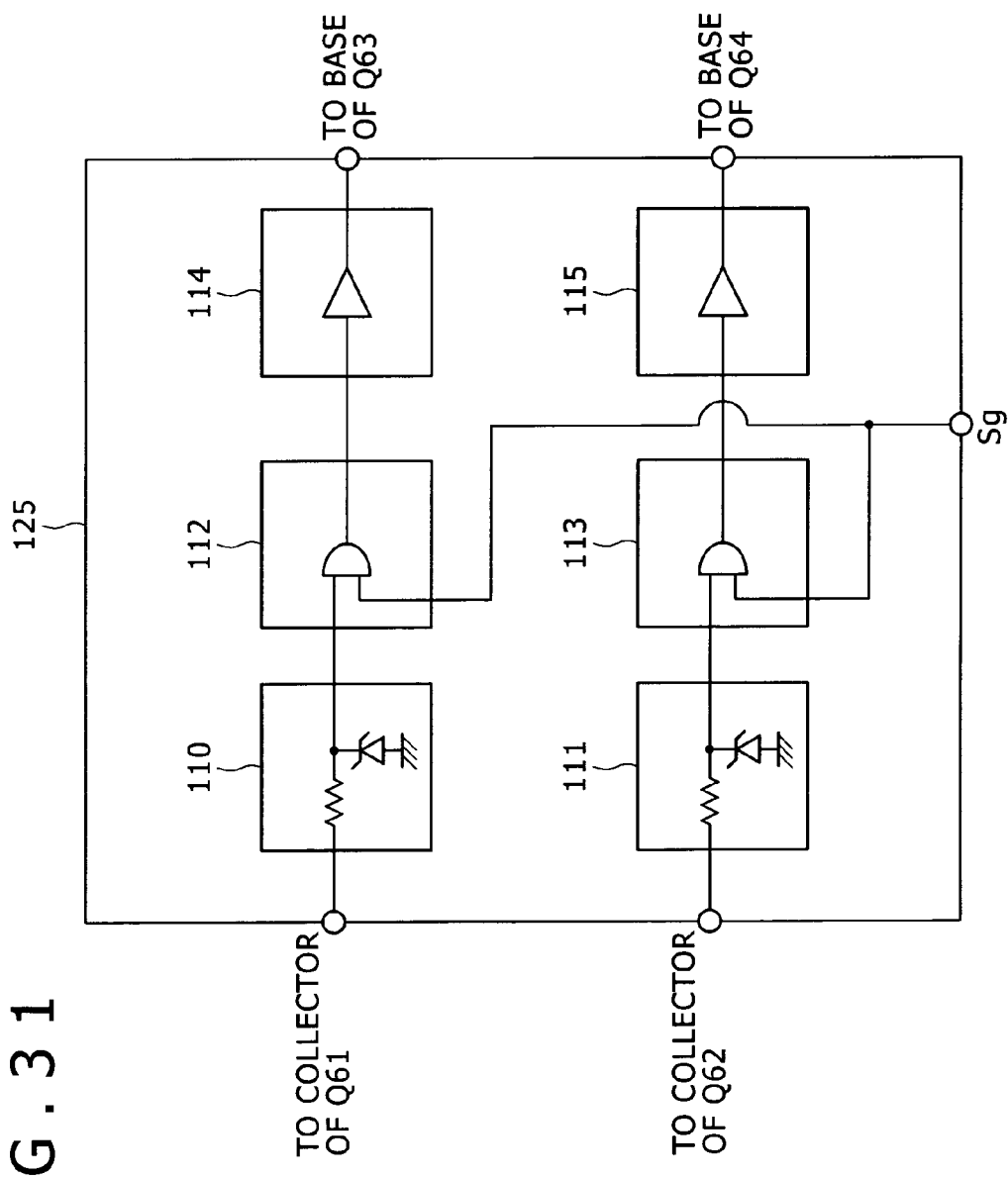
FIG. 31 is a circuit diagram showing a driving waveform control circuit shown in FIG. 30.

The driving waveform control section 125 is described with reference to FIG. 31. A waveform shaping circuit 110 is formed from a resistor and a Zener diode and slices a sine wave generated at the collector of the transistor Q61 to form a square wave. A gate 112 is formed from, for example, an AND gate, and when a signal Sg from the changeover control circuit 44 has the high level, the square wave from the waveform shaping circuit 110 passes through the gate 112. However, when the signal Sg has the low level, the gate 112 outputs a signal of the low level. A buffer 114 is a power amplifier for driving the base of the transistor Q63. Another waveform shaping circuit 111 has a configuration same as that of the waveform shaping circuit 110; another gate 113 has a configuration same as that of the gate 112; and another buffer 115 has a configuration same as that of the buffer 114. Thus, when the signal Sg has the high level, a square wave having a phase same as that of the sine wave generated at the collector of the transistor Q61 is supplied to the base of the transistor Q63, and a square wave having a phase same as that of the wine wave generated at the collector of the transistor Q62 is supplied to the base of the transistor Q64. Accordingly, the first ac power generation section and the second ac power generation section supply oscillation powers of the opposite phases to each other to the respective primary side windings. It is to be noted that the length of dead time (period of time within which both of the transistors Q63 and Q64 are off) can be adjusted by varying the voltage of the Zener diode.

As seen from the marks of winding starting ends applied to the primary side windings N61, N62, N161 and N162 of the ac driving circuit 126a shown in FIG. 30, the primary side windings N61, N62, N161 and N162 are wound in the same direction, and the first and second ac power generation sections supply oscillation powers of the opposite phases to each other to the respective primary side windings. Therefore, when the signal Sg has the high level, magnetic fluxes are diminished, and the amplitude of the ac voltages generated in the secondary side windings' N63 and N64 is reduced small and the cold cathode fluorescent lamp 41 exhibits an off state. On the other hand, when the signal Sg has the low level, the second ac power generation section does not generate an ac voltage. Consequently, the ac voltages generated in the primary side windings N63 and N64 have a great amplitude, and the cold cathode fluorescent lamp 41 exhibits an on state.

In this manner, on/off control of the cold cathode fluorescent lamp 41 can be performed by control of the signal Sg. Here, since the speed of response of the gates 112 and 113 and the buffers 114 and 115 is very high, the on/off control of the cold cathode fluorescent lamp 41 is very fast. It is to be noted that, in this instance, the signal Svh and the signal Svl from the current direction control circuit 143 are not used at all.

Figure 32:
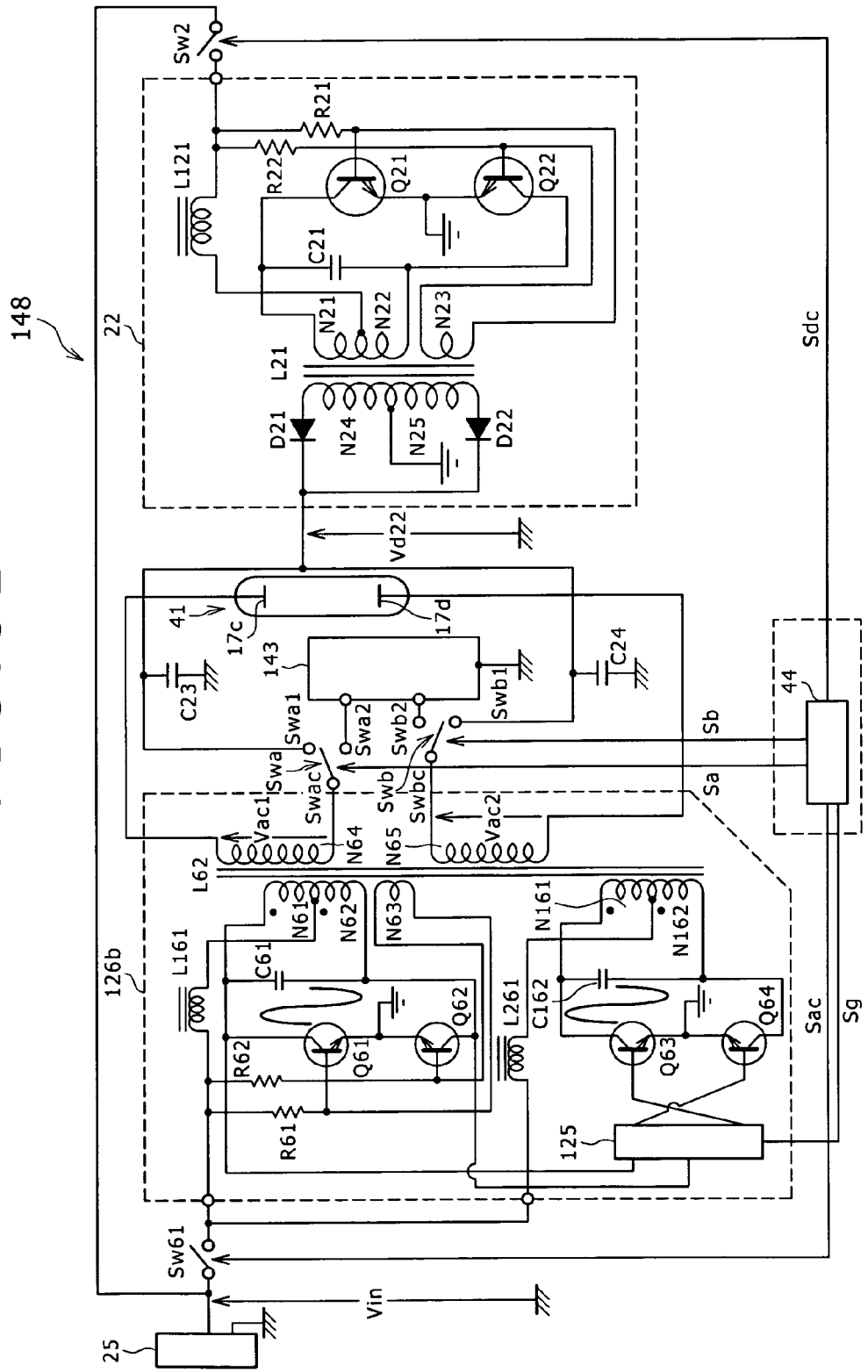
FIGS. 32 and 33 are circuit diagrams showing modifications to the cold cathode fluorescent lamp apparatus of FIG. 30.

FIG. 32 shows a cold cathode fluorescent lamp apparatus 148 which is a modification to the cold cathode fluorescent lamp apparatus 142 of the sixth embodiment. An ac driving circuit 126b of the cold cathode fluorescent lamp apparatus 148 is different from the ac driving circuit 126a of the cold cathode fluorescent lamp apparatus 142 in that the driving waveform control section 125 is connected such that the two output signals therefrom are supplied to the base of the transistor Q63 and the base of the transistor Q64 in an exchanged connection scheme from that in the cold cathode fluorescent lamp apparatus 142 of the sixth embodiment. In this manner, the first ac power generation section and the second ac power generation section supply oscillation powers of the same phase to the individual primary side windings. Then, in the core, magnetic fluxes are added to increase the amount of current to flow through the cold cathode fluorescent lamp 41 thereby to raise the luminance of the cold cathode fluorescent lamp 41 to make the cold cathode fluorescent lamp 41 brighter at a moment.

Figure 33:
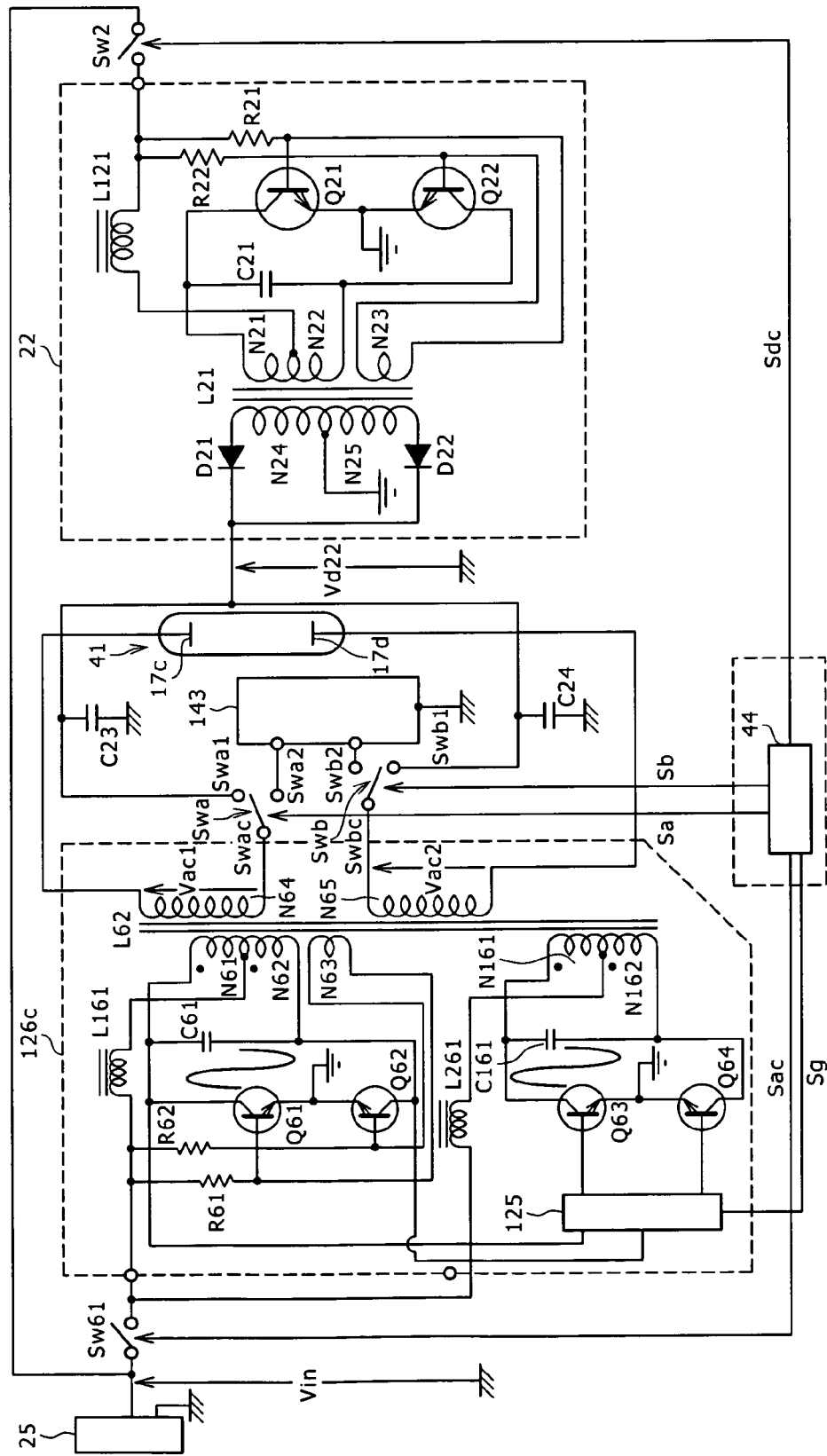

FIG. 33 shows a cold cathode fluorescent lamp apparatus 144 which is another modification to the cold cathode fluorescent lamp apparatus 142 of the sixth embodiment. As seen from the marks of winding starting ends applied to the primary side windings N61, N62, N161 and N162 of an ac driving circuit 126*c* shown in FIG. 33, the primary side windings N61, N62 and N161, N162 are wound in the opposite directions to each other, and the first and second ac power generation sections supply oscillation powers of the opposite phases to each other to the respective primary side windings. Therefore, when the signal Sg has the high level, the ac voltages generated in the secondary side windings N63 and N64 have a great amplitude, and the cold cathode fluorescent lamp 41 emits light more brightly. On the other hand, when the signal Sg has the low level, the second ac power generation section does not generate an ac voltage, and the ac voltages generated in the secondary side windings N63 and N64 have a great amplitude and the cold cathode fluorescent lamp 41 emits light with an ordinary luminance.

It is to be noted that, if switching among three modes including two modes wherein the signal for driving the base of the transistor Q63 and the signal for driving the base of the transistor Q64 are exchanged and a further mode wherein both of the base voltages to the transistors Q63 and Q64 are reduced to zero is controlled by the changeover control circuit in the driving waveform control section, then the driving waveform control section can be provided with a high speed changeover function of the luminance of the cold cathode fluorescent lamp 41 between two stages and an on/off function through selection of one of addition of magnetic fluxes, subtraction of magnetic fluxes and absence of any of addition and subtraction of magnetic fluxes.

[Cold Cathode Fluorescent Lamp Apparatus of the Seventh Embodiment]

Figure 34:
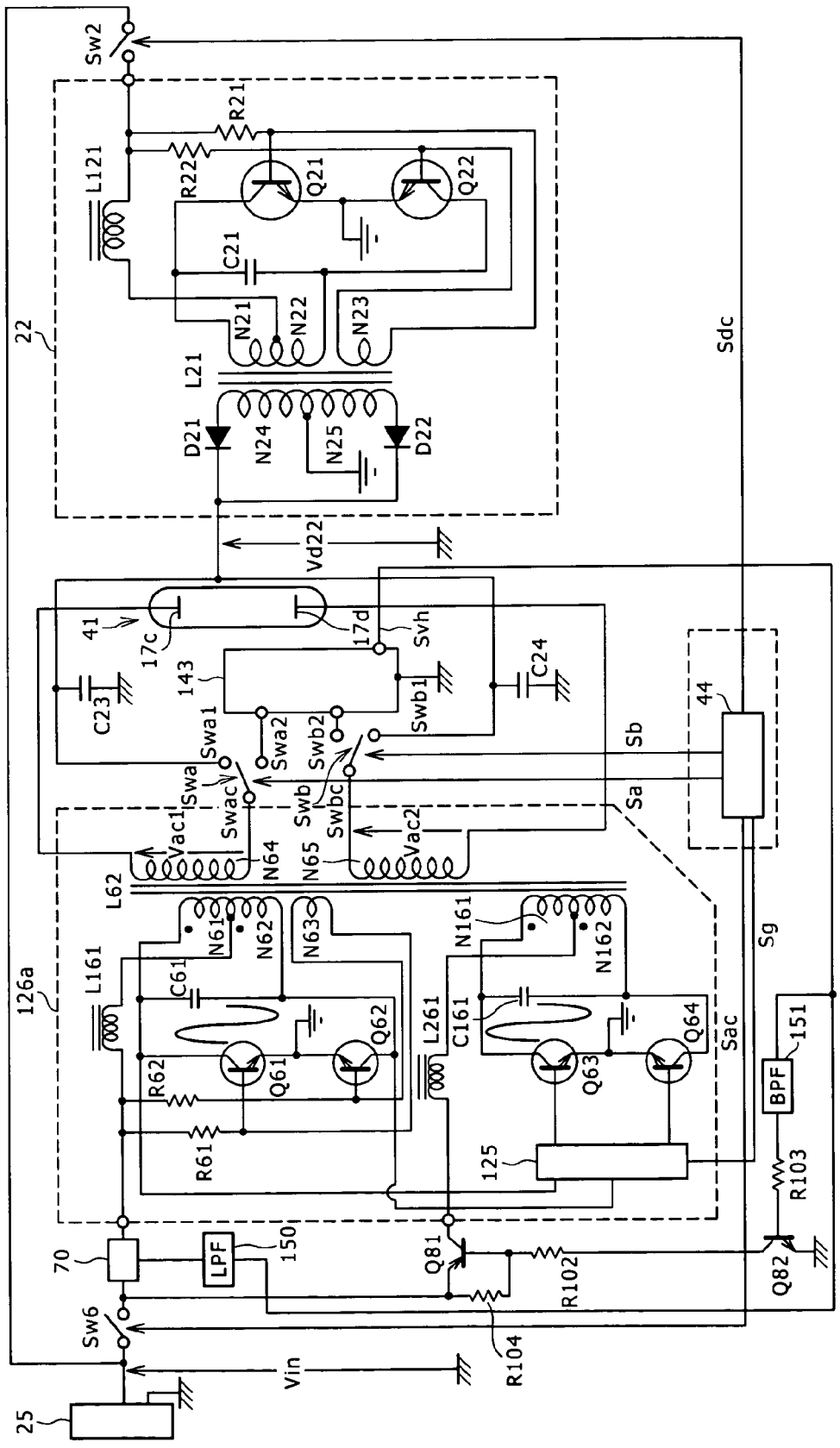
FIG. 34 is a circuit diagram showing a cold cathode fluorescent lamp apparatus according to a seventh embodiment of the present invention.
Figure 36:
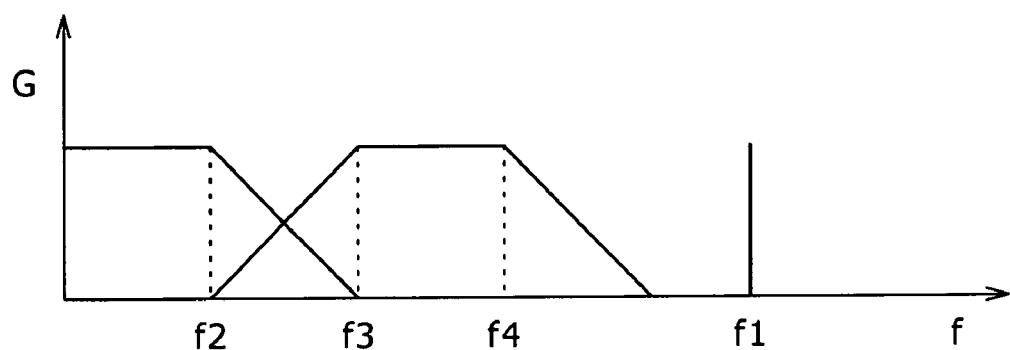
FIG. 36 is a timing chart illustrating a relationship of a resonance frequency to a band-pass filter and a low-pass filter of the cold cathode fluorescent lamp of FIG. 34.

FIG. 34 shows a cold cathode fluorescent lamp apparatus 145 of the seventh embodiment of the present invention. Referring to FIG. 34, an ac driving circuit 126*a* is configured such that magnetic fluxes generated in the core by the primary side windings N61 and N62 and magnetic fluxes generated in the core by the primary side winding N161 are added. Further, power is supplied to a first ac power generation section through a switching regulator, and power is supplied to a second ac power generation section through a series regulator. Here, a signal for controlling the switching regulator power section 70 is obtained by passing a signal Svh through a low-pass filter (LPF) 150, and a signal for controlling the series regulator is obtained by passing the signal Svh through a band-pass filter (BPF) 151. Here, the cutoff frequency of the low-pass filter (LPF) 150 is such a cutoff frequency f2 as illustrated in FIG. 36, and the cutoff frequency of the band-pass filter (BPF) 151 is such as indicated by a cutoff frequency f3 and another cutoff frequency f4 in FIG. 36. A cutoff frequency f1 is a resonance frequency of a resonance circuit formed from the capacitor C61 and a leakage inductance component produced by a series connection of the primary side windings N61 and N62, that is, a frequency of a sine wave generated by the ac power generation section.

As seen in FIG. 36, the pass band of the low-pass filter 150 and the pass band of the band-pass filter 151 are displaced from each other to assure a sufficient stagger ratio so that a feedback system formed as the series regulator and another feedback system formed as the switching regulator may not interfere with each other. Since the series regulator takes charge of a high speed response and the switching regulator takes charge of a low speed response in this manner, the control system is optimized and the magnitude of current to flow through the cold cathode fluorescent lamp 41 is kept fixed. Further, while, in FIG. 34, magnetic fluxes are added by action of the two band-divided control systems to keep the magnitude of current to flow through the cold cathode fluorescent lamp 41 fixed, another feedback loop which keeps the magnitude of current to flow through the cold cathode fluorescent lamp 41 fixed can be configured also by replacing the ac driving circuit 126*a* shown in FIG. 34 with the ac driving circuit 126*b* shown in FIG. 32 or with the ac driving circuit 126*c* shown in FIG. 33 and reversing the phase of the band-pass filter 151 so that subtraction of magnetic fluxes is performed.

Figure 35:
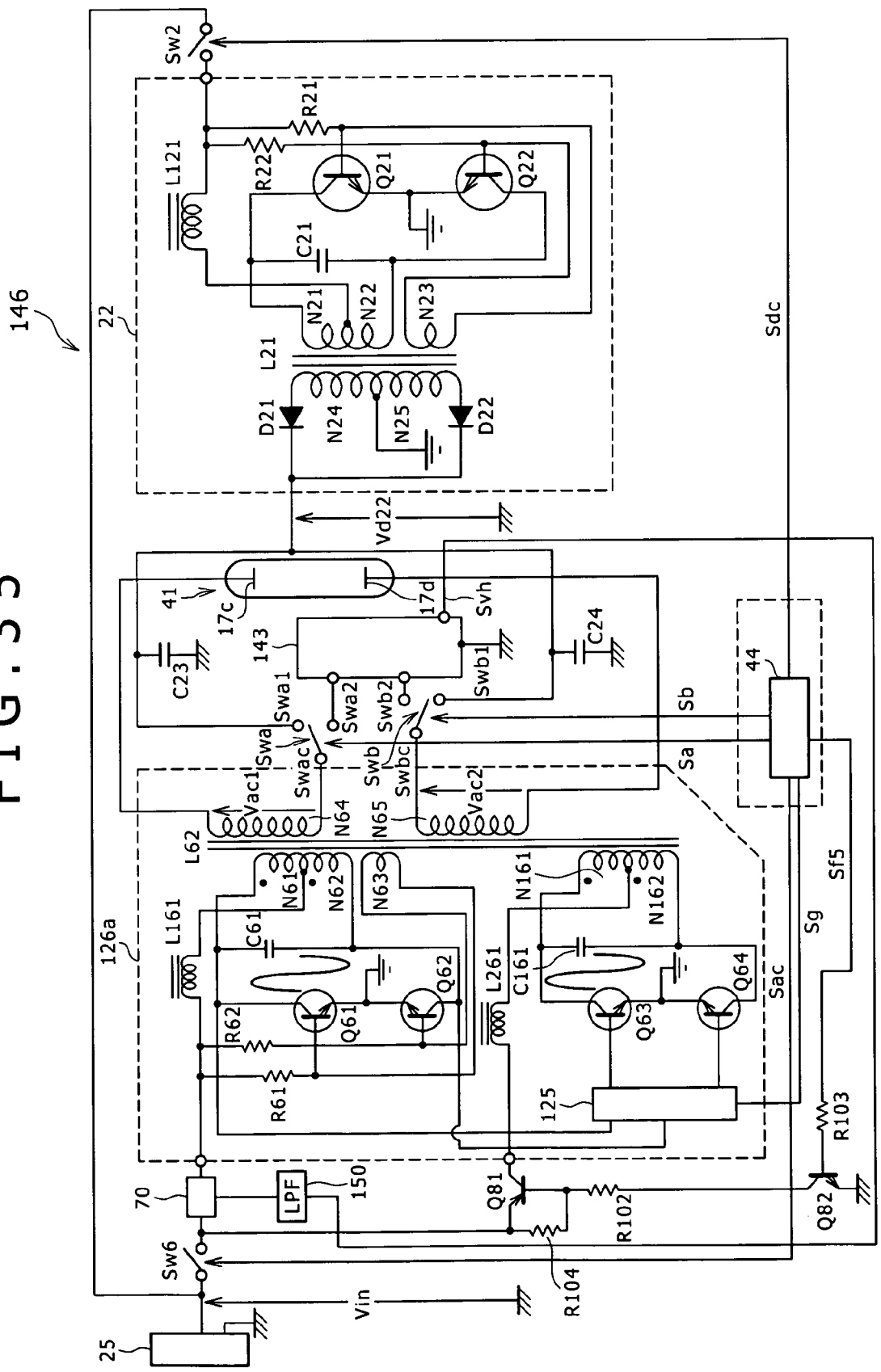
FIG. 35 is a circuit diagram showing a modification to the cold cathode fluorescent lamp apparatus of FIG. 34.
Figure 37:
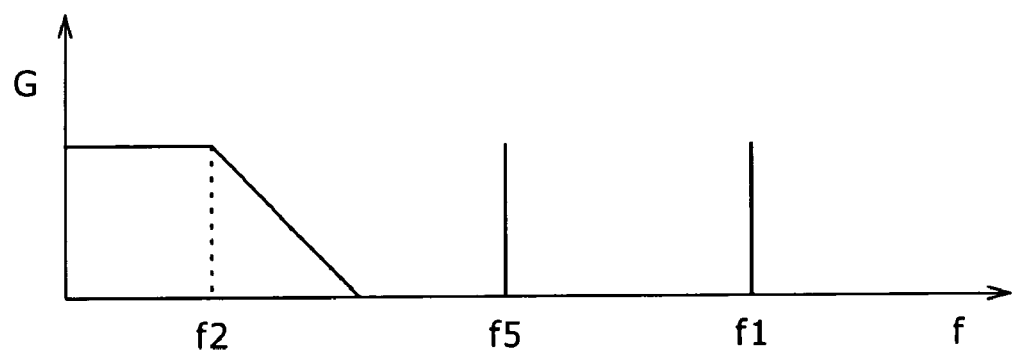
FIG. 37 is a timing chart illustrating a relationship among the low-pass filter shown in FIG. 34, a signal and a resonance frequency.
Figure 38:
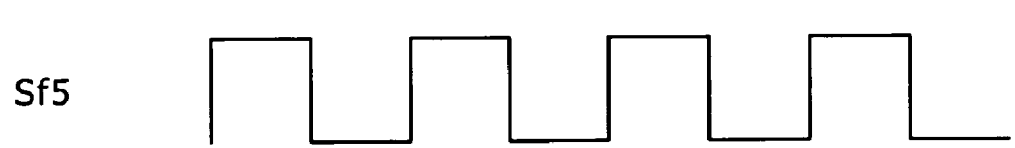
FIG. 38 is a waveform diagram illustrating a waveform of the signal shown in FIG. 37.

FIG. 35 shows a cold cathode fluorescent lamp apparatus 146 of a modification to the cold cathode fluorescent lamp apparatus 145 of the seventh embodiment. In the present modification, the switching regulator responds at a low speed to keep steady current to the cold cathode fluorescent lamp 41, which is driven by the first and second ac voltage generation sections of the ac driving circuit 126*a*, fixed while the cold cathode fluorescent lamp 41 is turned on/off at a high speed with a signal Sf5 by the second ac voltage generation section. Here, the cutoff frequency f1 of the low-pass filter 150 is lower than the cycle frequency of the signal Sf5 as seen in FIG. 37. FIG. 38 illustrates a waveform of the signal Sf5. In this manner, on/off control of the cold cathode fluorescent lamp 41 can be performed while the steady current of the cold cathode fluorescent lamp 41 is kept fixed.

Further, if switching among three modes including two modes wherein the signal for driving the base of the transistor Q63 and the signal for driving the base of the transistor Q64 are exchanged and a further mode wherein both of the base voltages to the transistors Q63 and Q64 are reduced to zero is controlled by the changeover control circuit similarly as in the sixth embodiment described hereinabove, then while the average value of current to flow through the cold cathode fluorescent lamp 41 is fixed, high-speed changeover of the luminance of the cold cathode fluorescent lamp 41 between two stages can be achieved while a function of repeating on/off of the cold cathode fluorescent lamp 41 based on the waveform of the signal Sf5 and a function of turning off of the cold cathode fluorescent lamp 41 are provided.

[Other Modifications to the Cold Cathode Fluorescent Lamp Apparatus]

In the sixth embodiment described above, high-speed on/off operation can be achieved where the cold cathode fluorescent lamp 41 is driven with driving power from the ac driving sections 126*a* to 126*c*. On the other hand, in the seventh embodiment, a good constant current characteristic is achieved where the cold cathode fluorescent lamp 41 is driven with driving power from the ac driving sections 126*a* to 126*c* (a case wherein the ac driving circuit 126*b* and the ac driving circuit 126*c* are used is not shown). In a circuit configuration similar to those used in the sixth and seventh embodiments, a rectification circuit can be further connected to a secondary side winding to make it possible to turn the cold cathode fluorescent lamp 41 on/off at a high speed with the driving power from the dc driving circuit and drive the cold cathode fluorescent lamp 41 with a good constant current characteristic with the driving power from the dc driving circuit.

Figure 39:
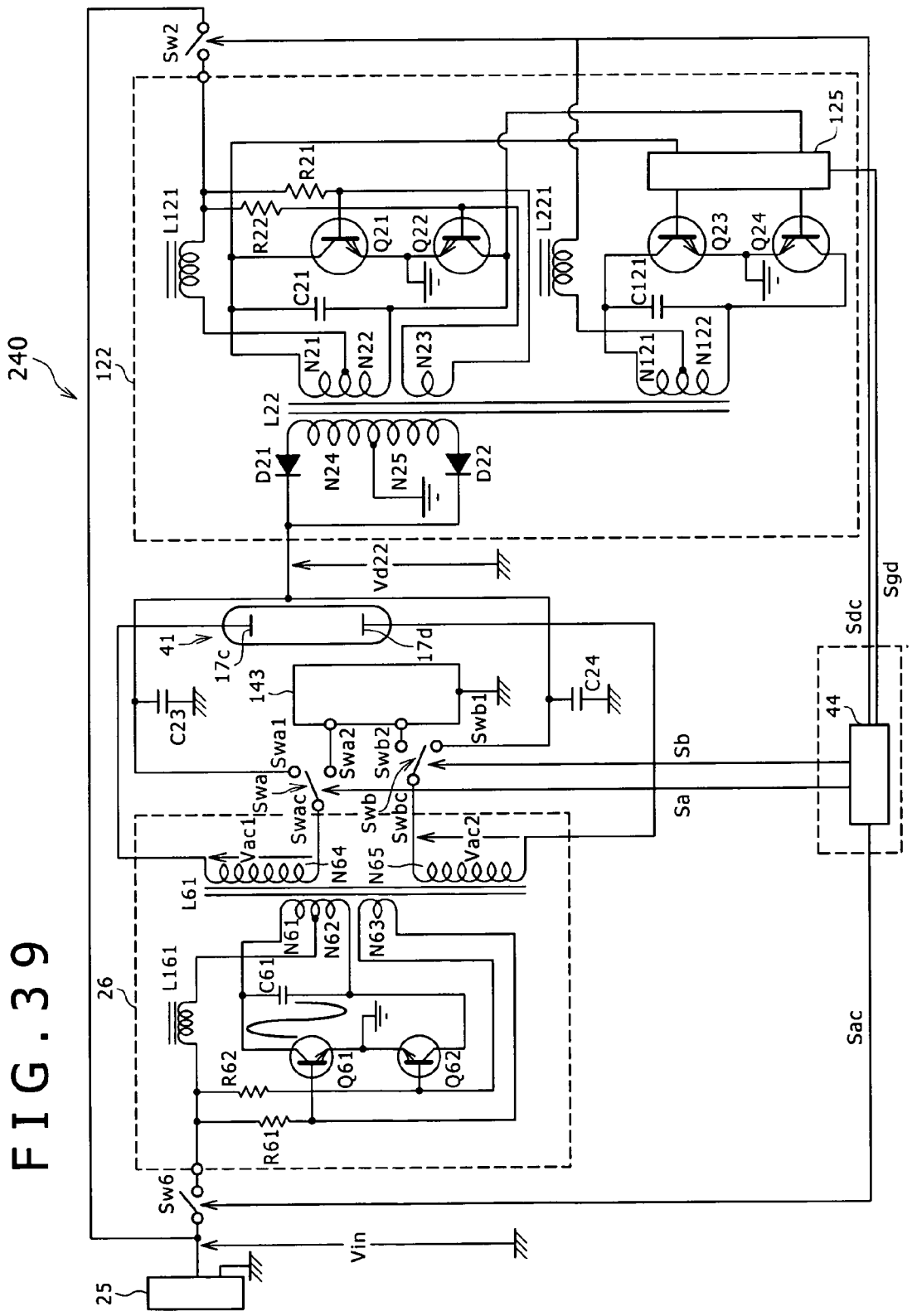
FIGS. 39 to 43 are circuit diagrams showing various modifications to the cold cathode fluorescent lamp apparatus of the embodiments.

For example, a cold cathode fluorescent lamp apparatus 240 shown in FIG. 39 adopts a configuration similar to that of the cold cathode fluorescent lamp apparatus 142 shown in FIG. 30 to achieve a high speed response of a dc driving circuit 122. In particular, in addition to the primary windings N21 and N22, primary side windings N121 and N122 are wound on the core of an oscillation and conversion transformer L22 disposed in the dc driving circuit 122. Further, a capacitor C121 is connected in parallel to the primary side windings N121 and N122, and a dc voltage Vin can be supplied to a center tap which is a node between the primary side windings N121 and N122 through an inductor L221. A resonance circuit is formed from the capacitor C121 and the primary side windings N121 and N122 and has a resonance frequency set equal to that of another resonance frequency formed from the capacitor C21 and the primary windings N21 and N22. In this manner, the two resonance circuits resonate with the same resonance frequency.

Thus, the bases of transistors Q23 and Q24 are driven by the driving waveform control section 125 to perform addition or subtraction of magnetic fluxes in the core of the oscillation and conversion transformer L22 similarly as in the case illustrated in FIG. 30 or 33 depending upon the polarity of the windings of the primary side windings N121 and N122 in a similar manner as described above. Further, though not shown, addition or subtraction of magnetic fluxes in the core of the oscillation and conversion transformer L22 can be performed similarly as in the case of FIG. 33 depending upon the combination of the polarities of signals from the driving waveform control section 125. A signal Sgd is used to control whether addition or subtraction or else none of addition and subtraction should be performed and corresponds to the signal Sg illustrated in FIG. 30. The diodes D21 and D22 are connected to the secondary side N24 and N25, respectively, so that a dc voltage Vd22 may be obtained. In this manner, the value of the dc voltage Vd22 can be controlled quickly with the signal Sgd to turn on/off the cold cathode fluorescent lamp 41 at a high speed.

Figure 40:
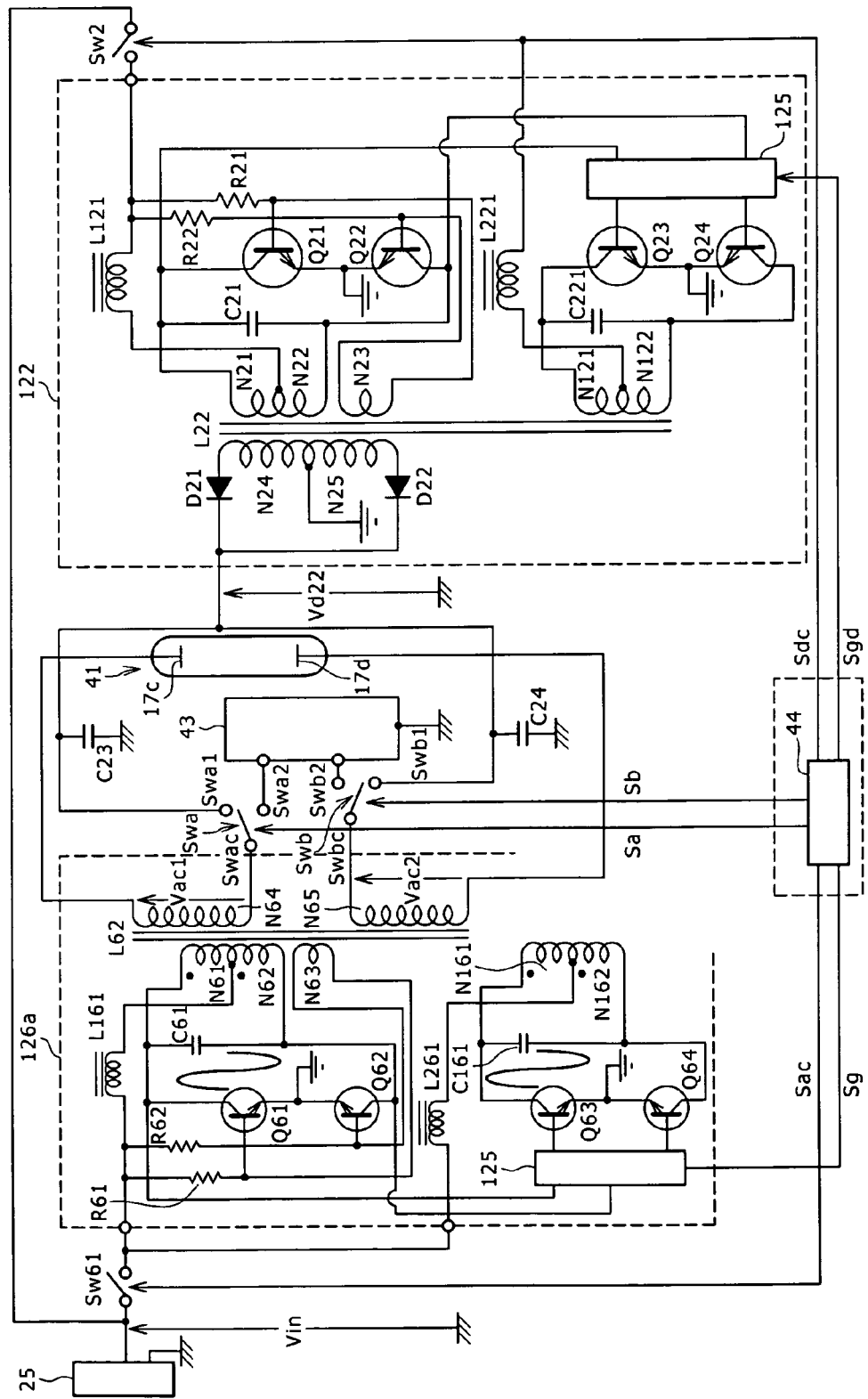

A cold cathode fluorescent lamp apparatus 242 shown in FIG. 40 includes a combination of the dc driving circuit 122 and the ac driving circuit 126a. This configuration makes it possible for the cold cathode fluorescent lamp 41 to turn on/off at a high speed both upon dc driving and upon ac driving.

Figure 41:
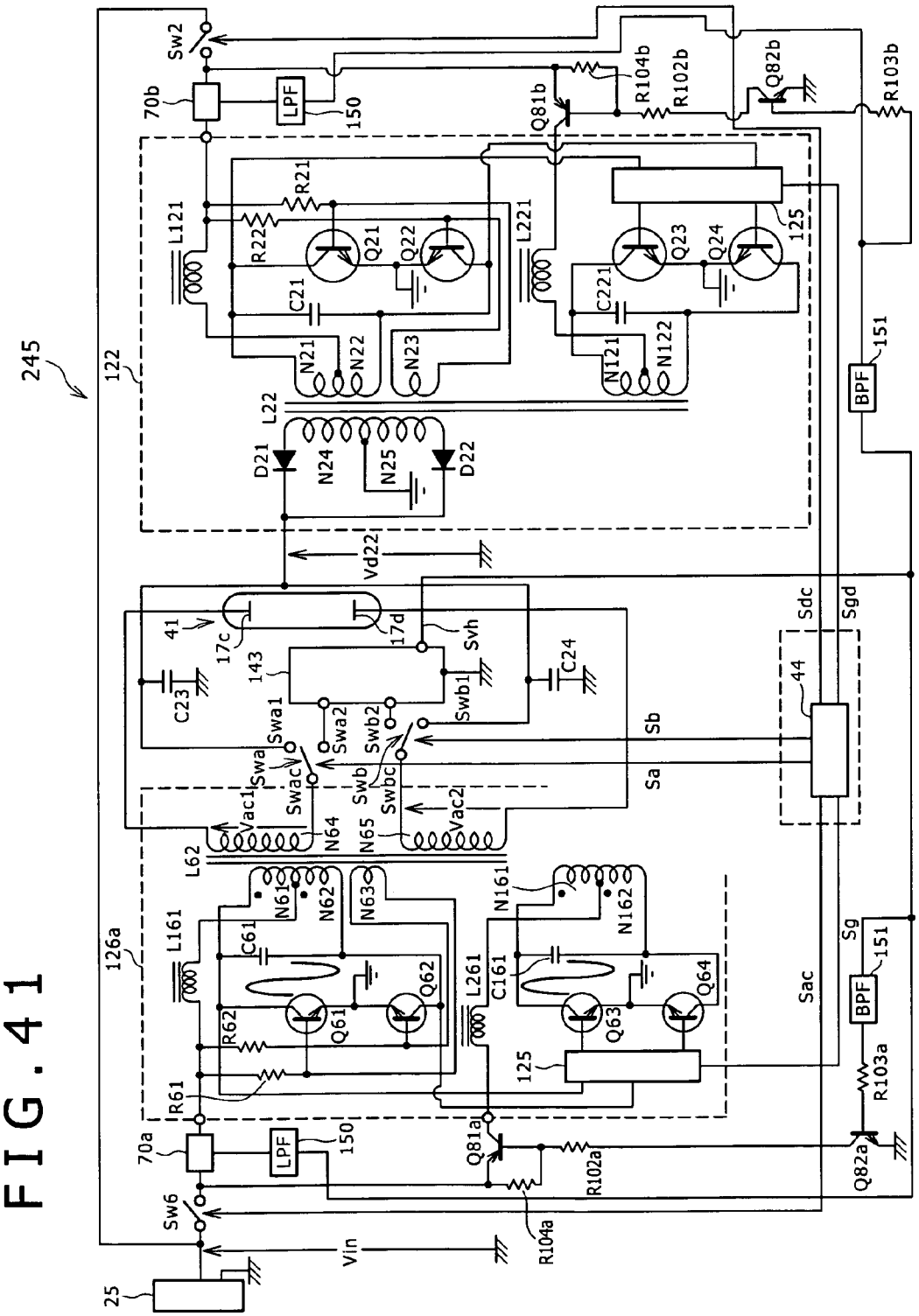

Meanwhile, a cold cathode fluorescent lamp apparatus 245 shown in FIG. 41 is a modification to the cold cathode fluorescent lamp apparatus 146 shown in FIG. 35 in that the configuration adopted in the ac driving circuit 126a for controlling the current to flow to the cold cathode fluorescent lamp 41 to fixed current is adopted also for the dc driving circuit 122. With the cold cathode fluorescent lamp apparatus 245, a constant current characteristic can be achieved upon both of ac driving and dc driving.

The modifications described above are mere examples of modifications to the sixth and seventh embodiments, and various other combinations can be adopted. For example, it is possible to adopt, in addition to the modifications described hereinabove, the circuit configurations adopted only for the ac driving circuits for the dc driving circuits or both for the ac driving circuit and the dc driving circuit. Then, the effects achieved by the individual configurations can be achieved in an overlapping relationship depending upon the combination.

Figure 42:
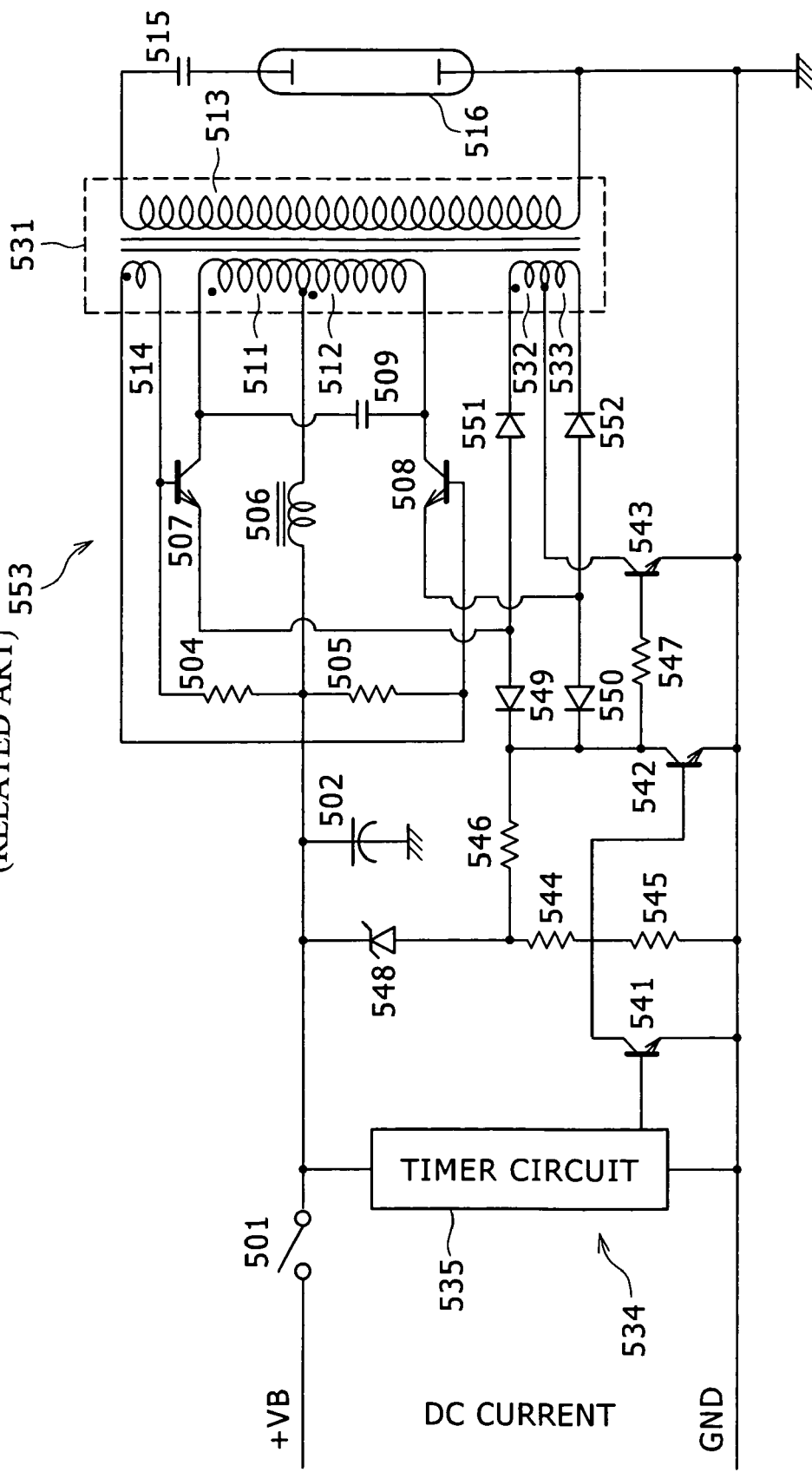
Figure 43:
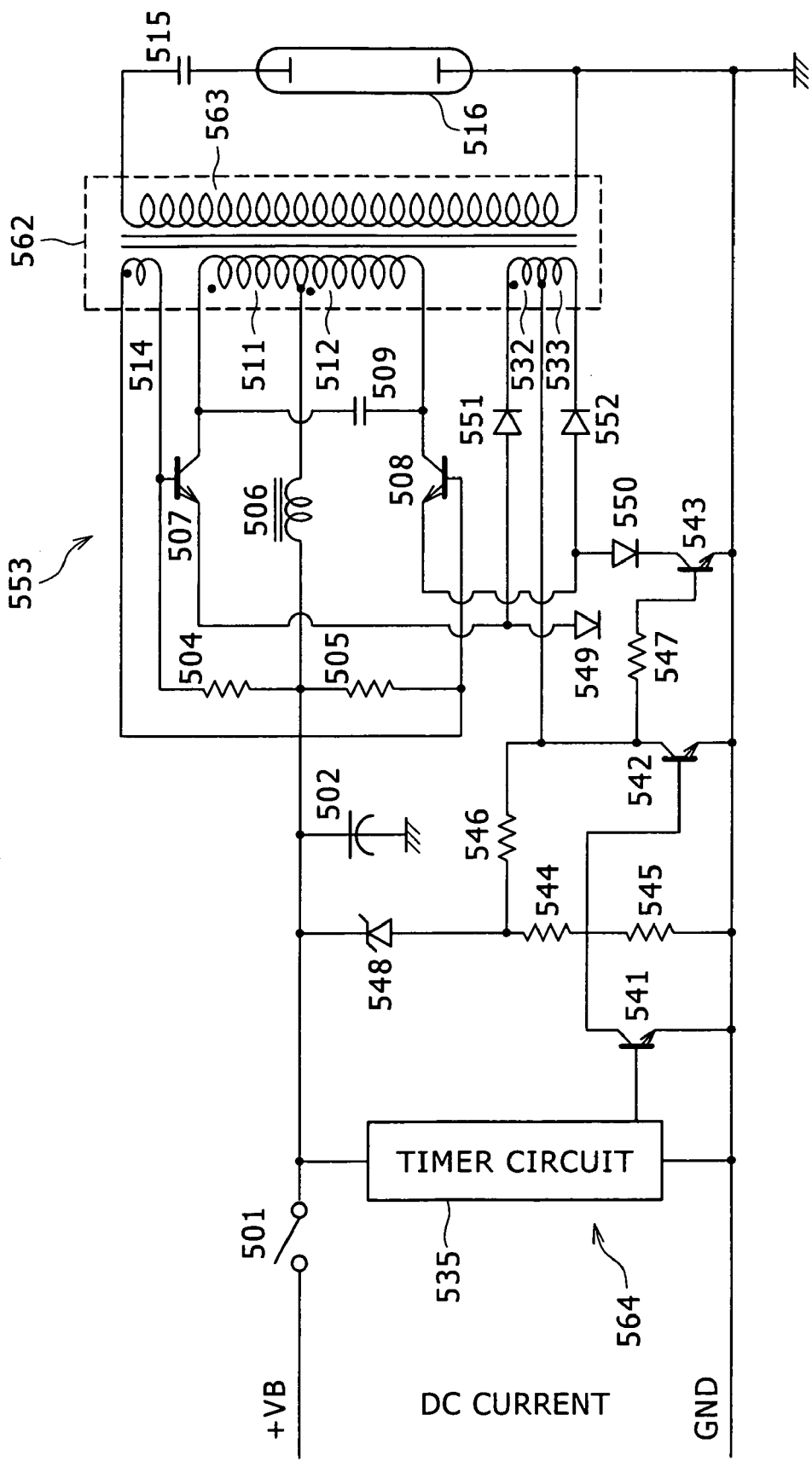

FIGS. 42 and 43 show circuits disclosed in Patent Document 2 cited in the description of the related art. However, the primary side circuits of the related art circuits, that is, a circuit section on the right side in FIGS. 42 and 43 with respect to a transformer (oscillation and conversion transformer) 531 or 562 can be adopted as the primary side circuit in the cold cathode fluorescent lamp apparatus of any of the first to seventh embodiments and the modifications to the embodiments described hereinabove.

Such circuits as just mentioned are described with reference to FIGS. 42 and 43. Referring first to FIG. 42, an oscillation circuit (cold cathode fluorescent lamp apparatus) 553 includes a transformer (oscillation and conversion transformer) 531 which in turn includes quaternary coils (primary side windings) 532 and 533 in addition to primary coils (primary side windings) 511 and 512, a secondary coil (secondary side winding) 513 and a tertiary coil (primary side winding), 514. A changeover circuit 534 is provided in order to change the connection condition of the quaternary coils 532 and 533 to the primary coils 511 and 512. The changeover circuit 534 includes a timer circuit 535 for performing time counting operation for a predetermined period of time after a power supply switch 501 is switched on. An output of the timer circuit 535 is connected to the base of an NPN transistor 541 whose collector is connected to a node between resistors 544 and 545 and whose emitter is grounded. The other end of the resistor 544 is connected to one end of a capacitor 502 through a Zener diode 548, and the other end of the resistor 545 is grounded. A node between the resistor 544 and the Zener diode 548 is connected to the collector of an NPN transistor 542, whose emitter is grounded, through a resistor 546. The collector of the NPN transistor 542 is connected to the base of an NPN transistor 543, whose emitter is grounded, through a resistor 547. The collector of the NPN transistor 543 is connected to a node between the quaternary coils 532 and 533.

The emitter of an NPN transistor 507 is connected to one end of the quaternary coil 532 through a diode 551, and the emitter of another NPN transistor 508 is connected to one end of the quaternary coil 533 through a diode 552. Further, the anodes of the diodes 551 and 552 are connected to the collector of the NPN transistor 542 through diodes 549 and 550, respectively.

Operation of the circuit shown in FIG. 42 is described. If the power supply switch 501 is switched on, then the capacitor 502 is charged with a dc voltage. Then, the voltage charged in the capacitor 502 is supplied to the oscillation circuit 553. Meanwhile, the timer circuit 535 starts its time counting operation when the power supply switch 501 is switched on, and continues to output a voltage of a high level for a fixed period of time (for example, 5 seconds) set in advance. Consequently, the NPN transistor 541 is turned on and the base thereof is grounded through the NPN transistor 541, and as a result, the NPN transistor 542 is turned off. As a result, a voltage of the high level is applied to the NPN transistor 543 through a route of the capacitor 502, Zener diode 548 and resistors 546 and 547 to turn on the NPN transistor 543. In the oscillation circuit 553, the NPN transistors 507 and 508 are turned on alternately and start an oscillation operation. When the NPN transistor 507 is turned on, current flows along a route of a choke coil 506, the primary coil 511, NPN transistor 507, diode 551, quaternary coil 532 and NPN transistor 543. On the other hand, when the NPN transistor 508 is turned on, current flows along another route of the choke coil 506, primary coil 512, NPN transistor 508, diode 552, quaternary coil 533 and NPN transistor 543.

The primary coil 511 and the quaternary coil 532, and the primary coil 512 and the quaternary coil 533, are connected so that a voltage applied thereto and a voltage induced therein have the opposite polarities to each other. In particular, the primary coil 511 and the quaternary coil 532 are connected such that, when a high voltage is applied to the primary coil 511 on the node side to the choke coil 506 and a low voltage is applied to the primary coil 511 on the node side to the NPN transistor 507, a negative voltage is induced at the node between one end of the quaternary coil 532 and the cathode of the diode 551. Consequently, the voltage to be applied across the primary coil 511 increases by an amount corresponding to the voltage generated in the quaternary coil 532. Similarly, a negative voltage is generated at the node between the quaternary coil 533 and the cathode of the diode 552, and consequently, the voltage to be applied across the primary coil 512 increases by an amount corresponding to the negative voltage. Accordingly, the voltage to be induced in the secondary coil 513 increases corresponding to the voltage applied to the primary coils 511 and 512. Consequently, lighting of a fluorescent lamp (cold cathode fluorescent lamp apparatus) 516 can be started readily.

On the other hand, the timer circuit 535 changes the output thereof to the low level when the predetermined period of time set in advance elapses. Consequently, the NPN transistor 541 is turned off and the NPN transistor 542 is turned on. As a result, the base of the NPN transistor 542 is grounded through the resistor 547, and consequently, the NPN transistor 543 is turned off. As a result, the quaternary coils 532 and 533 are substantially disconnected from the primary coils 511 and 512. Then, in this instance, when the NPN transistor 507 is turned on, current flows along a route of the choke coil 506, primary coil 511, NPN transistor 507, diode 549 and NPN transistor 542. On the other hand, when the NPN transistor 508 is turned on, current flows along another route of the choke coil 506, primary coil 512, NPN transistor 508, diode 550 and NPN transistor 542. Upon steady operation of the timer circuit 535 after the time counting operation thereof comes to an end, since the quaternary coils 532 and 533 are disconnected from the primary coils 511 and 512 in this manner, respectively, the voltage to be applied to the primary coils 511 and 512 decreases by an amount corresponding to the voltage applied to the quaternary coils 532 and 533 when compared with that upon starting. As a result, also the voltage generated by the secondary coil 513 to be applied to the fluorescent lamp 516 decreases from that upon starting. If the transformer 531 side and the fluorescent lamp 516 are set so that the impedance matching therebetween may be optimized when the voltage decreases as described above, then the power can be utilized effectively. It is to be noted that, where such a configuration as just described is adopted, since changeover of the voltage to be applied to the primary coils 511 and 512 responds at a high speed, it is sufficiently possible to set the preset time for the timer circuit 535, for example, to several microseconds.

An oscillation circuit (cold cathode fluorescent lamp apparatus) 503 shown in FIG. 43 shows a different embodiment of the cold cathode fluorescent lamp apparatus, and in FIG. 43, like elements to those shown in FIG. 42 are denoted by like reference characters. In the present embodiment, a changeover circuit 564 is provided in place of the changeover circuit 534. In the changeover circuit 564, the quaternary coils 532 and 533 of the transformer 562 are connected to the primary coils 511 and 512 so that induced voltages therein may have the same polarity. Further, a secondary coil 563 having a greater number of turns than the secondary coil 513 is provided. Further, the cathodes of the diodes 549 and 550 are connected to the collector of the NPN transistor 543. Furthermore, the node between the quaternary coils 532 and 533 is connected to a node between the resistor 546 and the collector of the NPN transistor 542.

After the power supply switch 501 is switched on, the timer circuit 535 outputs a high level signal for a fixed period of time. Consequently, the NPN transistor 541 is turned on and the NPN transistor 542 is turned off, and the NPN transistor 543 is turned on. As a result, the quaternary coils 532 and 533 are grounded at one end thereof by the diodes 549 and 550 and the NPN transistor 543, respectively, and the quaternary coils 532 and 533 are substantially disconnected from the primary coils 511 and 512, respectively. Then, in the oscillation circuit 503, when the NPN transistor 507 is turned on, current flows along a path of the choke coil 506, primary coil 511, NPN transistor 507, diode 549 and NPN transistor 543. On the other hand, when the NPN transistor 508 is turned on, current flows along another route of the choke coil 506, primary coil 512, NPN transistor 508, diode 550 and NPN transistor 543. At this time, the turn number ratio of the secondary coil 563 to the primary coils 511 and 512 is set so that a voltage induced in the secondary coil 563 corresponding to current flowing through the primary coils 511 and 512 may be a sufficiently high voltage to start up the fluorescent lamp 516. As a result, lighting of the fluorescent lamp 516 is started with a high voltage induced by the secondary coil 563.

When the fixed period of time elapses, the output of the timer circuit 535 changes to the low level. Consequently, the NPN transistor 541 is turned off and the NPN transistor 542 is turned on. As a result, the NPN transistor 543 is turned off. Consequently, the quaternary coils 532 and 533 are connected to the primary coils 511 and 512, respectively. In this instance, when the NPN transistor 507 of the oscillation circuit 503 is turned on, current flows along a route of the choke coil 506, primary coil 511, NPN transistor 507, diode 551, quaternary coil 532 and NPN transistor 542. On the other hand, when the NPN transistor 508 is turned on, current flows along another route, of the choke coil 506, primary coil 512, NPN transistor 508, diode 552, quaternary coil 533 and NPN transistor 542. In this manner, different from the circuit shown in FIG. 42, n the circuit of FIG. 43, the quaternary coils 532 and 533 and the primary coils 511 and 512 are connected so that the polarity of the induced voltage of the quaternary coils 532 and 533 is the same as that of the voltage applied to the primary coils 511 and 512. Accordingly, in this instance, the voltage applied to the primary coils 511 and 512 upon starting is divisionally applied also to the quaternary coils 532 and 533. In other words, each of a composite coil of the primary coil 511 and the quaternary coil 532 and another composite coil of the primary coil 512 and the quaternary coil 533 substantially makes a primary coil, and the turn number ratio between the primary coils and the secondary coils decreases from that upon starting. As a result, also the voltage to be induced in the secondary coil 563 decreases as much. In this manner, in a steady state, the fluorescent lamp 516 is driven with a voltage lower than that upon starting. If the transformer 562 side and the fluorescent lamp 516 are set so that the impedance matching therebetween is optimum when the primary coils 511 and 512 and the quaternary coils 532 and 533 are connected and operate in an adding fashion in this manner, then the power consumption is optimized.

In FIG. 42, the secondary side of the oscillation circuit 553 is configured such that an ac voltage generated in the secondary coil 513 is applied to the fluorescent lamp 516 through a capacitor 515. However, if the secondary side is replaced by the secondary side of one of the cold cathode fluorescent lamp apparatus of the first to seventh embodiments described hereinabove, then the oscillation circuit 553 can be adopted as an ac driving circuit or a dc driving circuit. Also in FIG. 43, the secondary side of the oscillation circuit 503 is configured such that an ac voltage generated in the secondary coil 563 is applied to the fluorescent lamp 516 through the capacitor 515. However, if the secondary side is replaced by the secondary side of one of the cold cathode fluorescent lamp apparatus of the first to seventh embodiments described hereinabove, then the oscillation circuit 503 can be adopted as an ac driving circuit or a dc driving circuit.

In particular, the secondary coil 513 or 563 is altered so as to have a configuration similar to that of the secondary side windings N64 and N65. Then, if a circuit section connected to the secondary side windings and the control manner of the oscillation circuits 553 and 503 are altered so as to be similar to those of one of the cold cathode fluorescent lamp apparatus of the first to seventh embodiments and the modifications to the cold cathode fluorescent lamp apparatus described hereinabove, then a cold cathode fluorescent lamp apparatus including an ac power driving circuit which is optimized in power consumption can be provided.

Or, the secondary coil 513 or 563 is altered so as to have a configuration similar to that of the secondary side windings N64 and N65, and diodes D21 and D22 are added to the altered secondary coil. Then, if the control manner of the oscillation circuits 553 and 503 is altered so as to be similar to those of one of the cold cathode fluorescent lamp apparatus of the first to seventh embodiments and, the modifications to the cold cathode fluorescent lamp apparatus described hereinabove, then a cold cathode fluorescent lamp apparatus including an dc power driving circuit which is optimized in power consumption can be provided.

A cold cathode fluorescent lamp according to an embodiment of the present invention includes an optically transparent sealed vessel in which gas which emits light when electrons collide therewith is enclosed and which has a fluorescent material, which reacts with the light emitted from the gas, disposed on an inner face thereof which contacts with the gas, first and second internal electrodes disposed in the inside of the sealed vessel and formed at least part thereof from an electron emitting material, and first and second external electrodes disposed in a spaced relationship from each other on an outer face side of the sealed vessel. However, the cold cathode fluorescent lamp is not limited to those of the embodiments described hereinabove.

For example, the gas is not limited to mercury gas, and the light to be emitted is not limited to ultraviolet rays. Further, the fluorescent material is not limited to those which react with the ultraviolet rays. Further, the optically transparent sealed vessel is not limited to those of glass, and the shape of the optically transparent sealed vessel is not limited to the cylindrical shape either. Meanwhile, as regards the internal electrodes, it is necessary for only at least one of them to be formed from an electron emitting material. Further, it is necessary for only the first and second electrodes to be disposed in a spaced relationship from each other on the outer face side of the sealed vessel, and the structure of the first and second electrodes is not limited to that wherein the external electrodes surround the sealed vessel. Thus, the first and second external electrodes may be disposed at part of a face of the sealed vessel which contacts with the outside or may be disposed in a spaced relationship from a face of the sealed vessel which contacts with the outside. Furthermore, the first and second internal electrodes may be formed from a light transmitting conductive material and disposed in such a manner as to cover almost over the overall face of the sealed vessel which contacts with the outside.

A cold cathode fluorescent lamp driving apparatus according to an embodiment of the present invention is for driving a cold cathode fluorescent lamp which includes an optically transparent sealed vessel in which gas which emits light when electrons collide therewith is enclosed and which has a fluorescent material, which reacts with the light emitted from the gas, disposed on an inner face thereof which contacts with the gas, first and second internal electrodes disposed in the inside of the sealed vessel and formed at least part thereof from an electron emitting material, and first and second external electrodes disposed in a spaced relationship from each other on an outer face side of the sealed vessel, and includes a dc driving circuit operable to apply a dc voltage between the first and second internal electrodes, an ac driving circuit operable to apply an ac voltage between the first and second external electrodes; and a changeover circuit operable to control the dc driving circuit and the ac driving circuit such that the ac voltage is applied for a predetermined period of time to cause the electrons and the gas to collide with each other and the dc voltage is applied while the collision between the electrons and the gas continues. However, the cold cathode fluorescent lamp driving apparatus is not limited to those of the embodiments described hereinabove.

For example, the dc driving circuit may have any form only if it can supply a voltage sufficient to light the cold cathode fluorescent lamp, and may have any configuration such as, for example, a configuration which directly generates the necessary voltage without using an inverter or the like or which includes a plurality of stages of voltage doubler rectification circuits. Also the ac driving circuit may have any form similarly only if it supplies an ac voltage of a predetermined frequency and may be, for example a switching circuit which has a bridge configuration without using an inverter. Further, the changeover circuit may have any form only if it can perform the control of applying the ac voltage for a predetermined period of time and then perform the control of applying the dc voltage while the collision between electrons and the gas continues. For example, the changeover circuit may be configured so as to control not only the primary side but also the secondary side of an inverter circuit or may be configured such that part of the function of the changeover circuit is shared by the dc driving circuit or the ac driving circuit.

A cold cathode fluorescent lamp apparatus according to an embodiment of the present invention includes one or a plurality of cold cathode fluorescent lamps each including an optically transparent sealed vessel in which gas which emits light when electrons collide therewith is enclosed and which has a fluorescent material, which reacts with the light emitted from the gas, disposed on an inner face thereof which contacts with the gas, first and second internal electrodes disposed in the inside of the sealed vessel and formed at least part thereof from an electron emitting material, and first and second external electrodes disposed in a spaced relationship from each other on an outer face side of the sealed vessel, one or a plurality of dc driving circuits each operable to apply a dc voltage between the first and second internal electrodes of a corresponding one of the cold cathode fluorescent lamps, one or a plurality of constant current circuits each operable to control the magnitude of dc current to flow between the first and second internal electrodes of a corresponding one of the cold cathode fluorescent lamps to a predetermined value, one or a plurality of ac driving circuits each operable to apply an ac voltage between the first and second external electrodes of a corresponding one of the cold cathode fluorescent lamps, and a changeover circuit operable to control the dc driving circuit or circuits and the ac driving circuit or circuits such that the ac voltage is applied for a predetermined period of time to cause the electrons and the gas to collide with each other and the dc voltage is applied while the collision between the electrons and the gas continues. However, the cold cathode fluorescent lamp apparatus is not limited to those of the embodiments described hereinabove.

For example, the gas is not limited to mercury gas, and the fluorescent material is not limited to those which react with the ultraviolet rays. Further, the sealed vessel is not limited to those of glass, and the shape of the sealed vessel is not limited to the cylindrical shape either. Further, it is only necessary for the first and second external electrodes to be disposed on an outer face side of the sealed vessel, and there is no limitation to the structure of the external electrodes and the relationship in arrangement of the external electrodes with respect to the outer face of the sealed vessel either. Further, the dc driving circuit and the ac driving circuit may include some other component than an inverter circuit, and the constant current circuit may not have a feedback configuration but may have a current mirror configuration. The changeover circuit may have any form only if it can perform the control of applying the ac voltage for a predetermined period of time and then perform the control of applying the dc voltage while the collision between electrons and the gas continues. For example, the changeover circuit may be configured so as to control not only the primary side but also the secondary side of an inverter circuit or may be configured such that part of the function of the changeover circuit is shared by the dc driving circuit or the ac driving circuit. Further, where the cold cathode fluorescent lamp apparatus includes a plurality of cold cathode fluorescent lamps, there is no limitation to the number of dc driving circuits, fixed current circuits or ac driving circuits with respect to the number of cold cathode fluorescent lamps. In other words, the cold cathode fluorescent lamp may include one or a plurality of dc driving circuits, one or a plurality of ac driving circuits and one or a plurality of constant current circuits. Also with regard to whether the dc driving circuit or the constant current circuit should be provided on the anode side (high potential side) or the cathode side (low potential side) of the cold cathode fluorescent lamp, there is no limitation. Further, the configuration of the changeover circuit is not limited to those in the embodiments described hereinabove but may be altered variously depending upon the manner of control.

A liquid crystal display apparatus according to an embodiment of the present invention includes a liquid crystal display panel operable to display an image according to an image signal at a position thereof according to a synchronizing signal, and a cold cathode fluorescent lamp apparatus disposed on a rear face side of the liquid crystal display panel, the cold cathode fluorescent lamp apparatus including one or a plurality of cold cathode fluorescent lamps each including an optically transparent sealed vessel in which gas which emits light when electrons collide therewith is enclosed and which has a fluorescent material, which reacts with the light emitted from the gas, disposed on an inner face thereof which contacts with the gas, first and second internal electrodes disposed in the inside of the sealed vessel and formed from an electron emitting material, and first and second external electrodes disposed in a spaced relationship from each other on an outer face side of the sealed vessel, one or a plurality of dc driving circuits each operable to apply a dc voltage between the first and second internal electrodes of a corresponding one of the cold cathode fluorescent lamps, one or a plurality of constant current circuits each operable to control the magnitude of dc current to flow between the first and second internal electrodes of a corresponding one of the cold cathode fluorescent lamps to a predetermined value, one or a plurality of ac driving circuits each operable to apply an ac voltage between the first and second external electrodes of a corresponding one of the cold cathode fluorescent lamps, and a changeover circuit operable to control the dc driving circuit or circuits and the ac driving circuit or circuits such that the ac voltage is applied for a predetermined period of time synchronized with the synchronizing signal to cause the electrons and the gas to collide with each other and the dc voltage is applied while the collision between the electrons and the gas continues to control the polarity direction and the passage and blocking of the dc current to flow in the cold cathode fluorescent lamp or each of the cold cathode fluorescent lamps. However, the liquid crystal display apparatus is not limited to those of the embodiments described hereinabove.

For example, the image signal and the synchronizing signal are not limited to those of the NTSC system and may be based on any format. Further, there is no limitation to the size and the shape of the liquid crystal display panel. Further, there is no limitation to the gas and the fluorescent material of the cold cathode fluorescent lamp, the material and the shape of the sealed vessel, the structure of the external electrodes, and the arrangement relationship of the external electrodes to the outer face of the sealed vessel either. Further, the signal processing section, dc driving circuit, ac driving circuit, constant current circuit and changeover circuit are not limited to those of the embodiments. Furthermore, although the control of applying an ac voltage is performed for the predetermined period synchronized with the synchronizing signal, the period is not limited to those of the embodiments. Further, where the liquid crystal display apparatus includes a plurality of cold cathode fluorescent lamps, there is no limitation to the number and the configuration of the dc driving circuits, constant current circuits or ac driving circuits with respect to the number of cold cathode fluorescent lamps.

A control method according to an embodiment of the present invention is a control method for a cold cathode fluorescent lamp which includes an optically transparent sealed vessel in which gas which emits light when electrons collide therewith is enclosed and which has a fluorescent material, which reacts with the light emitted from the gas, disposed on an inner face thereof which contacts with the gas, first and second internal electrodes disposed in the inside of the sealed vessel and formed at least part thereof from an electron emitting material, and first and second external electrodes disposed in a spaced relationship from each other on an outer face side of the sealed vessel, and includes the steps of applying an ac voltage between the first and second external electrodes for a predetermined period of time to cause the electrons and the gas to collide with each other, and applying a dc voltage between the first and second internal electrodes while the collision between the electrons and the gas continues. However, the control method for a cold cathode fluorescent lamp is not limited to those of the embodiments described hereinabove.

For example, the relationship among the timing at which the application of an ac voltage is started, the timing at which the application of the ac voltage is stopped and the timing at which a dc voltage is applied is not limited to those in the embodiments. The relationship among the timings may be any relationship only if the control of applying an ac voltage between the first and second external electrodes is performed for a predetermined period of time to cause electrons and the gas to collide with each other and then a dc voltage is applied between the first and second internal electrodes while the collision between electrons and the gas continues.

Another control method according to an embodiment of the present invention is a control method for a liquid crystal display apparatus which includes a liquid crystal display panel operable to display an image according to an image signal at a position thereof according to a synchronizing signal, and a cold cathode fluorescent lamp apparatus disposed on a rear face side of the liquid crystal display panel and including one or a plurality of cold cathode fluorescent lamps each including an optically transparent sealed vessel in which gas which emits light when electrons collide therewith is enclosed and which has a fluorescent material, which reacts with the light emitted from the gas, disposed on an inner face thereof which contacts with the gas, first and second internal electrodes disposed in the inside of the sealed vessel and formed from an electron emitting material, and first and second external electrodes disposed in a spaced relationship from each other on an outer face side of the sealed vessel, and includes the steps of applying an ac voltage between the first and second external electrodes for a predetermined period of time according to the synchronizing signal to cause the electrons and the gas to collide with each other, and controlling the polarity direction and the passage and blocking of dc current to flow in the cold cathode fluorescent lamp while the collision between the electrons and the gas continues. However, the control method for a cold cathode fluorescent lamp is not limited to those of the embodiments described hereinabove. However, the control method for a cold cathode fluorescent lamp is not limited to those of the embodiments described hereinabove.

For example, the relationship among the timing at which the application of an ac voltage is started, the timing at which the application of the ac voltage is stopped and the timing at which a dc voltage is applied is not limited to those in the embodiments. Further, the form of the relationship of the type of the synchronizing signal and the period of application of an ac voltage to the synchronizing signal is not limited to those of the embodiments.

Another cold cathode fluorescent lamp apparatus according to an embodiment of the present invention includes one or a plurality of cold cathode fluorescent lamps each including an optically transparent sealed vessel in which gas which emits light when electrons collide therewith is enclosed and which has a fluorescent material, which reacts with the light emitted from the gas, disposed on an inner face thereof which contacts with the gas, and first and second internal electrodes disposed in the inside of the sealed vessel and formed from an electron emitting material, one or a plurality of dc driving circuits each operable to apply a dc voltage between the first and second internal electrodes of a corresponding one of the cold cathode fluorescent lamps, one or a plurality of ac driving circuits each operable to apply an ac voltage between the first and second internal electrodes of a corresponding one of the cold cathode fluorescent lamps, one or a plurality of current direction control and constant current circuits each operable to control the magnitude of current to flow between the first and second internal electrodes of a corresponding one of the cold cathode fluorescent lamps to a predetermined magnitude, and a changeover circuit operable to control the dc driving circuit or circuits and the ac driving circuit or circuits such that the ac voltage is applied for a predetermined period of time to cause the electrons and the gas to collide with each other and the dc voltage is applied while the collision between the electrons and the gas continues to control the polarity direction and the passage and blocking of the dc current to flow in the cold cathode fluorescent lamp or each of the cold cathode fluorescent lamps. However, the cold cathode fluorescent lamp apparatus is not limited to those of the embodiments described hereinabove.

There is no limitation, for example, to the gas and the fluorescent material of the cold cathode fluorescent lamp and the material and the shape of the sealed vessel. Further, the dc driving circuit, ac driving circuit and current direction control and constant current circuit are not limited to those in the embodiments. Further, where the cold cathode fluorescent lamp apparatus includes a plurality of cold cathode fluorescent lamps, there is no limitation to the number of the dc driving circuits, constant current circuits or ac driving circuits with respect to the number of cold cathode fluorescent lamps.

A further control method according to an embodiment of the present invention is a control method for a cold cathode fluorescent lamp which includes an optically transparent sealed vessel in which gas which emits light when electrons collide therewith is enclosed and which has a fluorescent material, which reacts with the light emitted from the gas, disposed on an inner face thereof which contacts with the gas, and first and second internal electrodes disposed in the inside of the sealed vessel and formed at least part thereof from an electron emitting material, and includes the steps of applying an ac voltage between the first and second external electrodes for a predetermined period of time to cause the electrons and the gas to collide with each other, and applying a dc voltage between the first and second internal electrodes while the collision between the electrons and the gas continues. However, the control method for a cold cathode fluorescent lamp is not limited to those of the embodiments described hereinabove.

For example, the relationship among the timing at which the application of an ac voltage is started, the timing at which the application of the ac voltage is stopped and the timing at which a dc voltage is applied is not limited to those in the embodiments.

While preferred embodiments of the present invention have been described using specific terms, such description is for illustrative purpose only, and it is to be understood that changes and variations may be made without departing from the spirit or scope of the following claims.

The invention claimed is:

1. A driving apparatus for driving a cold cathode fluorescent lamp which includes an optically transparent sealed vessel containing a gas and having a fluorescent material disposed on an inner surface thereof, the gas emitting light when electrons collide therewith, and the fluorescent material reacting with the light, first and second internal electrodes disposed inside the sealed vessel and formed at least partially from an electron emitting material, and first and second external electrodes disposed in a spaced relationship from each other on an outer surface of the sealed vessel, the driving apparatus comprising:
   a dc driving circuit operable to apply a dc voltage between the first and second internal electrodes;
   an ac driving circuit operable to apply an ac voltage between the first and second external electrodes; and
   a changeover circuit operable to control the dc driving circuit and the ac driving circuit such that the ac voltage is applied for a predetermined period of time to cause the electrons and the gas to collide with each other and the dc voltage is applied while the collisions between the electrons and the gas continue.

2. The driving apparatus according to claim 1, further comprising:
   a constant current circuit for providing a predetermined dc current flow between the first and second internal electrodes.

3. The driving apparatus according to claim 1, wherein the changeover circuit causes the dc voltage to be applied within the predetermined period of time in which the ac voltage is applied.

4. The driving apparatus according to claim 3, wherein
   both of the first and second internal electrodes are formed from the electron emitting material, and
   the changeover circuit causes the polarity direction of the dc voltage applied between the first and second internal electrodes to be reversed alternately after every second predetermined period of time which is longer than the first predetermined period of time.

5. A cold cathode fluorescent lamp apparatus, comprising:
a cold cathode fluorescent lamp including an optically transparent sealed vessel containing a gas and having a fluorescent material disposed on an inner surface thereof, the gas emitting light when electrons collide therewith, and the fluorescent material reacting with the light, first and second internal electrodes disposed inside the sealed vessel and formed at least partially from an electron emitting material, and first and second external electrodes disposed in a spaced relationship from each other on an outer surface of the sealed vessel;
a dc driving circuit operable to apply a dc voltage between the first and second internal electrodes of the cold cathode fluorescent lamp;
a constant current circuit operable to provide a predetermined dc current flow between the first and second internal electrodes of the cold cathode fluorescent lamp;
an ac driving circuit operable to apply an ac voltage between the first and second external electrodes of the cold cathode fluorescent lamp; and
a changeover circuit operable to control the dc driving circuit and the ac driving circuit such that the ac voltage is applied for a predetermined period of time to cause the electrons and the gas to collide with each other and the dc voltage is applied while the collisions between the electrons and the gas continue.

6. The cold cathode fluorescent lamp apparatus according to claim 5, wherein
both of the first and second internal electrodes are formed from the electron emitting material, and
the changeover circuit further controls the polarity direction and the passage and blocking of the dc current in the cold cathode fluorescent lamp.

7. A liquid crystal display apparatus, comprising:
a liquid crystal display panel operable to display an image according to an image signal at a position thereof according to a synchronizing signal; and
a cold cathode fluorescent lamp apparatus disposed on a rear side of the liquid crystal display panel;
the cold cathode fluorescent lamp apparatus including:
a cold cathode fluorescent lamp including an optically transparent sealed vessel containing a gas and having a fluorescent material disposed on an inner surface thereof, the gas emitting light when electrons collide therewith, and the fluorescent material reacting with the light, first and second internal electrodes disposed inside the sealed vessel and formed at least partially from an electron emitting material, and first and second external electrodes disposed in a spaced relationship from each other on an outer surface of the sealed vessel;
a dc driving circuit operable to apply a dc voltage between the first and second internal electrodes of the cold cathode fluorescent lamp;
a constant current circuit operable to provide a predetermined dc current flow between the first and second internal electrodes of the cold cathode fluorescent lamp;
an ac driving circuit operable to apply an ac voltage between the first and second external electrodes of the cold cathode fluorescent lamp; and
a changeover circuit operable to control the dc driving circuit and the ac driving circuit such that the ac voltage is applied for a predetermined period of time according to the synchronizing signal to cause the electrons and the gas to collide with each other and the dc voltage is applied while the collisions between the electrons and the gas continue to control the polarity direction and the passage and blocking of the dc current flow in the cold cathode fluorescent lamp.

8. The liquid crystal display apparatus according to claim 7, wherein
the changeover circuit controls the application of the ac voltage for the predetermined period of time in synchronism with a blanking period of a vertical synchronizing signal which is part of the synchronizing signal and controls the alternate reversing of the polarity direction of the current flow in the cold cathode fluorescent lamp every time the blanking period appears.

9. A cold cathode fluorescent lamp apparatus, comprising:
a cold cathode fluorescent lamp including an optically transparent sealed vessel containing a gas and having a fluorescent material disposed on an inner surface thereof, the gas emitting light when electrons collide therewith, and the fluorescent material reacting with the light, and first and second internal electrodes disposed inside the sealed vessel and formed at least partially from an electron emitting material;
a dc driving circuit operable to apply a dc voltage between the first and second internal electrodes of the cold cathode fluorescent lamp;
an ac driving circuit operable to apply an ac voltage between the first and second internal electrodes of the cold cathode fluorescent lamp;
a current direction control and constant current circuit operable to provide a predetermined dc current flow between the first and second internal electrodes of the cold cathode fluorescent lamp; and
a changeover circuit operable to control the dc driving circuit and the ac driving circuit such that the ac voltage is applied for a predetermined period of time to cause the electrons and the gas to collide with each other and the dc voltage is applied while the collisions between the electrons and the gas continue to control the polarity direction and the passage and blocking of the dc current flow in the cold cathode fluorescent lamp.

10. The cold cathode fluorescent lamp apparatus according to claim 9, wherein the current direction control and constant current circuit includes a constant current source on the current flowing out side of the cold cathode fluorescent lamp and operable to set the magnitude of the predetermined dc current flow.

11. The cold cathode fluorescent lamp apparatus according to claim 9, wherein the current direction control and constant current circuit includes a voltage control circuit operable to control the magnitude of a voltage supplied to the dc driving circuit or the ac driving circuit so as to control the magnitude of the predetermined dc current flow.

12. The cold cathode fluorescent lamp apparatus according to claim 9, wherein each of the dc driving circuit and the ac driving circuit includes:
a transformer including first and second primary windings formed on a same core;
first and second ac power generation sections operable to supply ac power to the first and second primary windings, respectively; and
a driving waveform control section operable to control the first and second ac power generation sections so that addition or subtraction of magnetic fluxes generated in the core by the first and second primary windings is performed or magnetic fluxes are generated in the core by only one of the first and second primary windings.

13. A control method for a cold cathode fluorescent lamp which includes an optically transparent sealed vessel containing a gas and having a fluorescent material disposed on an inner surface thereof, the gas emitting light when electrons collide therewith, and the fluorescent material reacting with the light, first and second internal electrodes disposed inside the sealed vessel and formed at least partially from an electron emitting material, and first and second external electrodes disposed in a spaced relationship from each other on an outer surface of the sealed vessel, the control method comprising:
   applying an ac voltage between the first and second external electrodes for a predetermined period of time to cause the electrons and the gas to collide with each other; and
   applying a dc voltage between the first and second internal electrodes while the collisions between the electrons and the gas continue.

14. A control method for a liquid crystal display apparatus which includes a liquid crystal display panel operable to display an image according to an image signal at a position thereof according to a synchronizing signal, and a cold cathode fluorescent lamp apparatus disposed on a rear side of the liquid crystal display panel and including a cold cathode fluorescent lamp including an optically transparent sealed vessel containing a gas and having a fluorescent material disposed on an inner surface thereof, the gas emitting light when electrons collide therewith, and the fluorescent material reacting with the light, first and second internal electrodes disposed inside the sealed vessel and formed at least partially from an electron emitting material, and first and second external electrodes disposed in a spaced relationship from each other on an outer surface of the sealed vessel, the control method comprising:
   applying an ac voltage between the first and second external electrodes for a predetermined period of time according to the synchronizing signal to cause the electrons and the gas to collide with each other; and
   controlling the polarity direction and the passage and blocking of dc current flow in the cold cathode fluorescent lamp while the collisions between the electrons and the gas continue.

15. A control method for a cold cathode fluorescent lamp which includes an optically transparent sealed vessel containing a gas and having a fluorescent material disposed on an inner surface thereof, the gas emitting light when electrons collide therewith, and the fluorescent material reacting with the light, and first and second internal electrodes disposed inside of the sealed vessel and formed at least partially from an electron emitting material, the control method comprising:
   applying an ac voltage between the first and second internal electrodes for a predetermined period of time to cause the electrons and the gas to collide with each other; and
   applying a dc voltage between the first and second internal electrodes while the collisions between the electrons and the gas continue.

\* \* \* \* \*

UNITED STATES PATENT AND TRADEMARK OFFICE
CERTIFICATE OF CORRECTION

PATENT NO. : 7,586,272 B2
APPLICATION NO. : 11/448438
DATED : September 8, 2009
INVENTOR(S) : Makio Iida and Norimasa Furukawa It is certified that error appears in the above-identified patent and that said Letters Patent is hereby corrected as shown below:

Column 9, line 35, "denoted" should read --are denoted--;
Column 12, line 6, "generated" should read --generates--;
Column 12, line 46, "called" should read --called a--;
Column 17, lines 65-66, "Therefore, not only" should read --Therefore,--;
Column 19, line 25, "o#" should read --of--;
Column 19, line 64, "off," should read --off--;
Column 22, line 22, "an example" should read --examples--;
Column 25, line 45, delete "whose";
Column 25, line 67, "100," should read --100--;
Column 26, line 21, "appear" should read --appears--;
Column 26, line 29, "of," should read --of--;
Column 30, line 24, "configuration" should read --configuration the--;
Column 30, line 46, "includes" should read --include--;
Column 31, line 26, "elements Swa and Swb" should read --signals Sa and Sb--;
Column 32, line 44, "phases" should read --phases the--;
Column 38, line 50, "the both" should read --both--;
Column 40, line 14, "same" should read --the same--;
Column 40, line 16, "same" should read --the same--;
Column 43, line 58, "circuits" should read --circuits,--;
Column 46, line 34, "42,n" should read --42, in--;
Column 51, lines 18-20, delete "However, the control method for a cold cathode fluorescent lamp is not limited to those of the embodiments described hereinabove."
Column 54, line 13, "the current" should read --the dc--;
Column 54, line 45, "out side" should read --outside--;7586272

Signed and Sealed this

Thirtieth Day of November, 2010

David J. Kappos
*Director of the United States Patent and Trademark Office*